(12) United States Patent
Din et al.

(10) Patent No.: US 12,528,703 B2
(45) Date of Patent: *Jan. 20, 2026

(54) ELECTRODE MATERIALS, ELECTRODES, DEVICES, AND METHODS OF MAKING THEREOF

(71) Applicant: Din Ventures, LLC, Chicago, IL (US)

(72) Inventors: Rashed Din, Morton Grove, IL (US); Gurpreet Singh, Chicago, IL (US); Sai Aman Gopisetti, Chicago, IL (US)

(73) Assignee: Din Ventures, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/030,191

(22) Filed: Jan. 17, 2025

(65) Prior Publication Data

US 2025/0171313 A1 May 29, 2025

Related U.S. Application Data

(63) Continuation-in-part of application No. 18/799,795, filed on Aug. 9, 2024, now Pat. No. 12,308,433.

(60) Provisional application No. 63/518,590, filed on Aug. 10, 2023, provisional application No. 63/518,595, filed on Aug. 10, 2023.

(51) Int. Cl.
*C01B 32/198* (2017.01)

(52) U.S. Cl.
CPC ........ *C01B 32/198* (2017.08); *C01P 2002/52* (2013.01); *C01P 2002/82* (2013.01); *C01P 2002/85* (2013.01); *C01P 2006/40* (2013.01)

(58) Field of Classification Search
CPC .............. C01B 32/198; C01P 2002/52; C01P 2002/82; C01P 2002/85; C01P 2006/40; Y02E 60/10
See application file for complete search history.

(56) References Cited

U.S. PATENT DOCUMENTS

| | | |
|---|---|---|
| 2011/0111299 A1 | 5/2011 | Liu et al. |
| 2012/0088158 A1 | 4/2012 | Liu et al. |
| 2014/0287908 A1 | 9/2014 | Lee et al. |
| 2016/0285095 A1 | 9/2016 | Kang et al. |
| 2016/0307660 A1 | 10/2016 | Gong et al. |
| 2017/0263945 A1 | 9/2017 | Li et al. |
| 2018/0076459 A1 | 3/2018 | Lux et al. |

(Continued)

FOREIGN PATENT DOCUMENTS

| | | |
|---|---|---|
| CN | 110217780 A | 9/2019 |
| CN | 110950328 A | 4/2020 |

(Continued)

OTHER PUBLICATIONS

Bag et al., Nitrogen and Sulfur Dual-Doped Reduced Graphene Oxide: Synergistic Effect of Dopants Towards Oxygen Reduction Reaction, 2015, Electrochim. Acta, 163, 16-23.*

(Continued)

*Primary Examiner* — Daniel S Gatewood
(74) *Attorney, Agent, or Firm* — Polsinelli PC

(57) ABSTRACT

This invention relates generally to the field of energy storage, batteries, electrodes, including electrode materials and methods to make the electrodes materials comprising graphene and/or graphene with a plurality of dopants. This invention also relates to anode materials and/or cathode materials and methods to make said materials.

22 Claims, 14 Drawing Sheets

(56) References Cited

U.S. PATENT DOCUMENTS

| | | | |
|---|---|---|---|
| 2018/0155201 A1 | 6/2018 | Zhang et al. | |
| 2018/0212250 A1 | 7/2018 | Zhamu et al. | |
| 2019/0020017 A1 | 1/2019 | Huang et al. | |
| 2019/0157682 A1 | 5/2019 | Ho et al. | |
| 2020/0350584 A1 | 11/2020 | Cheng et al. | |
| 2021/0218110 A1 | 7/2021 | Lanning et al. | |

FOREIGN PATENT DOCUMENTS

| | | | | |
|---|---|---|---|---|
| CN | 111740105 A | | 10/2020 | |
| CN | 113600138 A | * | 11/2021 | ............ B01J 20/22 |
| CN | 115708180 A | | 2/2023 | |

OTHER PUBLICATIONS

Translation of CN113600138.*
Oct. 4, 2024—International Search Report and Written Opinion, PCT/US2024/041792, 16 pages.
Bag et al. Nitrogen and Sulfur Dual-Doped Reduced Graphene Oxide: Synergistic Effect of Dopants Towards Oxygen Reduction Reaction, Electrochimica Acta, vol. 163, May 2015 [retrieved on Sep. 20, 2024]. Retrieved from the internet: <URL: https://www.sciencedirect.com/science/article/abs/pii/SOO13468615004168>. Entire document.
Kicinski et al. Copolycondensation of heterocyclic aldehydes: a general approach to sulfur and nitrogen dually-doped carbon gels, Microporous and Mesoporous Materials, Nov. 28, 2015 [retrieved on Sep. 25, 2024]. Retrieved from the internet: <URL: https://www.sciencedirect.com/science/article/abs/pii/S1387181115006575>. Entire document.
Pohl et al. Development of a water based process for stable conversion cathodes on the basis of FeF3, Journal of Power Sources, vol. 313, 2016. Entire document.
Liang et al., "Sulfur and Nitrogen Dual-Doped Mesoporous Graphene Electrocatalyst for Oxygen Reduction with Synergistically Enhanced Performance", 2012, Angew. Chem. Int. Ed. 51, 11496-11500 (Year: 2012).
Yang et al., "Graphene-Based Carbon Nitride Nanosheets as Efficient Metal-Free Electrocatalysts for Oxygen Reduction Reactions", 2011, Angew. Chem. Int. Ed., 50, 5339-5343 (Year: 2011).
International Search Report and Written Opinion for PCT Application No. PCT/US2024/041794, dated Apr. 24, 2025, 14 pages.
Gao, et al., "C6N2S monolayer: an auxetic material with ultralow diffusion barrier and high storage capacity for potassium-ion batteries," Journal of Materials Chemistry A, 2024, vol. 12, pp. 17557-17564.
Li, et al., "Facile preparation of nitrogen/sulfur co-doped and hierarchial porous graphene hydrogel for high-performance electrochemical capacitor," Journal of Power Sources, 2017, vol. 345, pp. 146-155.
English translation for CN 111740105 (2020).

* cited by examiner

ELECTRODE MATERIALS, ELECTRODES, DEVICES, AND METHODS OF MAKING THEREOF

CROSS-REFERENCE TO RELATED APPLICATIONS

The present application is a continuation-in-part of U.S. patent application Ser. No. 18/799,795 entitled "ELECTRODE MATERIALS, ELECTRODES, DEVICES, AND METHODS OF MAKING THEREOF", filed on Aug. 9, 2024, which claims the benefit of U.S. Provisional Application No. 63/518,590 entitled "CATHODE MATERIALS, CATHODE, BATTERIES, AND METHODS OF MAKING THEREOF", filed on Aug. 10, 2023, and U.S. Provisional Application No. 63/518,595 entitled "ELECTRODE MATERIALS, ELECTRODES, DEVICES, AND METHODS OF MAKING THEREOF", filed on Aug. 10, 2023, and also claims priority to U.S. patent application Ser. No. 18/799,814 entitled "CATHODE MATERIALS, CATHODE, BATTERIES, AND METHODS OF MAKING THEREOF", filed on Aug. 9, 2024, the entire contents of which are entirely incorporated by reference herein.

TECHNICAL FIELD

This invention relates generally to the field of energy storage, supercapacitor, and electrochemical sensors, and more specifically to electrode materials and methods of making the electrode materials. This invention also relates cathode materials and methods to make the cathode materials.

BACKGROUND

Graphene, graphene oxide (GO), and reduced graphene oxide (rGO) exhibit high electrical conductivity, large surface area, and excellent mechanical properties. Electrodes composed of composites that combine carbon materials (e.g., graphene, GO, rGO, carbon nanotubes, or activated carbon) with metal oxides or conducting polymers have been developed to leverage the advantageous properties thereof. Metal oxides, such as $MnO_2$, $RuO_2$, and $Co_3O_4$, have been employed as electrode materials for supercapacitors and batteries due to their high specific capacitance and redox activity. Materials such as polyaniline, polypyrrole, and poly(3,4-ethylenedioxythiophene) (PEDOT) have been used as electrodes in energy storage devices and electrochemical sensors, owing to their high specific capacitance, good conductivity, and reversible redox activity.

There are, however, a variety of shortcomings to carbon containing electrode materials in the prior art, including inferior electrochemical properties, short shelf-life, insufficient doping efficiency, use of hazardous chemicals, limited binder compatibility, lack of versatility, lack of durability, and scalability/manufacturing challenges. Thus, there is a need in for new electrode materials with improved properties.

SUMMARY

The present disclosure is directed to cathode materials, cathodes made from the cathode materials, and methods of making the cathode materials and cathodes. The present disclosure further relates to batteries made from the cathodes of the cathode materials.

DETAILED DESCRIPTION

Figure 1:
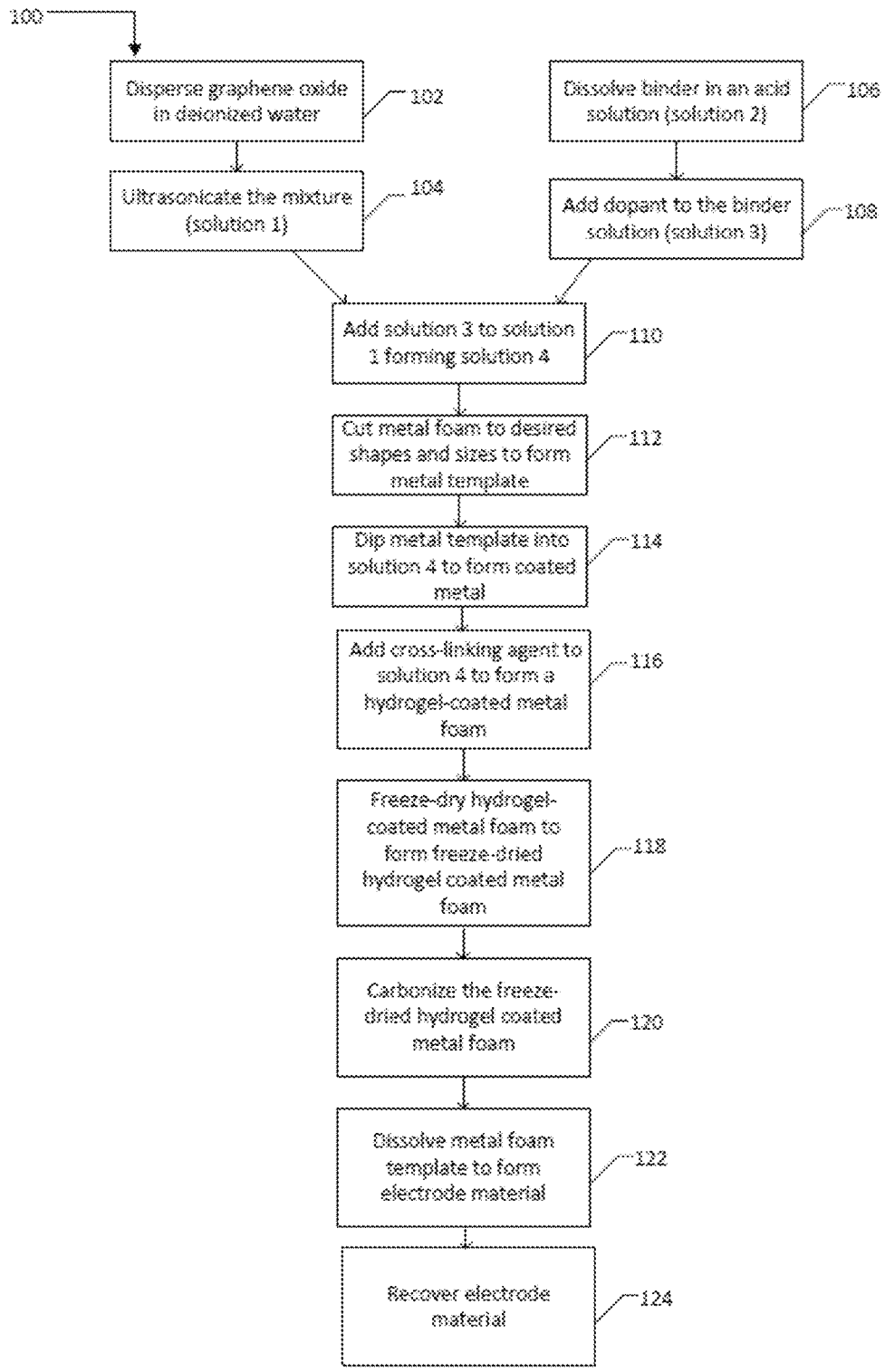
FIG. 1 is a flowchart representation of an example method.

The following description of the embodiments of the invention is not intended to limit the invention to these embodiments but rather to enable a person skilled in the art to make and use this invention.

In one aspect, this disclosure relates to an electrode material, method of making the electrode material, method of making an electrode from the electrode material, and use of the electrode. The electrode may be an anode or a cathode. The electrode material of the present disclosure may be a doped porous graphene material. The doped porous graphene material may be used to develop efficient, compact, and lightweight energy storage solutions, for portable electronic devices, wearable technology, small-scale energy storage industries, supercapacitors, and electrochemical sensors.

In one aspect, this disclosure relates to a cathode material, method of making the cathode material, method of making a cathode from the cathode material, and use of the cathode. The cathode material of the present disclosure may be a doped polyol reduced graphene. The doped polyol reduced graphene may be used to develop more efficient, compact, and lightweight energy storage solutions, ultimately benefiting portable electronic devices, wearable technology, and small-scale energy storage industries.

Electrode Material—Doped Porous Graphene Material

The electrode material may include a doped porous graphene material. The electrode material may be formed by making doped porous graphene electrode materials from a carbon source, one or more binders, and dopants. The carbon source may be graphene oxide or comprise graphene oxide. The binders include but are not limited to any one of biopolymers such as chitosan, polyvinyl alcohol (PVA), poly(vinylidene fluoride) (PVDF), carboxymethyl cellulose (CMC), or combinations thereof. The dopants include but are not limited to nitrogen, sulfur, phosphorous, boron, transition metals such as iron, nickel, or a combination thereof.

In some aspects, the electrode material may be doped with two or more dopants. For example, the porous graphene may be doped with 2 dopants, 3 dopants, 4 dopants, or 5 dopants. The dopants may be incorporated into the porous graphene. Co-doping with these elements may enhance electrical conductivity, introduce additional redox active sites, and modulate the electronic structure of the materials, leading to improved performance in energy storage devices and electrochemical sensors.

Nitrogen and Sulfur Co-Doped Porous Graphene (NSPG) Material

In some embodiments of the electrode material, the porous graphene is co-doped with nitrogen and sulfur forming a nitrogen and sulfur co-doped porous graphene (NSPG) electrode. These dopants may modulate the electronic structure, improve conductivity, and increase the number of active sites for charge storage and redox reactions, which may result in improved energy storage capacity and electrochemical performance compared to undoped graphene materials. NSPG electrode materials porous architecture and functional oxygen groups may be specifically tailored for efficient energy storage rather than catalytic processes In some embodiments, the nitrogen and sulfur co-doped porous graphene material includes oxygen. The presence of oxygen in the NSPG electrode material can be beneficial for certain applications. For example, oxygen-containing functional groups can enhance the wettability of the material, improve its stability in aqueous electrolytes, and provide additional active sites for electrochemical reactions. Oxygen may be present in a significant amount and may be comparable to or greater than the carbon content. In some embodiments, the NSPG electrode material may be highly oxidized, which may improve its electrochemical properties.

The chemical structure, chemical formula, and molecular weight of NSPG may vary depending on the specific synthesis conditions and doping concentrations. In some embodiments, nitrogen and sulfur doping levels (percent by weight) range from about 2% to about 10% and about 0.1% to about 5%, respectively. For example, the nitrogen level may be from about 2.5% to about 9.5%, about 3.0% to about 9.0%, 3.5% to about 8.5%, about 4.0% to about 8.0%, 4.5% to about 7.5%, about 5.0% to about 7.0%, 5.5% to about 6.5%, or about 6.0% to about 6.5%. In some embodiments, the nitrogen doping level may range from about 5.0% to about 7.0%, about 5.1% to about 6.9%, about 5.2% to about 6.8%, about 5.3% to about 6.7%, about 5.4% to about 6.6%, about 5.5% to about 6.5%, about 5.6% to about 6.4%, about 5.7% to about 6.3%, about 5.8% to about 6.2%, or about 5.9% to about 6.1%. For example, the sulfur level may be from about 0.1% to about 4.5%, about 0.2% to about 4.0%, 0.5% to about 3.5%, about 1.0% to about 3.0%, about 1.5% to about 2.5%, or about 2.0% to about 2.3%. In some embodiments, the sulfur doping level may be from about 0.5% to about 2%, about 0.6% to about 1.9%, about 0.7% to about 1.8%, about 0.8% to about 1.7%, about 0.9% to about 1.6%, about 1.0% to about 1.5%, about 1.1% to about 1.4%, or about 1.2% to about 1.3%.

The amount of oxygen (percent by weight) in the NSPG may range from about 15% to about 30%. For example, the amount of oxygen may range from about 15% to about 30%, about 16% to about 29%, about 17% to about 28%, about 18% to about 27%, about 19% to about 26%, about 20% to about 25%, about 21% to about 24%, or about 22% to about 23%.

These dopants may modulate the electronic structure, improve conductivity, and increase the number of active sites for charge storage and redox reactions, resulting in improved energy storage capacity and electrochemical performance compared to undoped graphene materials.

In some aspects, the disclosed NSPGs may have a about 1 to about 2 orders of magnitude increase in electrical conductivity, about 100 to about 300 times improvement in conductivity, and about 10% to about 50% increase in active sites compared to undoped porous graphene electrodes. These numbers demonstrate the impact of nitrogen and sulfur co-doping on the electronic structure, conductivity, and availability of active sites in graphene, resulting in improved electrochemical performance.

The chemical formula of the NSPG electrode material of the present disclosure is $C_xN_yS_zO_w$, where w, x, y, and z are integers or decimal numbers. In the formula, x ranges from about 1 to about 80, y is about 1 to about 20, w ranges from about 2 to about 40, and z is about 0.01 to about 5.

In some embodiments, x ranges from about 1 to about 80, about 5 to about 75, about 10 to about 70, about 15 to about 65, about 20 to about 60, about 25 to about 55, about 30 to about 50, about 35 to about 45, or about 40 to about 43. For example, x may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80. In some embodiments, x may be 60.

In some embodiments, y ranges from about 1 to about 20, about 1.5 to about 19.5, about 2 to about 19, about 2.5 to about 18.5, about 3 to about 18, from about 3.5 to about 17.5, about 4 to about 17, about 4.5 to about 16.5 about 5.0 to about 16, about 5.5 to about 16, about 6.0 to about 15.5, about 6.5 to about 15, about 7.0 to about 14.5, about 7.5 to about 14, about 8 to about 13.5. about 8.5 to about 13, about 9 to about 12.5, about 9.5 to about 12, about 10 to about 11.5, or about 10 to about 10.5. For example, y may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 10, 10.25, 10.5, 10.75, 11, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20. In some embodiments, y may be 6.

In some embodiments, z ranges from about 0.01 to about 5, about 0.05 to about 4.5, about 0.1 to about 4, about 0.15 to about 3.5, about 0.2 to about 3.0, about 0.25 to about 2.5, about 0.3 to about 2.0, about 0.35 to about 1.5, about 0.4 to about 1.0, or about 0.45 to about 0.75. For example, z may be 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, or 5.0. In some embodiments, z may be 0.02.

In some embodiments, w ranges from about 2 to about 40, about 3 to about 39, about 4 to about 38, about 5 to about 37, about 6 to about 36, about 6 to about 35, about 7 to about 34, about 8 to about 33, about 9 to about 32, about 10 to about 31, about 11 to about 30, about 12 to about 29, about 13 to about 28, about 14 to about 27, about 15 to about 26, about 16 to about 25, about 17 to about 24, about 18 to about 23, about 19 to about 22, or about 20 to about 21. For example, w may be 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0. In some embodiments, w may be 25.

In some embodiments, the chemical formula of NSPG may be $C_6N_2S$, indicating a graphene lattice with two nitrogen and one sulfur atom incorporated per six carbon atoms.

In some embodiments, the chemical formula of NSPG may be $C_{60}N_6S_{0.02}O_{25}$. The lower sulfur content and moderate oxygen levels align with its role as a high-performance lithium-ion electrode material.

The morphology of NSPG may be observed using advanced microscopy techniques. For example, Field Emission Scanning Electron Microscope (FESEM) images may reveal the surface morphology, showing a highly porous structure with interconnected graphene-based sheets. The disclosed NSPGs structures may exhibit a mixture of structures rather than being uniform, considering the fabrication method and the presence of multiple components. NSPG electrode material consists of a combination of graphene-based sheets with various degrees of nitrogen and sulfur doping, interconnected through a porous network. These sheets may possess some degree of stacking, resulting in the presence of multiple crystal domains within the NSPG structure. The incorporation of chitosan, thiourea, and the use of a nickel foam template may lead to variations in crystal orientation, doping distribution, and pore size throughout the NSPG electrode material.

In some aspects, Transmission Electron Microscope (TEM) images may provide a detailed view of the internal nanostructures, showcasing the porous network and the distribution of nitrogen and sulfur dopants within the graphene framework. These images demonstrate the morphology of NSPG for various electrochemical applications.

In certain aspects, a gas adsorption analyzer may be used for characterizing the pore size, pore volume, and surface area of the NSPG electrode material.

The pore size of the NSPG electrode material ranges from about 0.5 nm to about 70 nm. For example, the particle size may be from about 1 nm to about 65 nm, about 5 nm to about 60 nm, 10 nm to about 65 nm, about 15 nm to about 60 nm, 20 nm to about 55 nm, about 25 nm to about 50 nm, 30 nm to about 45 nm, or about 35 nm to about 40 nm. The pore size may facilitate fast ion diffusion. In certain aspects, the porous structure of NSPG electrode materials may minimize ionic resistance. In other aspects, the porous structure of NSPG electrode materials may support stable performance under high current densities.

The pore volume of the NSPG electrode material ranges from about 0.1 cm$^3$ to about 2 cm$^3$. For example, the pore volume may be from about 0.25 cm$^3$ to about 1.75 cm$^3$, about 0.5 cm$^3$ to about 1.5 cm$^3$, about 0.75 cm$^3$ to about 1.25 cm$^3$, or about 1.0 cm$^3$ to about 1.2 cm$^3$.

The surface area of the pores of the NSPG electrode material ranges from about 400 m$^2$/g to about 900 m$^2$/g. For example, the surface area may be from about 450 m$^2$/g to about 850 m$^2$/g, about 500 m$^2$/g to about 800 m$^2$/g, about 550 m$^2$/g to about 750 m$^2$/g, about 600 m$^2$/g to about 700 m$^2$/g, or about 620 m$^2$/g to about 650 m$^2$/g. The surface area of the pores may facilitate fast ion diffusion.

In certain aspects, X-ray diffraction (XRD) may be used to obtain structural information, including but not limited to crystallinity and phase composition, about the NSPG electrode material. In some embodiments, the XRD spectra of NSPG may exhibit characteristic peaks associated with its graphene-based structure. Key peaks may include a prominent peak at around $2\theta=26.5°$, corresponding to the (002) plane of graphene. Additional peaks may appear at angles that reflect the specific crystallographic orientation and lattice spacing of the NSPG electrode material. The presence of these peaks confirms the presence of a graphitic structure and the synthesis of NSPG.

In certain aspects, Raman Spectroscopy may be used to obtain structural information and confirm the presence of graphene in the NSPG electrode material. Raman spectroscopy is a powerful technique for the characterization of carbon materials like graphene, as it provides information about the vibrational modes of the atoms in the material. The intensity, position, and width of the Raman peaks can provide insights into the number of graphene layers, the presence of defects, and the level of doping. The Raman spectra of NSPG electrode material may reveal characteristic peaks associated with graphene-based materials. The D band, G band, and 2D band are commonly observed in the Raman spectra of graphene. The D band (around 1350 cm$^{-1}$) corresponds to defects or disorder, the G band (around 1580 cm$^{-1}$) corresponds to in-plane vibrations of sp$^2$ carbon atoms, and the 2D band (around 2700 to around 2900 cm$^{-1}$) indicates the number of graphene layers. The intensity ratio of the D and G bands (ID/IG) provides insights into the degree of disorder or defects in the graphene structure.

X-ray Photoelectron Spectroscopy (XPS) is a surface-sensitive quantitative spectroscopic technique that measures the elemental composition, empirical formula, chemical state, and electronic state of the elements within a material. In certain aspects, XPS may be used to measure the elemental composition, chemical state, and electronic state of the NSPG electrode material. The XPS measurements of NSPG electrode material may provide information about its elemental composition, chemical state, and electronic state. XPS analysis may reveal the presence of carbon (C), nitrogen (N), and sulfur (S) elements in the NSPG electrode material. The binding energies of these elements may be used to determine their chemical bonding and oxidation states. Additionally, XPS spectra may exhibit characteristic peaks corresponding to functional groups or surface contaminants, which may provide insights into the surface chemistry of NSPG electrode material.

The elemental scan may provide a detailed breakdown of the elemental composition of the NSPG electrode surface. In some embodiments, the presence of peaks corresponding to O1s, N1s, C1s, and S2p confirms the successful incorporation of nitrogen and sulfur into the graphene structure. The relative intensities of these peaks can provide an estimate of the atomic ratios of these elements in the NSPG, which is crucial for understanding the doping level and the influence of these dopants on the electrochemical properties of the electrode. The high-resolution scans of these peaks can reveal the binding energy of the electrons, which is characteristic of the specific element and its chemical state. FIGS. 3A-3D are an C1s, N1s, O1s, and S2p XPS spectrum obtained by elemental scans from a NSPG electrode material in some embodiments of the present disclosure.

Figure 3A:
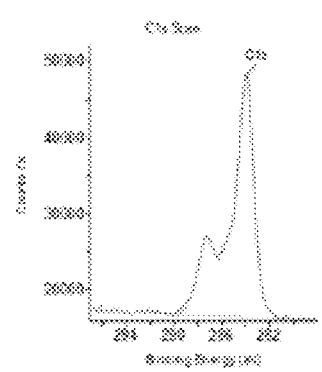
FIG. 3A is a representative high resolution C1s XPS spectrum obtained from a NSPG electrode material.
Figure 3B:
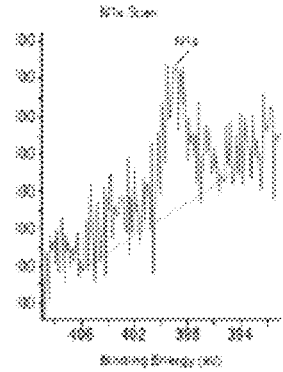
FIG. 3B is a representative high resolution N1s XPS spectrum obtained from a NSPG electrode material.
Figure 3C:
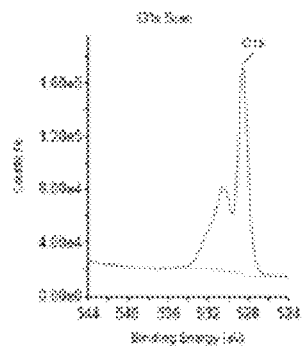
FIG. 3C is a representative high resolution O1s XPS spectrum of NSPG electrode materials disclosed herewith.
Figure 3D:
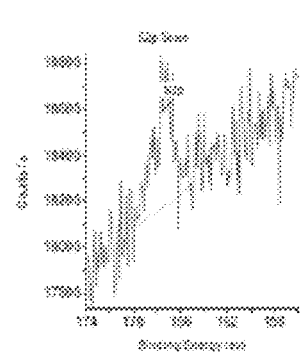
FIG. 3D is a representative high resolution S2p XPS spectrum of NSPG electrode materials disclosed herewith.
Figure 3E:
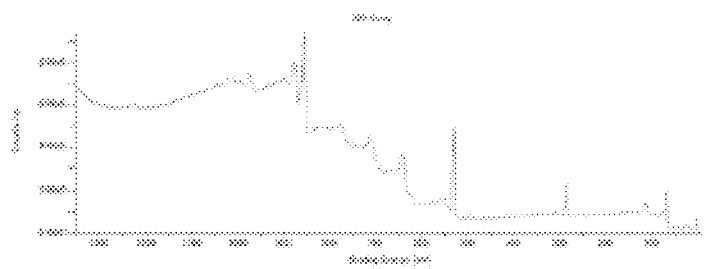
FIG. 3E is a representative XPS spectrum of NSPG electrode materials disclosed herewith.

The survey scan may provide a broad overview of all elements present on the surface of the NSPG electrode. In some embodiments, the survey scan confirms the presence of the expected elements (C, N, S, O) and can also reveal the presence of any unexpected or trace elements. The absence of peaks corresponding to impurities or unreacted precursors indicates the high purity of the NSPG electrode, which may be important for achieving optimal performance in energy storage applications. Any unexpected peaks could indicate contamination or incomplete reactions during the fabrication process, which would need to be addressed in future fabrication runs. FIG. 3E shows a survey scan of some embodiments of NSPG electrode materials.

Figure 4:
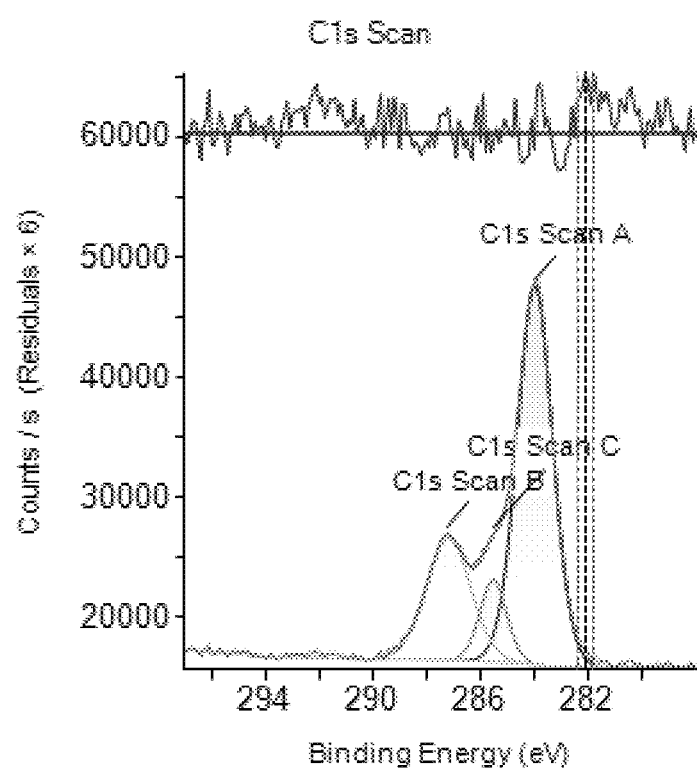
FIG. 4 is a representative XPS spectrum of NSPG electrode materials disclosed herewith.

The peak fitting scan may provide detailed information about the chemical states of the elements present. For example, the N1s peak can be deconvoluted into several components corresponding to different nitrogen functionalities (e.g., pyridinic N, pyrrolic N, graphitic N, etc.). The relative intensities of these components provide insights into the types of nitrogen doping in the NSPG. This information may be crucial as different nitrogen functionalities can have different effects on the electrochemical properties of the electrode. Similarly, the S2p peak can provide information about the types of sulfur functionalities present. The presence of different sulfur functionalities can influence the electronic structure of the graphene and hence its interaction with the electrolyte during energy storage. FIG. 4 is a representative peak fitting scan of the C1s peak in some embodiments of NSPG electrode materials.

In certain aspects, the energy density, specific capacity, and cycling stability of the NSPG electrode material may be measured by analytical techniques including but not limited to cyclic voltammetry, galvanostatic charge/discharge cycling, and electrochemical impedance spectroscopy.

In some aspects, NSPG electrode material exhibit increased energy storage capacity, cycling stability, and charge/discharge rates, while maintaining cost-effectiveness and environmental friendliness compared to metal oxides, conducting polymers, carbon-based materials, and their composites. For example, metal oxides offer high energy density (400-1200 Wh/kg) but lower power density (10-1000 W/kg), while conducting polymers exhibit slower charging/discharging times (minutes to hours) compared to carbon-based materials (seconds to minutes). Long-term stability varies, with metal oxides retaining 80-90% capacity over 1000 cycles, conducting polymers experiencing 10-50% capacity fading over hundreds of cycles, and carbon-based materials retaining over 90% capacity over thousands of cycles. Achieving a balance between energy/power density, charging/discharging rates, and stability is a challenge in developing advanced electrode materials.

In certain aspects, the disclosed NSPG electrode materials may have an electronic conductivity ranging from about 1000 S/m to about 5000 S/m. For example, the electronic conductivity may be about to 1100 S/m to about 4900 S/m, 1200 S/m to about 4800 S/m, 1300 S/m to about 4700 S/m, 1400 S/m to about 4600 S/m, 1500 S/m to about 4500 S/m, 1600 S/m to about 4400 S/m, 1700 S/m to about 4300 S/m, 1800 S/m to about 4200 S/m, 1900 S/m to about 4100 S/m, 2000 S/m to about 4000 S/m, 2100 S/m to about 3900 S/m, 2200 S/m to about 3800 S/m, 2300 S/m to about 3700 S/m, 2400 S/m to about 3600 S/m, 2500 S/m to about 3500 S/m, 2600 S/m to about 3400 S/m, 2700 S/m to about 3300 S/m, 2800 S/m to about 3200 S/m, 2900 S/m to about 3100 S/m, or 3000 S/m to about 3050 S/m. This electronic conductivity may enable efficient electron transfer during battery operations.

In certain aspects, the disclosed NSPG electrode materials may have a capacity retention of greater than 80% over a number of charge/discharge cycles. The number of cycles may be about 800, about 850, about 900, about 950, about 1000, about 1100, about 1200, about 1300, about 1400, about 1500, about 1600, about 1700, about 1800, about 1900, about 2000, about 3000, or about 5000. The greater than 90% capacity retention reflects the materials the long-term durability. For example, the capacity retention may range from about 80% to about 99%, about 81% to about 98%, about 82% to about 97%, about 83% to about 96%, about 84% to about 95%, about 85% to about 94%, about 86% to about 93%, about 87% to about 92%, about 88% to about 91%, or about 89% to about 90% over 1000 charge/discharge cycles. In one or more embodiments, the capacity retention over 900 cycles may be greater than about 90%, about 91%, about 92%, about 93%, about 94%, about 95%, about 96%, about 97%, about 98%, or about 99%. In one or more embodiments, the capacity retention over 1000 cycles may be greater than about 90%, about 91%, about 92%, about 93%, about 94%, about 95%, about 96%, about 97%, about 98%, or about 99%. In another example, the capacity retention may range from about 90% to about 99%, about 91% to about 98%, about 92% to about 97%, about 93% to about 96%, or about 94% to about 95% over 2000 charge/discharge cycles.

In certain aspects, the disclosed NSPG electrode materials may have a specific surface area ranging from about 200 $m^2/g$ to about 2000 $m^2/g$. For example, the specific surface area may range from about 250 $m^2/g$ to about 1950 $m^2/g$, about 300 $m^2/g$ to about 1900 $m^2/g$, about 350 $m^2/g$ to about 1850 $m^2/g$, about 400 $m^2/g$ to about 1800 $m^2/g$, about 450 $m^2/g$ to about 1750 $m^2/g$, about 500 $m^2/g$ to about 1700 $m^2/g$, about 550 $m^2/g$ to about 1650 $m^2/g$, about 600 $m^2/g$ to about 1600 $m^2/g$, about 650 $m^2/g$ to about 1550 $m^2/g$, about 700 $m^2/g$ to about 1500 $m^2/g$, about 750 $m^2/g$ to about 1450 $m^2/g$, about 800 $m^2/g$ to about 1400 $m^2/g$, about 850 $m^2/g$ to about 1350 $m^2/g$, about 900 $m^2/g$ to about 1300 $m^2/g$, about 950 $m^2/g$ to about 1250 $m^2/g$, about 1000 $m^2/g$ to about 1200 $m^2/g$, about 1050 $m^2/g$ to about 1150 $m^2/g$, or about 1100 $m^2/g$ to about 1125 $m^2/g$.

In certain aspects, the disclosed NSPG electrode materials may have a capacity ranging from about 30 mAh to about 150 mAh. For example, the capacity may range from about 30 mAh to about 150 mAh, about 35 mAh to about 145 mAh, about 40 mAh to about 140 mAh, about 45 mAh to about 135 mAh, about 50 mAh to about 130 mAh, about 55 mAh to about 125 mAh, about 60 mAh to about 120 mAh, about 65 mAh to about 115 mAh, about 70 mAh to about 110 mAh, about 75 mAh to about 105 mAh, about 80 mAh to about 100 mAh, about 85 mAh to about 95 mAh, or about 87 mAh to about 92 mAh.

In certain aspects, the disclosed NSPG electrode materials may have a specific capacity ranging from about 100 mAh/g to about 500 mAh/g. For example, the specific capacity may range from about 120 mAh/g to about 480 mAh/g, about 140 mAh/g to about 460 mAh/g, about 160 mAh/g to about 440 mAh/g, about 180 mAh/g to about 420 mAh/g, about 200 mAh/g to about 400 mAh/g, about 220 mAh/g to about 380 mAh/g, about 240 mAh/g to about 360 mAh/g, about 260 mAh/g to about 340 mAh/g, about 280 mAh/g to about 320 mAh/g, or about 300 mAh/g to about 310 mAh/g. In some embodiments, the specific capacity may be from about 200 mAh/g to about 400 mAh/g.

In certain aspects, the disclosed NSPG electrode materials may have an energy density ranging from about 10 Wh/kg to about 200 Wh/kg. For example, the energy density may range from about 20 Wh/kg to about 190 Wh/kg, about 30 Wh/kg to about 180 Wh/kg, about 40 Wh/kg to about 170 Wh/kg, about 50 Wh/kg to about 160 Wh/kg, about 60 Wh/kg to about 150 Wh/kg, 70 Wh/kg to about 140 Wh/kg, about 80 Wh/kg to about 130 Wh/kg, about 90 Wh/kg to about 120 Wh/kg, or about 100 Wh/kg to about 110. In some embodiments, the energy density may be from about 10 to about 25 Wh/kg. In other embodiments, the energy density may be from about 100 to about 200 Wh/kg. The energy density may depend on factors such as the effective surface area of the electrode, the ionic conductivity of the electrolyte, and the electrochemical performance of the materials.

In certain aspects, the disclosed NSPG electrode materials may have a power density ranging from about 500 W/kg to about 10,000 W/kg. For example, the power density may range from about 600 W/kg to about 9900 W/kg, about 700 W/kg to about 9800 W/kg, about 800 W/kg to about 9700 W/kg, about 900 W/kg to about 9600 W/kg, about 1000 W/kg to about 9500 W/kg, about 1100 W/kg to about 9400 W/kg, about 1200 W/kg to about 9300 W/kg, about 1300 W/kg to about 9200 W/kg, about 1400 W/kg to about 9100 W/kg, about 1500 W/kg to about 9000 W/kg, about 1600 W/kg to about 8900 W/kg, about 1700 W/kg to about 8800 W/kg, about 1800 W/kg to about 8700 W/kg, about 1900 W/kg to about 8600 W/kg, about 2000 W/kg to about 8500 W/kg, about 2100 W/kg to about 8400 W/kg, about 2200 W/kg to about 8300 W/kg, about 2300 W/kg to about 8200 W/kg, about 2400 W/kg to about 8100 W/kg, about 2500 W/kg to about 8000 W/kg, about 2600 W/kg to about 7900 W/kg, about 2700 W/kg to about 7800 W/kg, about 2800 W/kg to about 7700 W/kg, about 2900 W/kg to about 7600 W/kg, about 3000 W/kg to about 7500 W/kg, about 3100 W/kg to about 7400 W/kg, about 3200 W/kg to about 7300 W/kg, about 3300 W/kg to about 7200 W/kg, about 3400 W/kg to about 7100 W/kg, about 3500 W/kg to about 7000 W/kg, about 3600 W/kg to about 6900 W/kg, about 3700 W/kg to about 6800 W/kg, about 3800 W/kg to about 6700 W/kg, about 3900 W/kg to about 6600 W/kg, about 4000 W/kg to about 6500 W/kg, about 4100 W/kg to about 6400 W/kg, about 4200 W/kg to about 6300 W/kg, about 4300 W/kg to about 6200 W/kg, about 4400 W/kg to about 6100 W/kg, about 4500 W/kg to about 6000 W/kg, about 4600 W/kg to about 5900 W/kg, about 4700 W/kg to about 5800 W/kg, about 4800 W/kg to about 5700 W/kg, about 4900 W/kg to about 5600 W/kg, about 5000 W/kg to about 5500 W/kg, about 5100 W/kg to about 5400 W/kg, or about 5200 W/kg to about 5300 W/kg. The power density may be influenced by the optimized pore structure and the efficient ion transport provided by the electrolyte.

In certain aspects, the disclosed NSPG electrode materials may demonstrate a rapid charging and discharging with C-rates ranging from about 10 to about 100. For example, the C-rate may be from about 20 to about 90, about 30 to about 80, about 40 to about 70, or about 50 to about 60.

Electrodes Made from NSPG Electrode Materials

An electrode is constituted by an electrode material, a conductive material, a current collector, and a binder (binding agent). An electrode is typically made by mixing an electrode material, a binder, a solvent, and optionally additives. The binder helps in adhering the electrode material to the current collector and maintaining structural integrity during battery cycling. The solvent helps to form a solution with all the components dissolved or suspended in it.

The present disclosure also includes electrodes made from the electrode materials described above. The electrodes may be anodes or cathodes. The present disclosure also includes the use of the disclosed electrodes in any one of energy storage devices, electrochemical sensors, catalytic reactions, and combinations thereof.

In some embodiments of the present disclosure, the electrode material may be any material described above. For example, the electrode material may be a doped porous graphene. In some embodiments, or nitrogen and sulfur co-doped porous graphene.

Examples of suitable binders include but are not limited to biopolymers, polyvinylidene fluoride (PVDF), polyvinyl alcohol (PVA), polyacrylic acid (PAA), or chitosan, styrene-butadiene rubber (SBR), or combinations thereof. The biopolymers include but are not limited to chitosan, alginate, cellulose derivatives, and combinations thereof. Cellulose derivates include but are not limited to carboxymethyl cellulose (CMC). Notably, chitosan is superior to alginate and cellulose derivatives as an eco-friendly binder due to its biocompatibility, strong film-forming properties, and excellent adhesion and/or cohesion. These characteristics make chitosan a preferred choice for fabricating electrodes in energy storage devices, ensuring mechanical integrity and performance.

In some embodiments, the binder may be chitosan. Chitosan is biocompatible, biodegradable, and has film-forming properties. Different grades and formulations of chitosan may vary in properties and performance. Chitosan acts as an eco-friendly alternative to the conventional petroleum-based binders such as PVDF or SBF. The chitosan may be derived from a naturally occurring polymer including a naturally occurring polymer found in the shells of crustaceans. PVDF or SBR binders provide enhanced mechanical strength, adhesion, stability, or combination thereof. Thus, a combination of binders may be desired depending on specific requirements, performance goals, and optimization needs of the cathode and subsequent energy storage device. In some embodiments, the chitosan may be derived from chitin.

In some embodiments, the solvent may be an acid, such as acetic acid. In other embodiments, the solvent may be a weak acid or an organic acid.

The electrode formed using co-doped porous graphene and the chitosan binder may be utilized in various battery configurations.

The disclosed NSPG electrodes enhanced electrochemical performance, including high energy and power density, rapid charging and discharging capabilities, and excellent cycling stability, make them appropriate for energy storage devices. These energy storage devices include but are not limited to lithium-ion batteries, sodium-ion batteries, magnesium-ion batteries, supercapacitors, or similar devices.

Lithium-ion batteries may be utilized in consumer electronics, electric vehicles, and grid energy storage. NSPG electrodes may improve the performance and safety of lithium-ion batteries. The disclosed NSPG electrode's versatility makes them compatible with emerging battery technologies, such as sodium-ion or magnesium-ion batteries, further expanding their applicability in energy storage.

The disclosed NSPG electrodes may provide increased energy storage capacity and power output for supercapacitors. Supercapacitors made from the NSPG electrodes may be used in fast-charging energy storage systems, backup power supplies, and hybrid electric vehicles.

The disclosed NSPG electrodes' high surface area, interconnected porous structure, and abundant redox active sites, make them appropriate for electrochemical sensing applications. The electrochemical sensing applications include but are not limited to any one of environmental monitoring, biomedical sensors, chemical sensors or a combination thereof. For example, the disclosed NSPG electrodes may be used to develop sensors for detecting trace amounts of pollutants, such as heavy metals, organic contaminants, or harmful gases, in air, water, or soil. In another example, the disclosed NSPG electrodes may be employed in the fabrication of sensors for detecting biomolecules or monitoring biological processes, such as glucose sensors for diabetes management or neurotransmitter sensors for neurological research. In yet another, the disclosed NSPG electrodes may be applied in the development of sensors for monitoring industrial processes, detecting hazardous chemicals, or ensuring quality control in various manufacturing sectors.

In certain aspects, the nitrogen and sulfur co-doping and porous structure of the disclosed NSPG electrodes provide an abundance of active sites that may facilitate various catalytic reactions, making them suitable for applications in electrocatalysis or heterogeneous catalysis. This may include potential uses in energy conversion devices, such as fuel cells or electrolyzers, and the production of valuable chemicals through sustainable catalytic processes.

The disclosed NSPG electrodes' shape and size may be customized using nickel foam as a template, allowing for flexibility in design. Typical dimensions range from a few square centimeters to tens of square centimeters, with thicknesses in the range of tens to hundreds of micrometers. The size and share of the disclosed NSPG electrodes may depend on the intended application.

The thickness of the disclosed NSPG electrodes depend on the intended application, the performance requirements of the electrode, and the manufacturing feasibility. The thickness of the electrode may be optimized based on the desired energy density, power output, and other factors to achieve the desired performance.

The thickness of the disclosed NSPG electrodes ranges from about 10 µm to about 900 µm. For example, the thickness may be from about 25 µm to about 875 µm, about 50 µm to about 850 µm, about 75 µm to about 825 µm, about 100 µm to about 800 µm, about 125 µm to about 775 µm, about 150 µm to about 750 µm, about 175 µm to about 725 µm, about 200 µm to about 700 µm, about 225 µm to about 675 µm, about 250 µm to about 650 µm, about 275 µm to about 625 µm, about 300 µm to about 600 µm, about 325 µm to about 575 µm, about 350 µm to about 550 µm, about 375 µm to about 525 µm, about 400 µm to about 500 µm, about 425 µm to about 475 µm, or about 450 µm to about 470 µm. In some embodiments, the thickness may be 10 µm, 50 µm, 100 µm, 150 µm, 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, or 950 µm.

The size of the disclosed NSPG electrodes ranges from about 2 cm to about 100 cm. For example, the size may be from about 5 cm to about 95 cm, about 10 cm to about 90 cm, about 15 cm to about 85 cm, about 20 cm to about 80 cm, about 25 cm to about 80 cm, about 30 cm to about 75 cm, about 35 cm to about 70 cm, about 40 cm to about 65 cm, about 45 cm to about 60 cm, or about 50 cm to about 55 cm. In some embodiments, the NSPG electrodes may be used for large-scale battery cells or supercapacitors.

In other aspects, the size of the disclosed NSPG electrodes may range from about 5 mm to about 30 mm. For example, the size may be from about 6 mm to about 29 mm, about 7 mm to about 28 mm, about 8 mm to about 27 mm, about 9 mm to about 26 mm, about 10 mm to about 25 mm, about 11 mm to about 24 mm, about 12 mm to about 23 m, about 13 mm to about 22 mm, about 14 mm to about 21 mm, about 15 mm to about 20 mm, about 16 mm to about 19 mm, or about 17 mm to about 18 mm. In some embodiments, the NSPG electrodes may be used in 2032 coin cells.

In certain aspects, the disclosed NSPG electrode may have an electronic conductivity ranging from about 1000 S/m to about 5000 S/m. For example, the electronic conductivity may be about to 1100 S/m to about 4900 S/m, 1200 S/m to about 4800 S/m, 1300 S/m to about 4700 S/m, 1400 S/m to about 4600 S/m, 1500 S/m to about 4500 S/m, 1600 S/m to about 4400 S/m, 1700 S/m to about 4300 S/m, 1800 S/m to about 4200 S/m, 1900 S/m to about 4100 S/m, 2000 S/m to about 4000 S/m, 2100 S/m to about 3900 S/m, 2200

S/m to about 3800 S/m, 2300 S/m to about 3700 S/m, 2400 S/m to about 3600 S/m, 2500 S/m to about 3500 S/m, 2600 S/m to about 3400 S/m, 2700 S/m to about 3300 S/m, 2800 S/m to about 3200 S/m, 2900 S/m to about 3100 S/m, or 3000 S/m to about 3050 S/m. This electronic conductivity may enable efficient electron transfer during battery operations.

In certain aspects, the disclosed NSPG electrode materials may have a capacity retention of greater than 80% over a number of charge/discharge cycles. The number of cycles may be about 800, about 850, about 900, about 950, about 1000, about 1100, about 1200, about 1300, about 1400, about 1500, about 1600, about 1700, about 1800, about 1900, about 2000, about 3000, or about 5000. The greater than 90% capacity retention reflects the materials the long-term durability. For example, the capacity retention may range from about 80% to about 99%, about 81% to about 98%, about 82% to about 97%, about 83% to about 96%, about 84% to about 95%, about 85% to about 94%, about 86% to about 93%, about 87% to about 92%, about 88% to about 91%, or about 89% to about 90% over 1000 charge/discharge cycles. In one or more embodiments, the capacity retention over 900 cycles may be greater than about 90%, about 91%, about 92%, about 93%, about 94%, about 95%, about 96%, about 97%, about 98%, or about 99%. In one or more embodiments, the capacity retention over 1000 cycles may be greater than about 90%, about 91%, about 92%, about 93%, about 94%, about 95%, about 96%, about 97%, about 98%, or about 99%. In another example, the capacity retention may range from about 90% to about 99%, about 91% to about 98%, about 92% to about 97%, about 93% to about 96%, or about 94% to about 95% over 2000 charge/discharge cycles.

In certain aspects, the disclosed NSPG electrodes may have a specific surface area ranging from about 200 $m^2/g$ to about 2000 $m^2/g$. For example, the specific surface area may range from about 250 $m^2/g$ to about 1950 $m^2/g$, about 300 $m^2/g$ to about 1900 $m^2/g$, about 350 $m^2/g$ to about 1850 $m^2/g$, about 400 $m^2/g$ to about 1800 $m^2/g$, about 450 $m^2/g$ to about 1750 $m^2/g$, about 500 $m^2/g$ to about 1700 $m^2/g$, about 550 $m^2/g$ to about 1650 $m^2/g$, about 600 $m^2/g$ to about 1600 $m^2/g$, about 650 $m^2/g$ to about 1550 $m^2/g$, about 700 $m^2/g$ to about 1500 $m^2/g$, about 750 $m^2/g$ to about 1450 $m^2/g$, about 800 $m^2/g$ to about 1400 $m^2/g$, about 850 $m^2/g$ to about 1350 $m^2/g$, about 900 $m^2/g$ to about 1300 $m^2/g$, about 950 $m^2/g$ to about 1250 $m^2/g$, about 1000 $m^2/g$ to about 1200 $m^2/g$, about 1050 $m^2/g$ to about 1150 $m^2/g$, or about 1100 $m^2/g$ to about 1125 $m^2/g$.

In certain aspects, the disclosed NSPG electrode materials may have a capacity ranging from about 30 mAh to about 150 mAh. For example, the capacity may range from about 30 mAh to about 150 mAh, about 35 mAh to about 145 mAh, about 40 mAh to about 140 mAh, about 45 mAh to about 135 mAh, about 50 mAh to about 130 mAh, about 55 mAh to about 125 mAh, about 60 mAh to about 120 mAh, about 65 mAh to about 115 mAh, about 70 mAh to about 110 mAh, about 75 mAh to about 105 mAh, about 80 mAh to about 100 mAh, about 85 mAh to about 95 mAh, or about 87 mAh to about 92 mAh.

In certain aspects, the disclosed NSPG electrode materials may have a specific capacity ranging from about 100 mAh/g to about 500 mAh/g. For example, the specific capacity may range from about 120 mAh/g to about 480 mAh/g, about 140 mAh/g to about 460 mAh/g, about 160 mAh/g to about 440 mAh/g, about 180 mAh/g to about 420 mAh/g, about 200 mAh/g to about 400 mAh/g, about 220 mAh/g to about 380 mAh/g, about 240 mAh/g to about 360 mAh/g, about 260 mAh/g to about 340 mAh/g, about 280 mAh/g to about 320 mAh/g, or about 300 mAh/g to about 310 mAh/g. In some embodiments, the specific capacity may be from about 200 mAh/g to about 400 mAh/g.

In certain aspects, the disclosed NSPG electrode materials may have an energy density ranging from about 10 Wh/kg to about 200 Wh/kg. For example, the energy density may range from about 20 Wh/kg to about 190 Wh/kg, about 30 Wh/kg to about 180 Wh/kg, about 40 Wh/kg to about 170 Wh/kg, about 50 Wh/kg to about 160 Wh/kg, about 60 Wh/kg to about 150 Wh/kg, 70 Wh/kg to about 140 Wh/kg, about 80 Wh/kg to about 130 Wh/kg, about 90 Wh/kg to about 120 Wh/kg, or about 100 Wh/kg to about 110. In some embodiments, the energy density may be from about 10 to about 25 Wh/kg. In other embodiments, the energy density may be from about 100 to about 200 Wh/kg. The energy density may depend on factors such as the effective surface area of the electrode, the ionic conductivity of the electrolyte, and the electrochemical performance of the materials.

In certain aspects, the disclosed NSPG electrode materials may have a power density ranging from about 500 W/kg to about 10,000 W/kg. For example, the power density may range from about 600 W/kg to about 9900 W/kg, about 700 W/kg to about 9800 W/kg, about 800 W/kg to about 9700 W/kg, about 900 W/kg to about 9600 W/kg, about 1000 W/kg to about 9500 W/kg, about 1100 W/kg to about 9400 W/kg, about 1200 W/kg to about 9300 W/kg, about 1300 W/kg to about 9200 W/kg, about 1400 W/kg to about 9100 W/kg, about 1500 W/kg to about 9000 W/kg, about 1600 W/kg to about 8900 W/kg, about 1700 W/kg to about 8800 W/kg, about 1800 W/kg to about 8700 W/kg, about 1900 W/kg to about 8600 W/kg, about 2000 W/kg to about 8500 W/kg, about 2100 W/kg to about 8400 W/kg, about 2200 W/kg to about 8300 W/kg, about 2300 W/kg to about 8200 W/kg, about 2400 W/kg to about 8100 W/kg, about 2500 W/kg to about 8000 W/kg, about 2600 W/kg to about 7900 W/kg, about 2700 W/kg to about 7800 W/kg, about 2800 W/kg to about 7700 W/kg, about 2900 W/kg to about 7600 W/kg, about 3000 W/kg to about 7500 W/kg, about 3100 W/kg to about 7400 W/kg, about 3200 W/kg to about 7300 W/kg, about 3300 W/kg to about 7200 W/kg, about 3400 W/kg to about 7100 W/kg, about 3500 W/kg to about 7000 W/kg, about 3600 W/kg to about 6900 W/kg, about 3700 W/kg to about 6800 W/kg, about 3800 W/kg to about 6700 W/kg, about 3900 W/kg to about 6600 W/kg, about 4000 W/kg to about 6500 W/kg, about 4100 W/kg to about 6400 W/kg, about 4200 W/kg to about 6300 W/kg, about 4300 W/kg to about 6200 W/kg, about 4400 W/kg to about 6100 W/kg, about 4500 W/kg to about 6000 W/kg, about 4600 W/kg to about 5900 W/kg, about 4700 W/kg to about 5800 W/kg, about 4800 W/kg to about 5700 W/kg, about 4900 W/kg to about 5600 W/kg, about 5000 W/kg to about 5500 W/kg, about 5100 W/kg to about 5400 W/kg, or about 5200 W/kg to about 5300 W/kg. The power density may be influenced by the optimized pore structure and the efficient ion transport provided by the electrolyte.

In certain aspects, the disclosed NSPGs may demonstrate a rapid charging and discharging with C-rates ranging from about 10 to about 100. For example, the C-rate may be from about 20 to about 90, about 30 to about 80, about 40 to about 70, or about 50 to about 60.

In some aspects, the disclosed NSPG electrodes may be used in coin cells. The coulombic efficiency of the coin cell may be relatively high, ranging from about 95% to about 99%. For example, the coulombic efficiency may be about 98%, about 96%, about 97% about 98% or about 99%. This is attributable to the optimized pore structure, enhanced conductivity from nitrogen and sulfur co-doping, efficient ion transport, and the strong electrochemical interactions between the electrode materials and the electrolyte.

In some aspects, the coin cell battery may operate in a voltage range from about 2.0 V to about 5.0 V, about 2.5 V to about 5.0 V, about 2.0 V to about 4.2 V, or about 2.5 V to about 4.2 V. For example, the voltage range may be about 2.1 V to about 4.9 V, about 2.2 V to about 4.8 V, about 2.3 V to about 4.7 V, about 2.4 V to about 4.6 V, about 2.5 V to about 4.5 V, about 2.6 V to about 4.4 V, about 2.7 V to about 4.3 V, about 2.8 V to about 4.2 V, 2.9 V to about 4.1 V, about 3.0 V to about 3.9 V, about 3.1 V to about 3.8 V, about 3.2 V to about 3.7 V, or about 3.3 V to about 3.6 V, or about 3.4 V to about 3.5 V. In some embodiments, the voltage may be from 2.5 V to 4.2 V.

Notably, the voltage of the disclosed coin cell battery may be higher than 3.6 V lithium-ion coin cell batteries. In some embodiments, the voltage may be ≥4.3 V, ≥4.2 V, ≥4.1 V, ≥4.0 V, ≥3.9 V, ≥3.8 V, or ≥3.7 V.

In some aspects, the disclosed coin cell battery may have a 60-170% increase in energy density compared to 3.6 V lithium-ion coin cell batteries. For example, the increase in energy density range from about 60% to about 170%, about 65% to about 165%, about 70% to about 160%, about 75% to about 155%, about 80% to about 150%, about 85% to about 145%, about 90% to about 140%, about 95% to about 135%, about 100% to about 130%, about 105% to about 125%, about 110% to about 120%, or about 112% to about 115%.

In some aspects, the disclosed coin cell battery may have a capacity ranging from about 30 mAh to about 90 mAh. For example, the capacity may range from about 35 mAh to about 85 mAh, about 40 mAh to about 80 mAh, or about 45 mAh to about 75 mAh, about 50 mAh to about 70 mAh, or about 55 mAh to about 65 mAh.

Methods of Making Doped Porous Graphene Material

The present disclosure also includes methods of making doped porous graphene electrodes. The method includes a metal foam template. The metal foam serves as a hard template, providing a structure for a hydrogel to form upon. The metal foam template is later removed through an etching process, leaving behind the doped porous graphene electrode material. In some aspects, the electrode material is co-doped nitrogen and sulfur porous graphene.

The electrodes may be made by dip coating. The process may start with preparing a slurry or ink that includes the electrode material, a binder, and a solvent. A clean substrate, typically a metal foil, may then be dipped into the slurry. Upon withdrawing the substrate, the speed may affect the thickness and uniformity of the coating. Slow withdrawal may lead to thicker coatings, and faster withdrawal may result in thinner ones. After this, the substrate may be left to dry, allowing the solvent to evaporate and leave a thin film of the active material and binder on the substrate. The electrode may undergo post-treatments like annealing or calendaring to improve its properties. Finally, the coated substrate may be cut into desired shapes and sizes. While simple and controllable, dip coating might not suit all electrode materials and may be slower and less scalable than other methods.

FIG. 1 shows a method of making doped porous graphene electrode materials. The method 100 includes dispersing graphene oxide in a solvent 102 and ultrasonicating the graphene oxide and the solvent for a first specified time forming a first solution 104; dissolving a binder in an acid solution forming a second solution 106; mixing and heating the second solution to a first temperature for a second specified time; adding a dopant source into the second solution forming a third solution 108; mixing the third solution; adding the first solution into the third solution forming a fourth solution 110; mixing the fourth solution for a third specified time; cutting metal foam into specified shapes and sizes forming a cut metal foam 112; dipping the cut metal template into the fourth solution forming a uniformly coated metal foam 114; adding a cross-linking agent to the uniformly coated metal template to cross-link the nitrogen dopant forming a hydrogel-coated metal foam 116; treating the hydrogel-coated metal foam with liquid nitrogen and freeze-drying at a second temperature and a first pressure forming a freeze-dried hydrogel-coated metal foam 118; carbonizing the freeze-dried hydrogel-coated metal foam 120; dissolving the metal foam template in an etchant forming the electrode material 122; washing the electrode material with ultrapure water 124; and drying the electrode material to obtain dried electrode material 124.

Referring to step 102 in FIG. 1, the method 100 of making doped porous graphene includes preparing a solution of graphene oxide in water (solution 1). The water may be deionized water. In some embodiments, the graphene oxide used has an average molecular weight ranging from about 10,000 g/mol to about 30,000 g/mol. For example, the molecular weight may range from about 11,000 g/mol to about 29,000 g/mol, from about 12,000 g/mol to about 28,000 g/mol, from about 13,000 g/mol to about 27,000 g/mol, from about 14,000 g/mol to about 26,000 g/mol, from about 15,000 g/mol to about 25,000 g/mol, from about 16,000 g/mol to about 24,000 g/mol, from about 17,000 g/mol to about 23,000 g/mol, from about 18,000 g/mol to about 22,000 g/mol, or from about 19,000 to about 21,000 g/mol. In one embodiment, the average molar mass of the graphene oxide may be about 12,000 g/mol. The molar mass of graphene oxide may vary depending on the synthesis method and degree of oxidation. The next step of the method involves ultrasonicating the solution of graphene oxide in water for a first specified time 104. The first specified time under ultrasonication may range from about 1 hour to about 4 hours. For example, the time may range from about 1.2 hours to about 3.8 hours, about 1.4 hours to about 3.6 hours, about 1.6 hours to about 3.4 hours, about 1.8 hours to about 3.2 hours, about 2.0 hours to about 3.0 hours, about 2.2 hours to about 2.8 hours, or about 2.4 hours to about 2.6 hours. In one embodiment, the first specified time may be 2 hours.

Referring to step 106 in FIG. 1, concurrently, the method includes forming a solution of a binder in an acidic solution (solution 2) at first temperature for a second specified time. The first temperature ranges from about 40° C. to about 60° C. For example, the temperature may be from about 41° C. to about 59° C., about 42° C. to about 58° C., about 43° C. to about 57° C., about 44° C. to about 56° C., about 45° C. to about 55° C., about 46° C. to about 54° C., about 47° C. to about 53° C., about 48° C. to about 52° C., about 49° C. to about 53° C., or about 50° C. to about 52° C. In one embodiment, the temperature may be 45° C.

The second specified time may range from about 0.5 hour to about 2 hours. For example, the time may range from about 0.6 hours to about 1.9 hours, about 0.7 hours to about 1.8 hours, about 0.8 hours to about 1.7 hours, about 0.9 hours to about 1.6 hours, about 1.0 hours to about 1.5 hours, about 1.1 hours to about 1.4 hours, or about 1.2 hours to about 1.2 hours. This duration may allow sufficient time for the binder to completely dissolve, ensure a uniform distribution of the binder, and for the mixture to become homogeneous and transparent.

The acidic solution may be about 1 vol % to about 10 vol %, about 2 vol % to about 9 vol %, about 3 vol % to about 8 vol %, about 4 vol % to about 7 vol %, or about 5 vol % to about 6 vol %. In one embodiment, the acidic solution may be 2 vol %.

Suitable binders include but are not limited to biopolymers, polyvinyl alcohol (PVA), poly(vinylidene fluoride) (PVDF), and carboxymethyl cellulose (CMC). The binder choice depends on the desired compatibility, adhesion, film-forming, and stability considerations of the resulting electrode material and electrode. In one embodiment, the binder is chitosan, a biopolymer derived from chitin. The molar mass of chitosan may vary depending on the degree of deacetylation and the specific source of chitosan. The molecular weight of the chitosan may range from about 300,000 g/mol to about 500,000 g/mol. For example, the molecular weight may be from about 350,000 g/mol to about 450,000 g/mol or about 400,000 g/mol to about 425,000 g/mol. In one embodiment, the molecular weight of the chitosan may be 400,000 g/mol.

Suitable acids to form the acidic solution include but are not limited to any one of acetic acid, formic acid, hydrochloric acid, citric acid, or combinations thereof. These acids possess the ability to solubilize binders effectively, allowing for the formation of a homogenous binder solution. The selection of the specific acid should consider factors such as compatibility with the experimental conditions, desired pH, and potential impact on the overall synthesis process. In one embodiment, the acidic solution is a solution of acetic acid. In another embodiment, the acidic solution is a 2 vol % acetic acid solution.

The pH of the binder solution ranges from about 4 to about 6. This range ensures a mildly acidic environment, which is favorable for the dissolution and homogenous blending of binders such as chitosan. For example, the pH may be from about 4.1 to about 5.9, about 4.2 to about 5.8, about 4.3 to about 5.7, about 4.4 to about 5.6, about 4.5 to about 5.5, about 4.6 to about 5.4, about 4.7 to about 5.3, about 4.8 to about 5.2, or about 4.9 to about 5.1.

Referring to step 108 in FIG. 1, dopants may be added to the binder solution. After the addition of the dopant, the solution may be mixed thoroughly to form a binder-dopant-mixture (solution 3). Dopants in 108 are elements or compounds that may modify the electrochemical property of graphene. For example, dopants include but as not limited to compounds containing nitrogen, sulfur, boron, phosphorous, or transition metals such as iron. Examples of suitable dopants include thiourea, thioacetamide, sodium sulfide, urea, melamine, or combinations thereof. The specific choice of dopants depends on the desired properties and performance requirements of the doped porous graphene electrode material. In one embodiment, the dopant may be thiourea. Thiourea may serve as a cost-effective source for nitrogen and sulfur dopants compared to other doping agents.

Referring to step 110 in FIG. 1, the graphene oxide solution may be added to the binder-dopant-mixture and stirred for third specified time to form a graphene oxide-binder-dopant solution (solution 5). The third specified time may range from about 0.5 hour to about 4 hours. For example, the time may be about 0.5 hours to about 3.5 hours, about 1 hours to about 3 hours, about 1.5 hours to about 2.5 hours, or about 1 hour to about 2 hours. In one embodiment, the time is 2 hours.

Referring to step 112 in FIG. 1, metal foam may be cut into desired shapes and sizes. Metal foams are porous metallic substrates. Suitable metal foams include not are not limited to any one of nickel foam, copper foam, aluminum foam, or titanium foam. The choice of the metal foam depends on factors such as electrical conductivity, mechanical strength, corrosion resistance, and compatibility with the doped porous electrode material. In one embodiment, the metal foam is nickel foam. The use of nickel foam as a hard template ensures that the doped porous graphene electrode material conforms to the desired shape and size, while also imparting a porous and interconnected structure.

In some aspects, common shapes for metal foam include sheets, discs, cylinders, or custom geometries based on the specific needs of the experiment or device. The sizes may vary depending on the application, ranging from a few centimeters to larger dimensions. The exact desired shapes and sizes of the cut metal foam depends on the specific use.

Referring to step 114 in FIG. 1, the cut metal foam may be dipped into graphene oxide-binder-dopant solution to form a coated metal foam 114. The process of dipping the metal foam into the graphene oxide-binder-dopant solution may involve submerging the foam into the solution to ensure a uniform coating on its surface. The exact dipping technique may vary depending on the device requirements. In some aspects, tweezers or other tools may be used to hold the metal foam piece and immerse it fully in the graphene oxide-binder-dopant solution. After dipping, any excess solution may be removed by gently shaking or tapping the foam to ensure an even coating without excess liquid. The dipping process may achieve uniform coverage of the metal foam surface with the graphene oxide-binder-dopant. The dipping method allows for a more uniform and controllable deposition of the hydrogel on the metal foam template, because the dipping process may be easily controlled to achieve a uniform coating of the hydrogel on the metal foam template. This uniformity may be crucial for the performance of the final product, as it may ensure that hydrogels are evenly distributed across the template, leading to a more efficient and effective energy storage device. In one embodiment, the dipping process results in the formation of chitosan-coated graphene oxide mixture on a nickel foam.

Referring to step 116 in FIG. 1, a cross-linking agent may be added to the metal foam surface with the graphene oxide-binder-dopant to form a hydrogel-coated metal form. Cross-linking agents may be aldehyde containing compounds. Examples of suitable aldehydes include but are not limited to glutaraldehyde, formaldehyde, glyoxal, or similar compounds. These aldehydes may provide cross-linking functionality to the graphene oxide-binder-dopant solution, facilitating the formation of a hydrogel on the metal foam surface. The specific choice of alternative aldehyde may depend on factors such as desired cross-linking efficiency, compatibility with the other components, and the intended application of the doped porous graphene electrode.

In some embodiments, the cross-linking agent is glutaraldehyde. Glutaraldehyde acts as a cross-linking agent by forming covalent bonds between binder molecules, creating a stable hydrogel on the metal foam template. Other suitable cross-linking agents include formaldehyde (methanal) and glyoxal, which may also facilitate cross-linking reactions with binders. In some embodiments, the dopant is thiourea. In some embodiments, the binder is chitosan. Glutaraldehyde is a cross-linking agent that may react with chitosan to form a stable hydrogel on the metal foam template. In other embodiments, the hydrogel-coated metal foam is a hydrogel-coated nickel foam. The use of chitosan, a biopolymer, as a binder and hydrogel former, combined with thiourea as the source of nitrogen and sulfur dopants, results in an environmentally friendly and cost-effective approach to fabricating nitrogen and sulfur doped porous graphene electrodes.

Referring to step 118 in FIG. 1, the hydrogel-coated metal foam may be freeze dried in a freeze dryer by treating with liquid nitrogen at second temperature and first pressure. A freeze dryer may remove water in solid phase from hydrogel-coated metal foam by sublimation. It may be important to follow the specified process of removing solid phase water from the hydrogel-coated metal foam through freeze-drying. The process of freeze-drying involves sublimation, which is the transition of a substance from the solid phase directly to the gas phase without passing through the liquid phase. Water in the disclosed hydrogel-coated metal foams undergoes sublimation during freeze-drying, where it transforms from solid ice to water vapor without transitioning to the liquid state. This sublimation process helps preserve the porous structure of the hydrogel and maintain the desired porosity of the doped porous graphene electrode. Alternative methods of water removal, such as evaporation or thermal drying, may result in collapsed or distorted porous structures, leading to compromised performance of the doped porous graphene electrode. Therefore, adhering to the freeze-drying process is crucial to maintain the desired porosity and structural integrity of the electrode.

The second temperature ranges from about −60° C. to about −30° C. For example, the temperature may range from about −58° C. to about −32° C., −56° C. to about −34° C., −54° C. to about −36° C., −52° C. to about −38° C., −50° C. to about −40° C., −48° C. to about −42° C., or −46° C. to about −44° C. In one embodiment, the freeze dry temperature is −50° C. The specified temperature range during freeze-drying is important. Deviating from this temperature range may impact the successful sublimation of water from the hydrogel-coated metal foam. A lower temperature may result in incomplete water removal, while a higher temperature may lead to excessive drying or even melting, compromising the desired porous structure. Thus, maintaining the specified temperature of about −50° C. ensures the proper sublimation of water and preserves the integrity of the doped porous graphene electrodes' porosity.

The first pressure may be from about 1 Pa to about 15 Pa. For example, the pressure may be from about 2 Pa to about 14 Pa, about 2 Pa to about 13 Pa, about 3 Pa to about 12 Pa, about 4 Pa to about 11 Pa, about 5 Pa to about 10 Pa, about 6 Pa to about 9 Pa, or about 7 Pa to about 8 Pa. In one embodiment, the pressure may be 10 Pa. The pressure in freeze-drying may play a crucial role in the sublimation process. A lower pressure could result in inadequate water removal, while a higher pressure may impede the sublimation process or cause undesired effects on the hydrogel structure. Adhering to the specified pressure of about 10 Pa ensures optimal conditions for sublimation, maintaining the integrity of the porous structure and preserving the desired properties of the doped porous graphene electrode.

Referring to step 120 in FIG. 1, the freeze-dried hydrogel coated metal foam may be carbonized in a furnace to form graphene from graphene oxide. The carbonizing step involves heating the freeze-dried hydrogel coated metal foam in an inert atmosphere at a suitable temperature and a suitable pH for a specified time. The furnace may be heated at a ramp rate ranging from about 2° C./min to about 7° C./min. For example, the ramp rate may be from about 2.5° C./min to about 6.5° C./min, about 3° C./min to about 6° C./min, about 3.5° C./min to about 5.5° C./min, about 4° C./min to about 5° C./min, or about 4.5° C./min to about 4.7° C./min. In one embodiment, the ramp rate may be 5° C./min. The suitable temperature ranges from about 750° C. to about 850° C. For example, the temperature may be from about 760° C. to about 840° C., about 750° C. to about 830° C., about 760° C. to about 820° C., about 770° C. to about 810° C., about 780° C. to about 800° C., or about 790° C. to about 795° C. In one embodiment, the temperature may be 800° C. The suitable pH may range from about 8.5 to about 9.5. For example, the pH may range from about 8.6 to about 9.4, about 8.7 to about 9.3, about 8.8 to about 9.2, or about 8.9 to about 9.1. The time ranges from about 1.5 hours to about 4 hours. For example, the time may be 2 hours to about 3.5 hours, 2.5 hours to about 3 hours, or about 2.7 hours to about 2.9 hours. In one embodiment, the time may be 2 hours. In some aspects, the inert atmosphere is an atmosphere of any one of nitrogen, helium, argon, or combinations thereof. In one embodiment, the inert atmosphere may be nitrogen.

The pH may enable the interaction between nitrogen and sulfur sources with the precursor material. This interaction may promote the formation of active functional groups. These functional groups may directly contribute to uniform ion diffusion and the stable cycling performance resulting in a consistent capacity retention and high coulombic efficiency. The carbonization temperature range of 750-850° C. may be effective in producing materials with the desired structural and electrochemical properties. This range may support a controlled reduction process that creates a graphitized carbon framework, enhancing conductivity and ensuring consistent doping.

Referring to step 122 in FIG. 1, the metal template may be dissolved in a suitable etchant at an appropriate concentration and temperature to remove the metal template from the electrode material. Examples of suitable etchants include but are not limited to any one of aqua regia, nitric acid, hydrochloric acid, sulfuric acid, or combinations thereof. Nitric acid and sulfuric acid may be used at a concentration ranging from about 10 vol % to about 50 vol %. Hydrochloric acid may be used at a concentration ranging from about 10 vol % to about 40 vol %. The choice of etchant depends on factors such as etching rate, selectivity, safety, and compatibility with the doped porous graphene material. The appropriate temperature ranges from room temperature to moderately elevated of about 50° C. For example, the temperature may range from about 25° C. to about 45° C., about 30° C. to about 40° C., or about 35° C. to about 38° C. Specific concentrations and temperatures should be determined based on optimization and safety considerations.

Referring to step 124 in FIG. 1, the last step of the method includes washing the electrode material with a solvent followed by drying the electrode material in an oven at a suitable temperature for a suitable time. may be to recover the electrode material by washing. Examples of solvents that may be used for the washing step include but are not limited to water, ethanol, acetone, or combinations thereof. In one embodiment, deionized water may be used in the washing step. Water is commonly used to wash the obtained doped porous graphene electrode material due to its ability to remove residual impurities and ensure cleanliness. The choice of solvent depends on the solubility of impurities and compatibility with the doped porous graphene electrode material.

After washing, doped porous graphene electrode materials may be dried in an oven at a temperature ranging from about 70° C. to about 90° C. to obtain the doped porous graphene electrode material. For example, the temperature may be about 75° C. to about 85° C., or about 80° C. to about 83° C. In one embodiment, the temperature is 80° C. In some embodiments, the doped porous graphene is nitrogen and sulfur porous graphene electrode material.

In some aspects, the purity of the doped porous graphene is greater than 90%. The purity may be greater than about 91%, about 92%, about 93%, about 94%, about 95%, about 96%, about 97%, about 98%, or about 99%. In one embodiment, the purity is greater than 95%.

In some aspects, the final liquid content in the doped porous graphene may be less than 1 wt %. The final liquid content may be less than 0.9 wt %, less than 0.8 wt %, less than 0.7 wt %, less than 0.6 wt %, less than 0.5 wt %, less than 0.4 wt %, less than 0.3 wt %, less than 0.2 wt %, or less than 0.1 wt %. In some embodiments, the liquid may be one of more of deionized water, 2 vol % acetic acid, or glutaraldehyde.

In certain aspects, the final particle size of the doped porous graphene electrode material ranges from about 5 nm to about 50 nm. For example, the particle size may be about 10 nm to about 45 nm, about 15 nm to about 40 nm, about 20 nm to about 35 nm, or about 25 nm to about 30 nm.

In some aspects, use of chitosan, a biopolymer derived from chitin, as a binder and hydrogel former is more environmentally friendly compared to the use of toxic binders and solvents in conventional electrode fabrication. Additionally, thiourea may serve as a cost-effective source for nitrogen and sulfur dopants compared to other doping agents.

In certain aspects, nitrogen and sulfur co-doping of the porous graphene material results in enhanced electrical conductivity, increased active site density, and modulated electronic structure, all contributing to improved electrochemical performance. This advantage may be demonstrated by the NSPG electrode's high energy and power density, rapid charging and discharging capabilities, and excellent electrochemical stability.

In some aspects, the freeze-drying and carbonization process employed in the synthesis of NSPG electrode material may create a highly porous structure with interconnected pores. This porous architecture facilitates efficient ion diffusion and charge transport, which is important for high-performance energy storage devices and electrochemical sensors.

In some aspects, the disclosed fabrication method may be adapted for various applications, such as lithium-ion batteries, supercapacitors, and electrochemical sensors. The process may be optimized and customized depending on the desired application, offering greater flexibility in electrode design and performance.

In other aspects, use of metal foam as a hard template not only ensures that the NSPG electrode material conforms to the desired shape and size but also imparts a porous and interconnected structure. This template-assisted approach allows for better control over the final electrode's morphology, which may be crucial for achieving optimal electrochemical performance.

The disclosed NSPG electrode fabrication method offers advancements over current technologies in terms of environmental friendliness, cost-effectiveness, improved electrochemical performance, versatility, and adaptability. These advantages make the NSPG electrode an attractive option for a wide range of applications in energy storage, conversion, and sensing technologies.

The performance metrics described above indicate that the disclosed method of simultaneous synthesis and shaping of NSPGs on metal-foam template may result in higher electrochemical performance compared to an electrode that is shaped after the synthesis of the material. The uniform coating, structural integrity, and efficient use of materials provided by the disclosed method contribute to these enhanced performance metrics.

Cathode Material—Doped Polyol Reduced Graphene

The cathode material may include a doped polyol reduced graphene. The cathode material may be formed by reducing graphene oxide in the presence of a suitable reducing agent and solvent. The reducing agent and the solvent may be the same compound. Polyols may function as both reducing agents and solvents. Examples of suitable polyols include triethylene glycol (TEG), ethylene glycol (EG), glycerol, or combinations thereof.

The polyol reduced graphene of the cathode material of the present disclosure may be doped with one, two, or more dopants. Likewise, the polyol reduced graphene of the cathode material of the present disclosure may be doped a plurality of dopants. The electrochemical properties of the resulting cathode may be controlled by doping the polyol reduced graphene of the cathode material. The electrochemical properties include energy density, specific capacity, rate capability, cycling stability, or a combination thereof. For example, nitrogen doping may improve electronic conductivity. Furthermore, sulfur doping may enhance capacity by facilitating additional charge storage mechanisms.

In some aspects, the cathode material may be doped with two or more dopants. For example, the polyol reduced graphene may be doped with 2 dopants, 3 dopants, 4 dopants, or 5 dopants. The dopants may be incorporated into the graphene. Examples of suitable dopants include but are not limited to nitrogen, sulfur, boron, phosphorous, or various transition metals such as iron. In some embodiments of the cathode material, the polyol reduced graphene is co-doped with nitrogen and sulfur.

The particle size of the doped polyol reduced graphene of the cathode material ranges from about 100 nm to about 10 µm. For example, the particle size may be from about 150 nm to about 9.5 µm, about 200 nm to about 9.0 µm, 250 nm to about 8.5 µm, about 300 nm to about 8.0 µm, 350 nm to about 7.5 µm, about 400 nm to about 7.0 µm, 450 nm to about 6.5 µm, about 500 nm to about 6.0 µm, 550 nm to about 5.5 µm, about 600 nm to about 5.0 µm, 650 nm to about 4.5 µm, about 700 nm to about 4.0 µm, 750 nm to about 3.5 µm, about 800 nm to about 3.0 µm, 850 nm to about 2.5 µm, about 900 nm to about 2.0 µm, 950 nm to about 1.5 µm, or about 1 µm to about 1.25 µm. In another aspect, the particle size range is a wide range that includes sizes typical of both individual graphene sheets (usually on the order of 1 µm or less) and small aggregates or bundles of sheets (which may be from about 10 µm to about 100 µm, or larger).

In certain aspects, the energy density, specific capacity, and cycling stability of the doped polyol reduced graphene may be measured by analytical techniques including but not limited to cyclic voltammetry, galvanostatic charge/discharge cycling, and electrochemical impedance spectroscopy. In some aspects, the cathode materials exhibit increased energy density, higher specific capacity, and improved cycling stability relative to traditional cathode materials such as lithium cobalt oxide ($LiCoO_2$) or lithium iron phosphate ($LiFePO_4$). For instance, typical $LiCoO_2$ has a specific capacity of about 140 mAh/g to about 150 mAh/g and energy density of about 400 Wh/kg to about 500 Wh/kg.

In certain aspects, the doped polyol reduced graphene cathode material exhibits an energy density ranging from greater than about 500 Wh/kg, greater than about 550 Wh/kg, greater than about 600 Wh/kg, greater than about 650 Wh/kg, greater than about 700 Wh/kg, greater than about 750 Wh/kg, greater than about 800 Wh/kg, greater than about 850 Wh/kg, greater than about 900 Wh/kg, greater than about 950 Wh/kg, greater than about 1000 Wh/kg, greater than about 1000 Wh/kg, greater than about 1100 Wh/kg, greater than about 1150 Wh/kg, greater than about 1200 Wh/kg, or greater than about 1250 Wh/kg. In another aspect the doped polyol reduced graphene cathode material exhibits an energy density ranging from greater than about 500 Wh/kg to about 2500 Wh/kg For example, the energy density may be from about 505 Wh/kg to about 2450 Wh/kg, about 550 Wh/kg to about 2400 Wh/kg, about 600 Wh/kg to about 2350 Wh/kg, about 650 Wh/kg to about 2300 Wh/kg, about 700 Wh/kg to about 2250 Wh/kg, about 750 Wh/kg to about 2200 Wh/kg, about 800 Wh/kg to about 2150 Wh/kg, about 850 Wh/kg to about 2100 Wh/kg, about 900 Wh/kg to about 2050 Wh/kg, about 950 Wh/kg to about 2000 Wh/kg, about 1000 Wh/kg to about 1950 Wh/kg, about 1100 Wh/kg to about 1900 Wh/kg, about 1150 Wh/kg to about 1850 Wh/kg, about 1200 Wh/kg to about 1800 Wh/kg, about 1250 Wh/kg to about 1750 Wh/kg, about 1300 Wh/kg to about 1700 Wh/kg, about 1350 Wh/kg to about 1850 Wh/kg, about 1400 Wh/kg to about 1800 Wh/kg, about 1450 Wh/kg to about 1750 Wh/kg, about 1500 Wh/kg to about 1700 Wh/kg, or about 1550 Wh/kg about 1650 Wh/kg. In some embodiments, the energy density may be from about 510 Wh/kg to about 700 Wh/kg, 520 Wh/kg to about 800 Wh/kg, 530 Wh/kg to about 900 Wh/kg, or 540 Wh/kg to about 1000 Wh/kg. In some embodiments, the energy density may be from about 600 Wh/kg to about 800 Wh/kg. In some embodiments, the energy densities may be from about 500.0 Wh/kg to about 550.0 Wh/kg, from about 500.0 Wh/kg to about 540.0 Wh/kg, or from about 504.4 Wh/kg to about 537.9 Wh/kg. The higher energy density relative to lithium-based cathode material indicates the compactness of the system.

In certain aspects, the doped polyol reduced graphene cathode material may have a specific capacity of ranging from about 200 mAh/g to about 750 mAh/g. For example, the specific capacity may be from about 210 mAh/g to about 740 mAh/g, about 220 mAh/g to about 730 mAh/g, about 230 mAh/g to about 720 mAh/g, about 240 mAh/g to about 710 mAh/g, about 250 mAh/g to about 700 mAh/g, about 260 mAh/g to about 690 mAh/g, about 270 mAh/g to about 680 mAh/g, about 280 mAh/g to about 670 mAh/g, about 290 mAh/g to about 660 mAh/g, about 300 mAh/g to about 650 mAh/g, about 310 mAh/g to about 640 mAh/g, about 320 mAh/g to about 630 mAh/g, about 330 mAh/g to about 620 mAh/g, about 340 mAh/g to about 610 mAh/g, about 350 mAh/g to about 600 mAh/g, about 360 mAh/g to about 590 mAh/g, about 370 mAh/g to about 580 mAh/g, about 380 mAh/g to about 570 mAh/g, about 390 mAh/g to about 560 mAh/g, about 400 mAh/g to about 550 mAh/g, about 410 mAh/g to about 540 mAh/g, about 420 mAh/g to about 530 mAh/g, about 430 mAh/g to about 520 mAh/g, about 440 mAh/g to about 510 mAh/g, about 450 mAh/g to about 500 mAh/g, about 460 mAh/g to about 490 mAh/g, or about 470 mAh/g to about 480 mAh/g. In some embodiments, the specific capacity may be from about 200 mAh/g to about 300 mAh/g. In other embodiments, the specific capacity may be from about 300 mAh/g to about 400 mAh/g. In yet other embodiments, the specific capacity may be about 300 mAh/g or greater.

In certain aspects, the doped polyol reduced graphene cathode material has a capacity retention of greater than 70% over a number of charge/discharge cycles. The number of cycles may be about 300, about 350, about 400, about 450, about 500, about 550, about 600, about 650, or about 700. The greater than 70% capacity retention reflects the materials the long-term durability. For example, the capacity retention may range from about 70% to about 95%, about 75% to about 90%, or about 80% to about 85% over 500 charge/discharge cycles. In one or more embodiments, the capacity retention over 500 cycles may be greater than about 70%, about 75%, about 80%, about 85%, about 90% or about 95%. The capacity retention may be attributed to the synergistic effects of controlled sulfur doping and optimized oxygen content, which may stabilize redox reactions and may reduce degradation.

In certain aspects, the doped polyol reduced graphene cathode material may have an electronic conductivity ranging from on the order of about $9.0 \times 10^3$ S/cm to about $0.5 \times 10^4$ S/cm, about $7.5 \times 10^3$ S/cm to about $0.5 \times 10^4$ S/cm, about $5.0 \times 10^3$ S/cm to about $0.5 \times 10^4$ S/cm, about $3.0 \times 10^3$ S/cm to about $1.0 \times 10^4$ S/cm, or about $1.0 \times 10^3$ S/cm to about $1.0 \times 10^4$ S/cm. In some embodiments, the electronic conductivity ranges from about $9.0 \times 10^3$ S/cm to about $1.0 \times 10^4$ S/cm. In some embodiments, the electronic conductivity ranges from about $7.5 \times 10^3$ S/cm to about $9.0 \times 10^3$ S/cm. In some embodiments, the electronic conductivity ranges from about $5.0 \times 10^3$ S/cm to about $7.5 \times 10^3$ S/cm. In some embodiments, the electronic conductivity ranges from about $3.0 \times 10^3$ S/cm to about $5 \times 10^3$ S/cm. In some embodiments, the electronic conductivity ranges from about $1.0 \times 10^3$ S/cm to about $3.0 \times 10^3$ S/cm. In some embodiments, the electronic conductivity ranges from about $7.5 \times 10^3$ S/cm to about $1.0 \times 10^4$ S/cm. In some embodiments, the electronic conductivity ranges from about $3.0 \times 10^3$ S/cm to about $7.5 \times 10^3$ S/cm. In some embodiments, the electronic conductivity ranges from about $1.0 \times 10^3$ S/cm to about $5 \times 10^3$ S/cm. This electronic conductivity may enable efficient electron transfer during battery operations.

Cathode Material—Co-Doped Triethylene Glycol Reduced Graphene

Triethylene glycol (TEG) is of particular interest because TEG has superior reducing capability and provides better control over the reduction process of graphene oxide relative to other polyols. In some embodiments of the present disclosure the polyol of the cathode material is TEG.

In some embodiments of the cathode material a TEG reduced graphene (TRG) is co-doped with nitrogen (N) and sulfur (S). The nitrogen and sulfur atoms may be incorporated in the form of pyridinic, pyrrolic, graphitic, and thiophenic configurations, which contribute to enhanced electrochemical performance. Co-doping of nitrogen and sulfur may result in synergistic effects resulting to the enhanced performance from both elements' combined doping. Nitrogen doping typically improves electronic conductivity, while sulfur doping enhances capacity by facilitating additional charge storage mechanisms. When co-doped, these effects may complement each other, leading to significantly improved electrochemical performance compared to single doping. The most desirable configuration may depend on the specific application. Pyridinic and pyrrolic nitrogen tend to contribute to higher capacity due to their additional lithium storage sites. Graphitic nitrogen may improve conductivity. Pyridinic nitrogen may increase lithium-ion adsorption sites. Thiophenic sulfur peaks may highlight the redox-active sites that may contribute to cycling stability and may boost capacity too.

The chemical structure, chemical formula, and molecular weight of polyol reduced graphene of the cathode material may vary depending on the specific synthesis conditions and doping concentrations. In some embodiments, nitrogen and sulfur doping levels (percent by weight) range from about 2% to about 10% and about 0.1% to about 5%, respectively. For example, the nitrogen level may be from about 2.5% to about 9.5%, about 3.0% to about 9.0%, 3.5% to about 8.5%, about 4.0% to about 8.0%, 4.5% to about 7.5%, about 5.0% to about 7.0%, 5.5% to about 6.5%, or about 6.0% to about 6.5%. In some embodiments, the nitrogen doping level may range from about 4.5% to about 6.5%, about 4.6% to about 6.4%, about 4.7% to about 6.3%, about 4.8% to about 6.2%, about 4.9% to about 6.1%, about 5.0% to about 6.0%, about 5.1% to about 5.9%, about 5.2% to about 5.8%, about 5.3% to about 5.7%, or about 5.4% to about 5.6%. For example, the sulfur level may be from about 0.1% to about 4.5%, about 0.2% to about 4.0%, 0.5% to about 3.5%, about 1.0% to about 3.0%, about 1.5% to about 2.5%, or about 2.0% to about 2.3%. In some embodiments, the sulfur doping level may be from about 1.0% to about 2.5%, about 1.1% to about 2.4%, about 1.2% to about 2.3%, about 1.3% to about 2.2%, about 1.4% to about 2.1%, about 1.5% to about 2.0%, about 1.6% to about 1.9%, or about 1.7% to about 1.8%. The amount of oxygen (percent by weight) in the polyol reduced graphene of the cathode material may range from about 25% to about 40%. For example, the amount of oxygen may range from about 26% to about 39%, about 27% to about 38%, about 28% to about 37%, about 29% to about 36%, about 30% to about 35%, about 31% to about 34%, or about 32% to about 33%. Controlled oxygen content of 25-40% may enhance wettability, reduce parasitic reactions, and improve solid electrolyte interphase (SEI) stability.

These dopants may modulate the electronic structure, improve conductivity, and increase the number of active sites for charge storage and redox reactions, resulting in improved energy storage capacity and electrochemical performance compared to undoped graphene materials.

The co-doped TRG of the present disclosure may have a multi-component chemical structure, including graphene oxide, nitrogen, and sulfur. The chemical structure, molecular weight, and particle size may be controlled by varying the ratio of dopants, synthesis procedure, or a combination thereof.

The chemical formula of the cathode material of the present disclosure is $C_xH_yO_zN_mS_n$, where x, y, z, m, and n are integers or decimal numbers. In the formula, x ranges from about 1 to about 10, y is about 1 to about 20, z is about 0 to about 5, m is greater than 0 to about 15, and n is greater than 0 to about 15. X, y, z, m, n may be integers or decimal numbers.

In some embodiments, x ranges from about 1 to about 10, about 1.5 to about 9.5, about 2 to about 9, about 2.5 to about 8.5, about 3 to about 8.0, about 3.5 to about 7.5, about 4 to about 7.0, about 4.5 to about 6.5, or about 5.0 to about 6.0. For example, x may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.75, 9.0, 9.25, 9.5, 9.75, or 10.

In some embodiments, y ranges from about 1 to about 20, about 1.5 to about 19.5, about 2 to about 19, about 2.5 to about 18.5, about 3 to about 18, from about 3.5 to about 17.5, about 4 to about 17, about 4.5 to about 16.5 about 5.0 to about 16, about 5.5 to about 16, about 6.0 to about 15.5, about 6.5 to about 15, about 7.0 to about 14.5, about 7.5 to about 14, about 8 to about 13.5. about 8.5 to about 13, about 9 to about 12.5, about 9.5 to about 12, about 10 to about 11.5, or about 10 to about 10.5. For example, y may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 10, 10.25, 10.5, 10.75, 11, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20.

In some embodiments, z ranges from about 0 to about 5, about 0.5 to about 4.5, about 1 to about 4, about 1.5 to about 3.5, about 2 to about 3.0, or about 2.5 to about 2.75. For example, z may be 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, or 5.0.

In some embodiments, m ranges from about 0.1 to about 15.0, about 0.5 to about 14.5, about 1.0 to about 14.0, about 1.5 to about 13.5, about 2.0 to about 13.0, about 2.5 to about 12.5, about 3.0 to about 12.0, about 3.5 to about 11.5, about 4.0 to about 11.0, about 4.5 to about 10.5, about 5.0 to about 10.0, about 5.5 to about 9.5, about 6.0 to about 9.0, about 6.5 to about 8.5, or about 7.0 to about 8.0. For example, m may be 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.75, 12.8, 12.9, 13.0, 13.1, 13.2, 13.25, 13.3, 13.4, 13.5, 13.6, 13.7, 13.75, 13.8, 13.9, 14.0, 14.1, 14.2, 14.25, 14.3, 14.4, 14.5, 14.6, 14.7, 14.75, 14.8, 14.9, or 15.0.

In some embodiments, n ranges from about 0.1 to about 15.0, about 0.5 to about 14.5, about 1.0 to about 14.0, about 1.5 to about 13.5, about 2.0 to about 13.0, about 2.5 to about 12.5, about 3.0 to about 12.0, about 3.5 to about 11.5, about 4.0 to about 11.0, about 4.5 to about 10.5, about 5.0 to about 10.0, about 5.5 to about 9.5, about 6.0 to about 9.0, about 6.5 to about 8.5, or about 7.0 to about 8.0. For example, n may be 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.75, 12.8, 12.9, 13.0, 13.1, 13.2, 13.25, 13.3, 13.4, 13.5, 13.6, 13.7, 13.75, 13.8, 13.9, 14.0, 14.1, 14.2, 14.25, 14.3, 14.4, 14.5, 14.6, 14.7, 14.75, 14.8, 14.9, or 15.0.

In some aspects of the present disclosure, the cathode material may be a nitrogen and sulfur co-doped TEG reduced graphene. The nitrogen to sulfur (N/S) ratio in the co-doped TEG reduced graphene may be varied to optimize the electrochemical properties of the resulting cathode electrode. The nitrogen to sulfur ratio may range from about 1:1 to about 5:1. For example, the ratio may be 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, 4:1, 4.1:1, 4.2:1, 4.3:1, 4.4:1, 4.5:1, 4.6:1, 4.7:1, 4.8:1, 4.9:1, or 5:1. Ideal ratios may depend on optimization between capacity, stability, and conductivity, and may vary significantly based on experimental conditions and specific battery requirements. The desired ratio may depend on the desired properties of the cathode material, such as its capacity, conductivity, and cycle life.

The chemical formula of the TRG cathode material of the present disclosure is $C_xN_yS_zO_w$, where w, x, y, and z are integers or decimal numbers. In the formula, x ranges from about 1 to about 80, y is about 1 to about 20, w ranges from about 2 to about 40, and z is about 0.01 to about 5.

In some embodiments, x ranges from about 1 to about 80, about 5 to about 75, about 10 to about 70, about 15 to about 65, about 20 to about 60, about 25 to about 55, about 30 to about 50, about 35 to about 45, or about 40 to about 43. For example, x may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80. In some embodiments, x may be 60.

In some embodiments, y ranges from about 1 to about 20, about 1.5 to about 19.5, about 2 to about 19, about 2.5 to about 18.5, about 3 to about 18, from about 3.5 to about 17.5, about 4 to about 17, about 4.5 to about 16.5 about 5.0 to about 16, about 5.5 to about 16, about 6.0 to about 15.5, about 6.5 to about 15, about 7.0 to about 14.5, about 7.5 to about 14, about 8 to about 13.5. about 8.5 to about 13, about 9 to about 12.5, about 9.5 to about 12, about 10 to about 11.5, or about 10 to about 10.5. For example, y may be 1, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 10, 10.25, 10.5, 10.75, 11, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20. In some embodiments, y may be 5.

In some embodiments, z ranges from about 0.01 to about 5, about 0.05 to about 4.5, about 0.1 to about 4, about 0.15 to about 3.5, about 0.2 to about 3.0, about 0.25 to about 2.5, about 0.3 to about 2.0, about 0.35 to about 1.5, about 0.4 to about 1.0, or about 0.45 to about 0.75. For example, z may be 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.25, 1.3, 1.4, 1.5, 1.6, 1.7, 1.75, 1.8, 1.9, 2.0, 2.1, 2.2, 2.25, 2.3, 2.4, 2.5, 2.6, 2.7, 2.75, 2.8, 2.9, 3.0, 3.1, 3.2, 3.25, 3.3, 3.4, 3.5, 3.6, 3.7, 3.75, 3.8, 3.9, 4.0, 4.1, 4.2, 4.25, 4.3, 4.4, 4.5, 4.6, 4.7, 4.75, 4.8, 4.9, or 5.0. In some embodiments, z may be 0.04. TRG cathode materials low sulfur content (0.04) may avoid the instability seen in higher-sulfur materials designed for catalytic applications.

In some embodiments, w ranges from about 2 to about 40, about 3 to about 39, about 4 to about 38, about 5 to about 37, about 6 to about 36, about 6 to about 35, about 7 to about 34, about 8 to about 33, about 9 to about 32, about 10 to about 31, about 11 to about 30, about 12 to about 29, about 13 to about 28, about 14 to about 27, about 15 to about 26, about 16 to about 25, about 17 to about 24, about 18 to about 23, about 19 to about 22, or about 20 to about 21. For example, w may be 2, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0. In some embodiments, w may be 33.

In some embodiments, the chemical formula may be $C_{60}N_5S_{0.04}O_{33}$. The chemical formula highlights optimized sulfur levels and controlled oxygen content, balancing conductivity and structural integrity for lithium-ion cathode performance.

Aspects of the present disclosure includes characterization of the doped polyol reduced graphene by analytical techniques including but not limited to x-ray crystallography (XRD), X-ray photoelectron spectroscopy (XPS), thermal gravimetric analysis (TGA), $^{13}C$ NMR, or Raman spectroscopy.

X-ray Photoelectron Spectroscopy (XPS) is a surface-sensitive quantitative spectroscopic technique that measures the elemental composition, empirical formula, chemical state, and electronic state of the elements within a material. In certain aspects, XPS may be used to measure the elemental composition, chemical state, and electronic state of the co-doped TRG material. The XPS measurements of co-doped TRG material may provide information about its elemental composition, chemical state, and electronic state. XPS analysis may reveal the presence of carbon (C), nitrogen (N), oxygen (O), and sulfur (S) elements in the co-doped triethylene glycol reduced graphene. The binding energies of these elements may be used to determine their chemical bonding and oxidation states. Additionally, XPS spectra may exhibit characteristic peaks corresponding to functional groups or surface contaminants, which may provide insights into the surface chemistry of co-doped TRG.

The elemental scan for the co-doped TRG cathode may confirm the successful co-doping of nitrogen and sulfur into the graphene structure. The relative intensities of the O1s, N1s, C1s, and S2p peaks may provide an estimate of the atomic ratios of these elements in the co-doped TRG. This information may be used to assess the doping level and the influence of these dopants on the electrochemical properties of the electrode. The high-resolution scans of these peaks can reveal the binding energy of the electrons, which is characteristic of the specific element and its chemical state.

FIGS. 10A-10D are an C1s, N1s, O1s, and S2p XPS spectrum obtained by elemental scans from a TRG cathode material in some embodiments of the present disclosure. The high-resolution elemental scans reveal the extensive functionalization of the surface of the TRG cathode material. This characteristic is not a superficial attribute but may play a pivotal role in the cathode's electrochemical performance.

The functionalization process may involve the addition of functional groups to the graphene surface, altering its chemical reactivity and, consequently, its electrochemical behavior. This modification may not be random or uneven. It may be uniform across the entire graphene surface. This uniformity may be an important factor that may directly influence the cathode's ability to deliver a large intercalation capacity.

In an electrochemical cell, the cathode's surface is the primary site for electrochemical reactions. Therefore, the more extensively and uniformly functionalized the surface is, the more sites are available for these reactions to occur. This increase in reaction sites may enhance the cathode's ability to intercalate incoming ions, which may directly translate to a larger capacity for ion storage.

In essence, the extensive and uniform functionalization of the TRG cathode surface, as revealed by the high-resolution N1s, O1s and S2p XPS spectra, is a key feature that may enable the cathode to deliver a large intercalation capacity. This capacity is a crucial parameter that may determine the energy storage capability of the cell. Thus, the functionalization process may have profound implications for the performance of the TRG as a cathode material in energy storage applications.

Figure 10A:
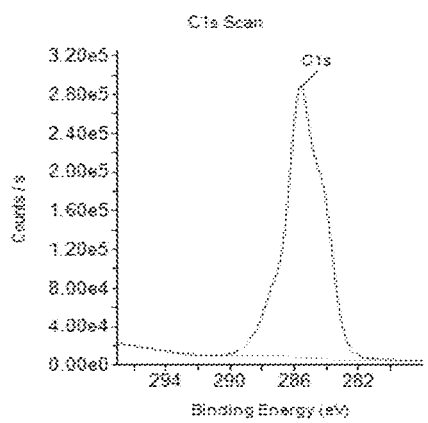
FIG. 10A is a representative high resolution C1s XPS spectrum obtained from a co-doped triethylene glycol reduced graphene cathode material disclosed herewith.

The C1s scan may provide insights into the types of carbon bonds present. FIG. 10A reveals the presence of various carbon bonds, including C—C or C=C (typical in graphene), C—O and C=O (indicative of functional groups). The relative intensities of these peaks may indicate the degree of functionalization, with higher intensities of C—O, C=O, or O—C=O peaks suggesting extensive functionalization.

Figure 10B:
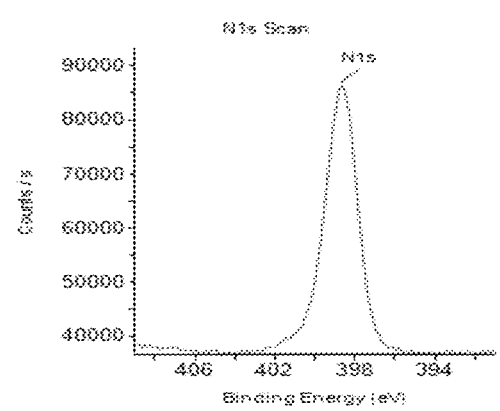
FIG. 10B is a representative high resolution N1s XPS spectrum obtained from a co-doped triethylene glycol reduced graphene cathode material disclosed herewith.

Referring to FIG. 10B, the N1s scan reveal the presence of various nitrogen bonds, including Pyridinic N (—C—N—C—), Pyrrolic N (—C—N—C—H), Graphitic N (—C—N—C—C—), and Oxidized N (—N—O or —N=O). The relative intensities of these peaks in the N1s scan may indicate the types and amounts of nitrogen doping or functionalization.

Figure 10C:
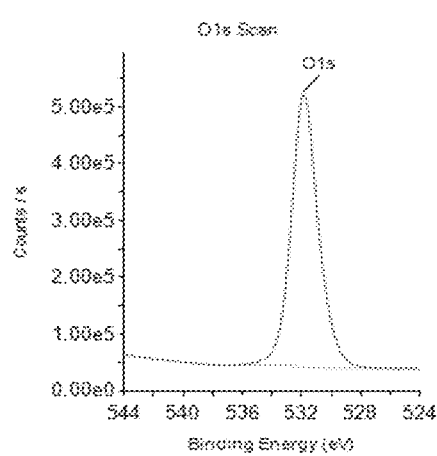
FIG. 10C is a representative high resolution O1s XPS spectrum of co-doped triethylene glycol reduced graphene cathode disclosed herewith disclosed herewith.

Referring to FIG. 10C, the O1s scan reveal various oxygen bonds, including C—O (representing ether or hydroxyl groups), C=O (representing carbonyl groups), and O—C=O (representing carboxyl groups). The relative intensities of these peaks in the O1s scan may indicate the degree of functionalization of the graphene.

Figure 10D:
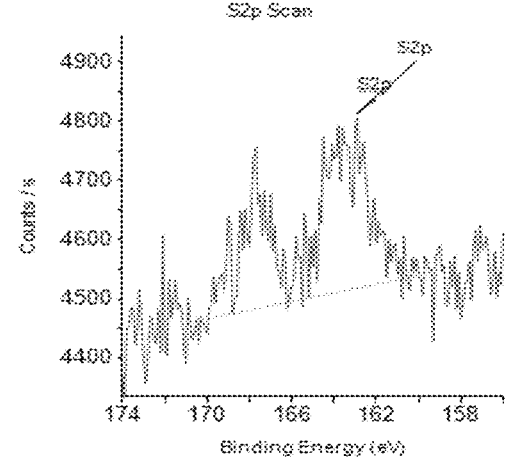
FIG. 10D is a representative high resolution S2p XPS spectrum of co-doped triethylene glycol reduced graphene cathode materials disclosed herewith.

Referring to FIG. 10D, the S2p scan reveal various sulfur bonds, including C—S(representing sulfur-containing groups attached to the carbon lattice), C=S (representing double-bonded sulfur groups), and S—O (representing sulfur-oxygen groups).

Figure 10E:
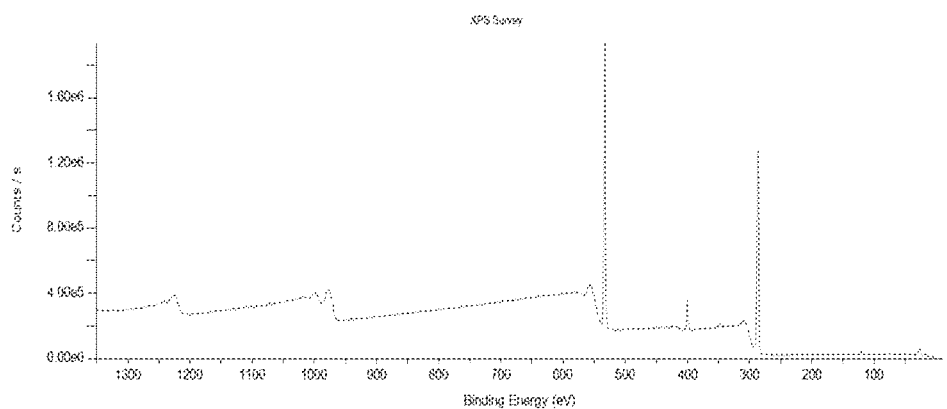
FIG. 10E is a representative XPS spectrum of co-doped triethylene glycol reduced graphene cathode materials disclosed herewith.

The survey scan may provide a broad overview of all elements present on the surface of the co-doped TRG cathode. In some embodiments, the survey scan confirms the presence of the expected elements (C, N, S, O) and can also reveal the presence of any unexpected or trace elements. The absence of peaks corresponding to impurities or unreacted precursors indicates the high purity of the co-doped triethylene glycol reduced graphene cathode, which may be important for achieving optimal performance in energy storage applications. Any unexpected peaks could indicate contamination or incomplete reactions during the fabrication process, which would need to be addressed in future fabrication runs. FIG. 10E shows a survey scan of some embodiments of co-doped TRG materials.

Figure 11:
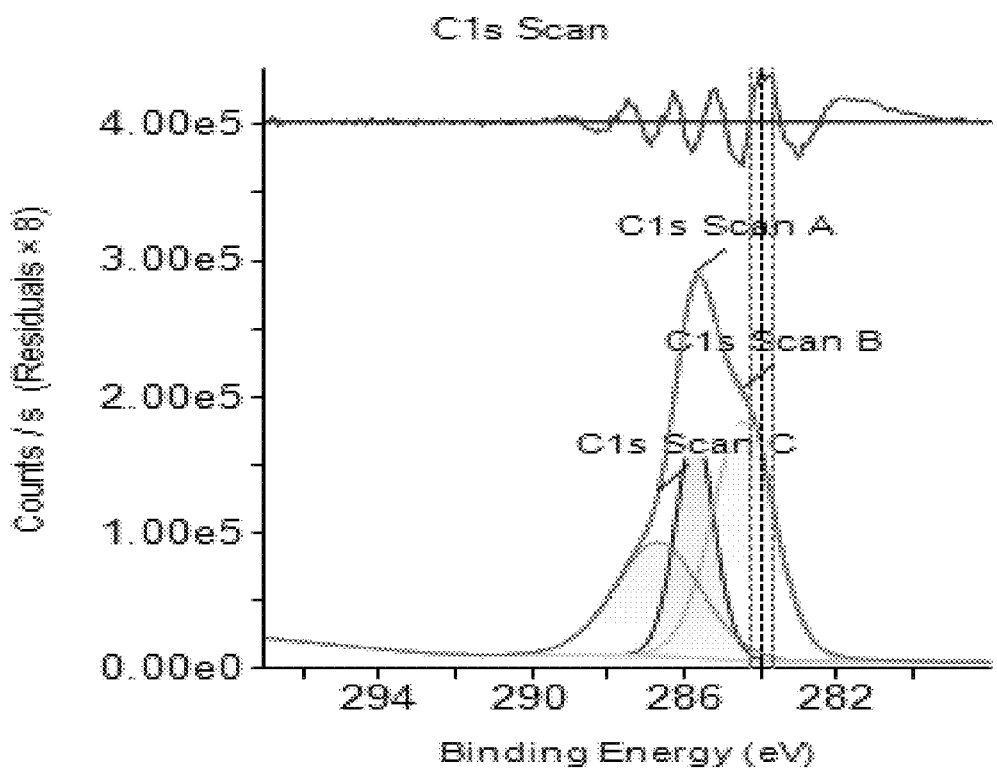
FIG. 11 is a representative XPS spectrum co-doped triethylene glycol reduced graphene cathode materials disclosed herewith.
Figure 12:
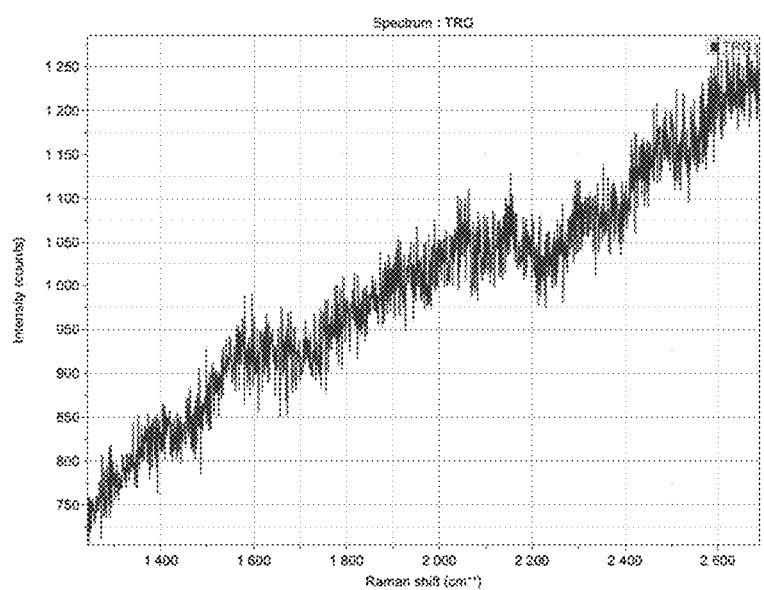
FIG. 12 is a representative Raman spectrum of co-doped triethylene glycol reduced graphene cathode materials.

The peak fitting scan may provide detailed information about the chemical states of the elements present. For example, the N1s peak may be deconvoluted into several components corresponding to different nitrogen functionalities (e.g., pyridinic N, pyrrolic N, graphitic N, etc.). The relative intensities of these components provide insights into the types of nitrogen doping in the co-doped TRG. This information may be useful as different nitrogen functionalities may have different effects on the electrochemical properties of the electrode. Similarly, the S2p peak may provide information about the types of sulfur functionalities present. The presence of different sulfur functionalities may influence the electronic structure of the graphene and hence its interaction with the electrolyte during energy storage. For example, graphitic nitrogen is known to enhance the electronic conductivity of the graphene, while sulfur functionalities may influence the interaction of the graphene with the electrolyte. FIG. 11 is a representative peak fitting scan of the C1s peak in some embodiments of co-doped TRG materials.

In one embodiment, the XRD pattern (2-theta values) of the co-doped triethylene glycol reduced graphene exhibits a peak at $23°±0.75$, $23°±0.50$, $23°±0.25$, and/or $23°±0.10$, whereas the graphene oxide has a peak at $26.5°±0.75$, $26.5°±0.50$, $26.5°±0.25$, and/or $26.5°±0.10$. The peaks at different angles (2-theta values) represent the different interlayer spacings or d-spacings in graphene oxide and co-doped triethylene glycol reduced graphene. For graphene oxide, a typical peak may be observed at approximately $26.5°$, which corresponds to the (001) plane, indicating a larger interlayer spacing due to the presence of oxygen functional groups. The peak for co-doped TRG shifts to a lower angle, approximately $23°$ in this case, indicating a reduction in the interlayer spacing due to the removal of oxygen groups during the reduction process and possible intercalation by dopants. The peak shift indicates the reduction of graphene oxide to graphene.

In another embodiment, TGA of the co-doped triethylene glycol reduced graphene shows a major weight loss at a higher temperature relative to graphene oxide, indicating enhanced thermal stability. In another embodiment, $^{13}C$ NMR exhibits major weight loss at a higher temperature than graphene oxide, indicating thermal stability.

Raman spectroscopy is a powerful technique for the characterization of carbon materials like graphene, as it provides information about the vibrational modes of the atoms in the material. The intensity, position, and width of the Raman peaks may provide insights into the number of graphene layers, the presence of defects, and the level of doping. The instrument parameters may influence the sensitivity, resolution, and spectral range of the Raman spectra obtained from the co-doped TRG cathode. For instance, the detector type may influence the sensitivity and resolution of the Raman spectra. The stage size and type may affect the area of the sample that may be analyzed and the precision of the sample positioning. The choice of laser wavelength may affect the Raman scattering efficiency and the types of Raman modes that may be excited. The acquisition options parameters may influence the quality of the Raman spectra, affecting aspects such as resolution, signal-to-noise ratio, and the accuracy of the data. For example, binning is a process that combines the charge collected by multiple pixels to form a 'super' pixel. A binning of 1 means that each pixel is read individually, which may provide higher resolution but potentially lower signal-to-noise ratio. The acquisition parameters may influence the quality and type of Raman spectra obtained from the co-doped triethylene glycol reduced cathode, affecting aspects such as spectral range, signal-to-noise ratio, and the overall acquisition time. For example, the choice of spectral range may affect the types of Raman modes that may be detected.

The Raman spectroscopy analysis may provide information about the co-doped TRG cathode. The detailed spectral and spatial data may be crucial for understanding the performance of the co-doped TRG cathode in electrochemical applications. The choice of instrument setup, acquisition options, and acquisition parameters may play a significant role in the quality and type of data obtained.

Figure 5:
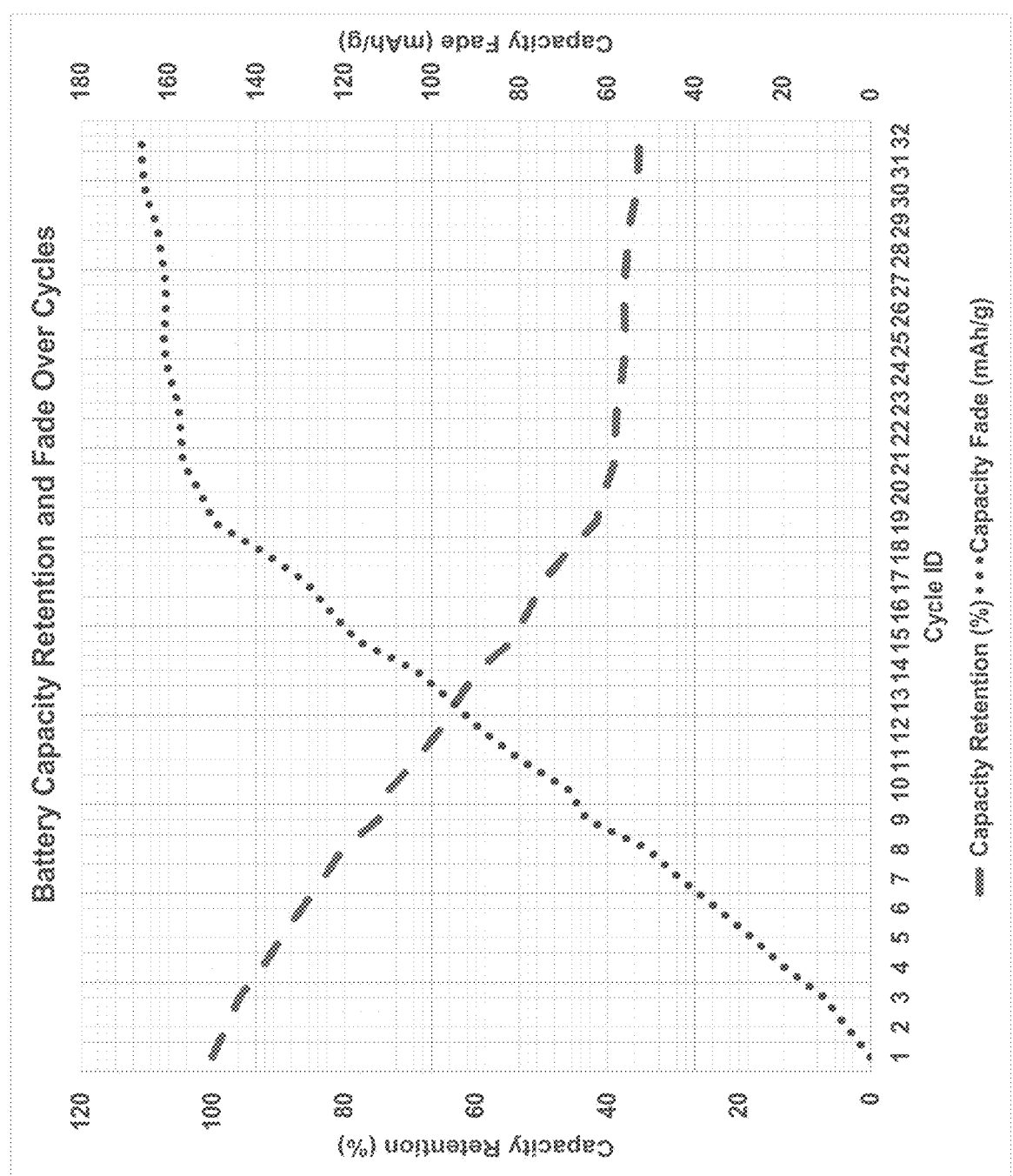
FIG. 5 shows representative line charts showing capacity retention and capacity fade over cycles according to some embodiments of the present disclosure.

Some embodiments of the present disclosure include a composition comprising the Raman spectra of FIG. 5.

In some embodiment, the Raman spectra shows an increase in the D/G band intensity ratio in doped polyol reduced graphene indicating increased disorder due to doping. A higher D/G ratio may indicate the presence of functional groups optimized for lithium-ion intercalation. The preserved 2D peaks reflect the structural stability required for long-term cycling.

In some embodiments, the energy density of the co-doped TEG reduced graphene may be from about 510 Wh/kg to about 700 Wh/kg. In some embodiments, the energy density may be from about 600 Wh/kg to about 800 Wh/kg. The higher energy density relative to lithium-based cathode material indicates the compactness of the system.

In one or more embodiments, the specific capacity of the co-doped TEG reduced graphene may be from about 200 mAh/g to about 300 mAh/g. In other embodiments, the specific capacity may be from about 300 mAh/g to about 400 mAh/g.

In one or more embodiments, the capacity retention of the co-doped TEG reduced graphene over 500 cycles may be greater than about 70%, about 75%, about 80%, about 85%, about 90% or about 95%, or about 95% or higher. In one or more embodiments, the capacity retention of the co-doped TEG reduced graphene over 500 cycles may be from about 70% to about 75%, from about 75% to about 80%, from about 80% to about 85%, from about 85% to about 90%, from about 90% to about 95%, or about 95% or greater. This range may be influenced by factors such as the synthesis method, charge/discharge rate, depth of discharge, operating temperature, and/or electrolyte type/concentration. High values for capacity retention is not easily achieved due to the inherent degradation mechanisms in batteries, including the formation and growth of solid electrolyte interface (SEI) layer, and active material degradation.

In one or more embodiments, the electronic conductivity of the co-doped TEG reduced graphene cathode material may have an electronic conductivity ranging from on the order of about $10^3$ S/cm to about $10^4$ S/cm.

Cathodes and Batteries Made from the Cathode Material

The present disclosure also includes cathodes made from the cathode materials described above. The present disclosure also includes batteries made from the cathodes from the cathode materials.

A cathode is constituted by a cathode material, a conductive material, a current collector, and a binder (binding agent). A cathode is typically made by mixing a cathode material, a binder, a solvent, and optionally additives. The binder helps in adhering the cathode material to the current collector and maintaining structural integrity during battery cycling. The solvent helps to form a solution with all the components dissolved or suspended in it.

In some embodiments of the present disclosure, the cathode material may be any material described above. For example, the cathode material may be a doped polyol reduced graphene, a doped TEG reduced graphene, or co-doped TEG reduced graphene. In some embodiments, or nitrogen and sulfur co-doped TEG reduced graphene.

Examples of suitable binders include but are not limited to biopolymers, polyvinylidene fluoride (PVDF), styrene-butadiene rubber (SBR), or combinations thereof. The biopolymers include but are not limited to chitosan, alginate, cellulose derivatives, and combinations thereof. Notably, chitosan is superior to alginate and cellulose derivatives as an eco-friendly binder due to its biocompatibility, strong film-forming properties, and excellent adhesion and/or cohesion. These characteristics make chitosan a preferred choice for fabricating electrodes in energy storage devices, ensuring mechanical integrity and performance.

In some embodiments, the binder may be chitosan. Chitosan is biocompatible, biodegradable, and has film-forming properties. Different grades and formulations of chitosan may vary in properties and performance. Chitosan acts as an eco-friendly alternative to the conventional petroleum-based binders such as PVDF or SBF. The chitosan may be derived from a naturally occurring polymer including a naturally occurring polymer found in the shells of crustaceans. PVDF or SBR binders provide enhanced mechanical strength, adhesion, stability, or combination thereof. Thus, a combination of binders may be desired depending on specific requirements, performance goals, and optimization needs of the cathode and subsequent energy storage device. In some embodiments, the chitosan may be derived from chitin.

In some embodiments, the solvent may be an acid. The acid may be an organic or an inorganic acid. Example of suitable acids include but are not limited to any one of acetic acid, hydrochloric acid, formic acid, lactic acid, citric acid, or combinations thereof. The choice of solvent may be linked to the dissolving and dispersion of chitosan, which is used as a binder and a doping agent. Chitosan is a polymer that is soluble in many dilute acids due to the presence of amine groups. Furthermore, the choice of solvent may impact the properties of the final material, including the degree of deprotonation and the level of cross-linking in the chitosan. In one embodiment, the acid may be acetic acid. In other embodiments, the solvent may be a weak acid or an organic acid.

The cathode formed using doped polyol reduced graphene or co-doped triethylene glycol reduced graphene and the chitosan binder may be utilized in various battery configurations including but not limited to coin cells, pouch cells, or prismatic cell. The specific design considerations and assembly methods may vary depending on the battery format. In some embodiments, the cathode may be used in coin cells. For example, the cathode may be used in a coin cell with a 2032 form factor. In other embodiments, the cathode may be used in prismatic cells and/or prismatic batteries.

The thickness of the cathode depends on the intended application, the performance requirements of the cathode, and the manufacturing feasibility. The thickness of the cathode may be optimized based on the desired energy density, power output, and other factors to achieve the desired performance.

The thickness of the cathode ranges from about 50 μm to about 500 μm. For example, the thickness may be from about 75 μm to about 475 μm, about 100 μm to about 450 μm, about 125 μm to about 425 μm, about 150 μm to about 400 μm, about 175 μm to about 375 μm, about 200 μm to about 350 μm, about 225 μm to about 325 μm, about 250 μm to about 300 µm, or about 275 µm to about 290 µm. In some embodiments, the thickness may be 100 µm, 150 µm, 200 µm, 250 µm, 300 µm, 350 µm, 400 µm, or 450 µm. In some embodiments, the thickness of the cathode is around 150 µm to around 250 µm. A cathode thickness of 600 µm or greater may pose challenges related to ion diffusion and mechanical stability, especially for high energy density materials like the co-doped triethylene glycol reduced graphene (TRG). However, considering the improved properties of the co-doped TRG disclosed herein, such as increased specific capacity and superior electronic conductivity, it may be possible to use thicker cathodes (e.g., 500 µm or greater, 600 µm or greater, or 700 µm or greater) without sacrificing performance.

The density of the cathode may be used to optimize the packing density of the active cathode material, binder, and other additives, while simultaneously maintaining the electrochemical performance and mechanical stability.

The density of the cathode ranges from about 1.4 g/cm$^3$ to about 2.4 g/cm$^3$. For examples, the density may be from about 1.5 g/cm$^3$ to about 2.3 g/cm$^3$, 1.6 g/cm$^3$ to about 2.2 g/cm$^3$, 1.7 g/cm$^3$ to about 2.1 g/cm$^3$, or 1.8 g/cm$^3$ to about 2.0 g/cm$^3$. In one embodiment, the density is from 1.4 g/cm$^3$ to 1.8 g/cm$^3$.

In certain aspects, cathodes made from the cathode materials exhibit an energy density ranging from greater than 500 Wh/kg to about 2500 Wh/kg. For example, the energy density may be from about 505 Wh/kg to about 2450 Wh/kg, about 550 Wh/kg to about 2400 Wh/kg, about 600 Wh/kg to about 2350 Wh/kg, about 650 Wh/kg to about 2300 Wh/kg, about 700 Wh/kg to about 2250 Wh/kg, about 750 Wh/kg to about 2200 Wh/kg, about 800 Wh/kg to about 2150 Wh/kg, about 850 Wh/kg to about 2100 Wh/kg, about 900 Wh/kg to about 2050 Wh/kg, about 950 Wh/kg to about 2000 Wh/kg, about 1000 Wh/kg to about 1950 Wh/kg, about 1100 Wh/kg to about 1900 Wh/kg, about 1150 Wh/kg to about 1850 Wh/kg, about 1200 Wh/kg to about 1800 Wh/kg, about 1250 Wh/kg to about 1750 Wh/kg, about 1300 Wh/kg to about 1700 Wh/kg, about 1350 Wh/kg to about 1850 Wh/kg, about 1400 Wh/kg to about 1800 Wh/kg, about 1450 Wh/kg to about 1750 Wh/kg, about 1500 Wh/kg to about 1700 Wh/kg, or about 1550 Wh/kg about 1650 Wh/kg. In some embodiments, the energy density may be from about 510 Wh/kg to about 700 Wh/kg. In some embodiments, the energy density may be from about 600 Wh/kg to about 800 Wh/kg. The higher energy density relative to lithium-based cathode material indicates the compactness of the system.

In certain aspects, cathodes made from the cathode materials of the present disclosure may have a specific capacity of ranging from about 200 mAh/g to about 750 mAh/g. For example, the specific capacity may be from about 210 mAh/g to about 740 mAh/g, about 220 mAh/g to about 730 mAh/g, about 230 mAh/g to about 720 mAh/g, about 240 mAh/g to about 710 mAh/g, about 250 mAh/g to about 700 mAh/g, about 260 mAh/g to about 690 mAh/g, about 270 mAh/g to about 680 mAh/g, about 280 mAh/g to about 670 mAh/g, about 290 mAh/g to about 660 mAh/g, about 300 mAh/g to about 650 mAh/g, about 310 mAh/g to about 640 mAh/g, about 320 mAh/g to about 630 mAh/g, about 330 mAh/g to about 620 mAh/g, about 340 mAh/g to about 610 mAh/g, about 350 mAh/g to about 600 mAh/g, about 360 mAh/g to about 590 mAh/g, about 370 mAh/g to about 580 mAh/g, about 380 mAh/g to about 570 mAh/g, about 390 mAh/g to about 560 mAh/g, about 400 mAh/g to about 550 mAh/g, about 410 mAh/g to about 540 mAh/g, about 420 mAh/g to about 530 mAh/g, about 430 mAh/g to about 520 mAh/g, about 440 mAh/g to about 510 mAh/g, about 450 mAh/g to about 500 mAh/g, about 460 mAh/g to about 490 mAh/g, or about 470 mAh/g to about 480 mAh/g. In some embodiments, the specific capacity may be from about 200 mAh/g to about 300 mAh/g. In other embodiments, the specific capacity may be from about 300 mAh/g to about 400 mAh/g.

In certain aspects, the cathode made from the co-doped triethylene glycol reduced graphene cathode material has a capacity retention of greater than 70% over a number of charge/discharge cycles. The number of cycles may be about 450, about 500, about 550, about 600, about 650, or about 700. The greater than 80% capacity retention reflects the materials long-term durability. For example, the capacity retention may range from about 70% to about 95%, about 75% to about 90%, or about 80% or about 85% over 500 charge/discharge cycles. In one or more embodiments, the capacity retention over 500 cycles may be greater than about 70%, about 75%, about 80%, about 85%, about 90% or about 95%.

In some aspects of the present disclosure, the cathode made from doped polyol reduced graphene cathode material may be assembled into a coin cell battery. As previously stated, the cathode material may be co-doped with nitrogen and sulfur. The cathode material may be reduced with TEG. The cathode material may be nitrogen and sulfur co-doped TEG reduced graphene.

In some aspects, nitrogen and sulfur co-doped TEG reduced graphene cathodes may be incorporated into coin cells as the cathode material layered onto a current collector and separated from the anode by an electrolyte-filled separator. The nitrogen and sulfur co-doped TEG reduced graphene cathodes may also be used in other battery configurations, such as pouch or prismatic cells, or different chemistries like sodium-ion, potassium-ion, or dual-ion batteries.

The nitrogen and sulfur co-doping may enhance the electronic conductivity and redox activity, contributing to the increased specific capacity, energy density, and cycling stability of the batteries. The nitrogen and sulfur co-doped TEG reduced graphene cathode material may lead to the development of more efficient, compact, and lightweight energy storage solutions, benefiting portable electronics, wearable technology, and small-scale energy storage industries.

In some aspects, the coin cell battery may operate in a voltage range from about 2.0 V to about 5.0 V, about 2.5 V to about 5.0 V, about 2.0 V to about 4.2 V, or about 2.5 V to about 4.2 V. For example, the voltage range may be about 2.1 V to about 4.9 V, about 2.2 V to about 4.8 V, about 2.3 V to about 4.7 V, about 2.4 V to about 4.6 V, about 2.5 V to about 4.5 V, about 2.6 V to about 4.4 V, about 2.7 V to about 4.3 V, about 2.8 V to about 4.2 V, 2.9 V to about 4.1 V, about 3.0 V to about 3.9 V, about 3.1 V to about 3.8 V, about 3.2 V to about 3.7 V, or about 3.3 V to about 3.6 V, or about 3.4 V to about 3.5 V. In some embodiments, the voltage may be from 2.5 V to 4.2 V.

Notably, the voltage of the disclosed coin cell battery may be higher than 3.6 V lithium-ion coin cell batteries. In some embodiments, the voltage may be ≥4.3 V, ≥4.2 V, ≥4.1 V, ≥4.0 V, ≥3.9 V, ≥3.8 V, or ≥3.7 V.

In some aspects, the disclosed coin cell battery may have a 60-170% increase in energy density compared to 3.6 V lithium-ion coin cell batteries. For example, the increase in energy density range from about 60% to about 170%, about 65% to about 165%, about 70% to about 160%, about 75% to about 155%, about 80% to about 150%, about 85% to about 145%, about 90% to about 140%, about 95% to about 135%, about 100% to about 130%, about 105% to about 125%, about 110% to about 120%, or about 112% to about 115%.

In some aspects, the disclosed coin cell battery may have a capacity ranging from about 30 mAh to about 60 mAh. For example, the capacity may range from about 35 mAh to about 55 mAh, about 40 mAh to about 50 mAh, or about 45 mAh to about 47 mAh.

Methods of Making Doped Polyol Reduced Graphene

The present disclosure also includes methods of making cathode materials. The method includes forming a doped polyol reduced graphene material from graphene oxide, a polyol, and a plurality of dopants.

Figure 8:
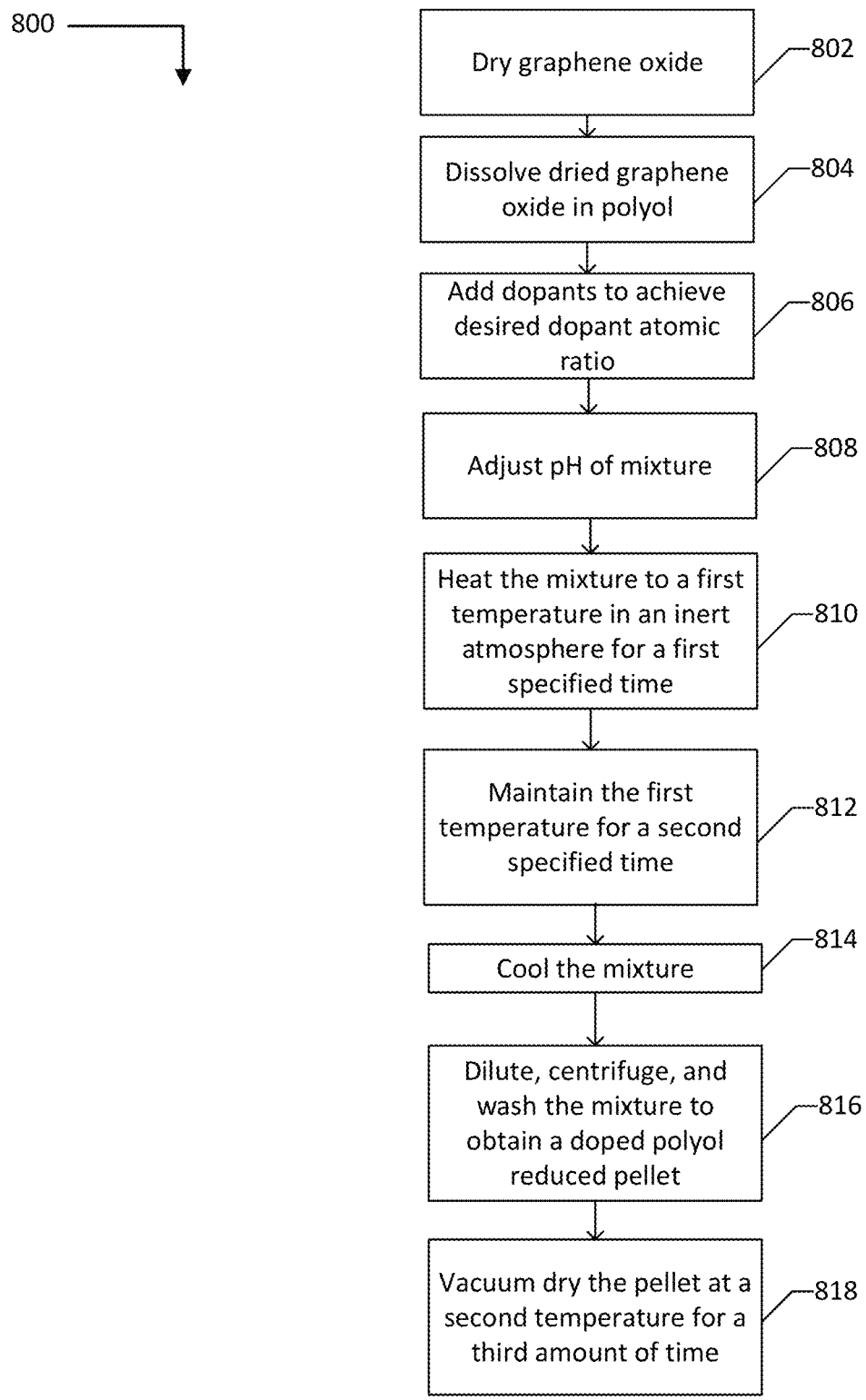
FIG. 8 is a flowchart representation of an example method.

In some aspects, the cathode material is doped polyol reduced graphene. FIG. 8 shows a method of making doped polyol reduced graphene. The method 800 of making doped polyol reduced graphene includes drying graphene oxide 802; dissolving the dried graphene oxide in a polyol to form a graphene oxide solution in polyol 804; adding dopants to the graphene oxide solution to form a mixture 806; adjusting the pH of the mixture to between 9 and 10 808; heating the mixture to a first temperature in an inert atmosphere for a first specified time 810; maintaining the first temperature for a second specified amount of time to form a doped polyol reduced graphene mixture 812; cooling the doped polyol reduced graphene mixture 814; removing doped polyol reduced graphene from the solution by diluting, centrifuging, and washing to form doped polyol reduced graphene pellet 816; and vacuum drying the doped polyol reduced graphene pellet at a second temperature for a third specified time to obtain doped polyol reduced graphene material 818.

In certain aspects, the cathode material may be co-doped with nitrogen and sulfur. In other aspects, the polyol may be a triethylene glycol. TEG's relatively high boiling point facilitates a one-pot synthesis under reflux conditions. In some aspects, the cathode material is nitrogen and sulfur co-doped triethylene glycol reduced graphene.

In some embodiments, the graphene oxide used has an average molecular weight ranging from about 12,000 g/mol to about 30,000 g/mol. For example, the molecular weight may range from about 13,000 g/mol to about 29,000 g/mol, from about 14,000 g/mol to about 28,000 g/mol, from about 15,000 g/mol to about 27,000 g/mol, from about 16,000 g/mol to about 26,000 g/mol, from about 17,000 g/mol to about 25,000 g/mol, from about 18,000 g/mol to about 24,000 g/mol, from about 19,000 g/mol to about 23,000 g/mol, from about 20,000 g/mol to about 22,000 g/mol, or from about 20,500 to about 21, 500 g/mol.

Referring to step 802 in FIG. 8, the level of dryness or residual moisture in the dried GO may be below 1%. This level of dryness ensures the removal of residual water and prevents potential adverse effects on subsequent steps, such as the dispersion of GO in polyols.

Referring to FIG. 8, polyols in 804 include any suitable solvents with appropriate properties for dispersing GO. Examples include ethylene glycol, propylene glycol, or glycerol. In one embodiment, the polyol is triethylene glycol. The choice of alternative solvent may impact the dispersion quality and stability, so it is important to select a solvent compatible with the synthesis process and desired characteristics of the co-doped polyol reduced cathode material.

Referring to FIG. 8, the dopants in 806 are elements or compounds that may modify the electrochemical property of graphene. For example, dopants include but as not limited to compounds containing nitrogen, sulfur, boron, phosphorous, or transition metals such as iron. Examples of suitable dopants include thiourea, thioacetamide, sodium sulfide, urea, melamine, or combinations thereof. The specific choice of dopants depends on the desired properties and performance requirements of the co-doped triethylene glycol reduced graphene cathode material.

In some embodiments, a combination of chitosan and thiourea may be used as the dopant. The amount of chitosan and thiourea added may be used to control the N/S atomic ratio in the doped polyol reduced graphene. The N/S ratio ranges from about 1:1 to about 5:1. For example, N/S ratio may be about 0.50:1, about 0.75:1, about 0.90:1, about 1:1, about 1.5:1, about 2:1, about 2.5:1, about 3:1, about 3.5:1, about 4:1, about 4.5:1, or about 5:1. The N/S ratio allows tailoring the electrochemical performance of the resulting energy storage device.

Referring to FIG. 8, the pH may be adjusted using an appropriate basic solution. Examples of suitable basic solutions include but are not limited to ammonia, sodium hydroxide, potassium hydroxide, or other alkaline solutions. The specific choice of base depends on factors such as availability, compatibility with the synthesis process, and the desired pH range for achieving electrostatic stabilization of the graphene nanosheets.

The pH may be adjusted from about 7 to about 13, about 7 to about 12, about 7 to about 11, about 8 to about 13, about 8 to about 12, about 8 to about 11, about 9 to about 13, about 9 to about 12, about 9 to about 11, or about 9 to about 10. The pH range provides flexibility in the electrostatic stabilization of graphene nanosheets and ensures optimal conditions for the co-doping process. However, exceeding the upper limit of the pH range may lead to undesired side reactions or affect the stability of the dopants, this it is important to stay within the specified range. The pH may be adjusted to about 8, about 8.2, about 8.4, about 8.6, about 8.8, about 9.0, about 9.2, about 9.4, about 9.6, about 9.8, about 10.0, about 10.2, about 10.4, about 10.6, about 10.8, or about 11.0. In some embodiments, the pH may be from about 9 to about 10. In some embodiments, the pH may be adjusted to from about 9.5 to about 10. The pH may be adjusted to about 9.5, about 9.6, about 9.7, about 9.8, about 9.9, or about 10. In some embodiments, the pH may range from about 9.5 to about 10, about 9.6 to about 10, about 9.7 to about 10, about 9.8 to about 10, or about 9.9 to about 10.

In some embodiments, an ammonia solution may be used to adjust the pH. The ammonia solution may be about 20% to about 40% ammonia. For example, the ammonia solution may be about 20%, about 25%, about 30%, about 35%, or about 40%. In one embodiment, the ammonia solution may be 30%. The use of ammonia solution in may serve to adjust the pH of the mixture and promote the electrostatic stabilization of the graphene nanosheets. Generally, the concentration of ammonia solution used in such cases may range from about 5% to about 30%, about 5% to about 35%, or about 5% to about 40%. However, the exact amount to use depends on the required pH adjustment and may vary depending on the other components of the mixture. In some embodiments, the pH may be adjusted using a 25% solution of ammonia.

After the pH of the mixture is adjusted, the mixture may be heated under reflux to a first temperature in an inert atmosphere for a first specified time 110. The first specified temperature ranges from about 270° C. to about 285° C. For example, the temperature may be about 270° C., about 271° C., about 272° C., about 273° C., about 274° C., about 275° C., about 276° C., about 277° C., about 278° C., about 279° C., about 280° C., about 281° C., about 282° C., about 283° C., about 284° C., or about 285° C. In some embodiments, the first temperature may be about 276° C., about 277° C., about 278° C., about 279° C., or about 280° C.

In some aspects, the inert atmosphere is one with nitrogen or argon. In some embodiments, the inert atmosphere is an argon atmosphere. Both gases are used as inert atmospheres in various synthesis processes, including the reduction and doping of graphene-based materials. They help prevent oxidation or unwanted reactions during high-temperature processes, ensuring the stability and integrity of the doped triethylene glycol reduced graphene cathode material. The specific choice of inert atmosphere depends on factors such as availability, cost, and compatibility with the synthesis setup.

The first specified time ranges from about 15 minutes to about 120 minutes, about 15 minutes to about 150 minutes, or about 15 minutes to about 180 minutes, about 30 minutes to about 120 minutes, about 30 minutes to about 150 minutes, or about 30 minutes to about 180 minutes, 60 minutes to about 120 minutes, about 60 minutes to about 150 minutes, or about 60 minutes to about 180 minutes. For example, the first specified time may be about 60 minutes, about 65 minutes, 70 minutes, about 75 minutes, about 80 minutes, about 85 minutes, 90 minutes, about 95 minutes, about 100 minutes, about 105 minutes, about 110 minutes, about 115 minutes, or about 120 minutes. In some embodiments, the first specified time may be about 90 minutes. In some embodiments, the first specified time may range from about 30 minutes to about 40 minutes. For example, the first specified time may be about 30 minutes, 31 minutes, 32 minutes, 33 minutes, 34 minutes, 35 minutes, 36 minutes, 37 minutes, 38 minutes, 39 minutes, or 40 minutes.

Referring to FIG. 8, the mixture may be maintained at a second specified time at the first specified temperature 812 to complete the reaction involving reducing the graphene oxide to graphene and doping the graphene with dopants. The second specified time ranges from about 15 minutes to about 60 minutes, about 15 minutes to about 90 minutes, about 15 minutes to about 120 minutes, about 15 minutes to about 150 minutes, or about 15 minutes to about 180 minutes. For example, the second specified time may be about 15 minutes, about 20 minutes, about 25 minutes, about 30 minutes, about 35 minutes, about 40 minutes, 45 minutes, about 50 minutes, about 55 minutes, or about 60 minutes. In some embodiments, the second specified time may be about 30 minutes.

After the formation of doped polyol reduced graphene, the next step of the process includes cooling the mixture 814.

The next steps include diluting, centrifuging, and washing the cooled mixture of doped polyol reduced graphene 816 forming a doped polyol reduced pellet.

The last step of the process includes obtaining the polyol reduced graphene by vacuum drying the pellet at a second temperature for a third specified about of time 118. The second specified temperature ranges from about 50° C. to about 100° C. For example, the temperature may be about 50° C., about 55° C., about 60° C., about 65° C., about 70° C., about 75° C., about 80° C., about 85° C., about 90° C., about 95° C., or about 100° C. In some embodiments, the second temperature may be about 65° C. The third specified time ranges from about 2 hours to about 8 hours. For example, the third specified time may be about 2.0 hours, about 2.5 hours, about 3.0 hours, about 3.5 hours, about 4.0 hours, about 4.5 hours, about 5.0 hours, about 5.5 hours, about 6.0 hours, about 6.5 hours, about 7.0 hours, about 7.5 hours, or about 8.0 hours. In some embodiments, the third specified time may be about 6 hrs.

The yield of the doped polyol reduced graphene pellet ranges from about 65% to about 90%. The yield may range from about 70% to about 90%, about 75% to about 85%, or from about 80% to about 85%. For example, the yield may be about 65%, about 70%, about 75%, about 80%, about 85%, or about 90%. The yield accounts for losses that may occur during the washing, centrifugation, and drying steps. The specific value may vary depending on the efficiency of the purification process and the specific conditions employed. In some embodiments, the yield may be from about 70% to about 80%.

The purity of the doped polyol reduced graphene ranges from about 90% to about 99%. For example, the purity may be about 90%, about 91%, about 92% about 93%, about 94%, about 95%, about 96%, about 97% about 98%, or about 99%. In some embodiments, the purity may be greater than 95%. A high purity may be expected, considering the multiple washing steps and removal of impurities during the synthesis and purification process. Achieving a high purity level may be important to ensure the desired electrochemical performance and minimize any potential adverse effects caused by impurities.

Raman spectra of a reduced graphene oxides may show a shift in the G bands towards lower wavenumbers compared to graphite oxide. This shift may signify a decrease in oxygen content and a restoration of the graphite structure in rGOs. Concurrently, the D band's intensity increases, indicating the creation of new defects during the reduction process. The shift in the G band may suggest a reduction in $sp^2$ carbon domains, likely due to the introduction of functional groups or defects. The heightened intensity of the D band may point to an increase in disorder or defects in the carbon lattice, potentially resulting from functionalization or reduction processes. These spectral changes may provide insights into the structural alterations in graphene-based materials during different processing stages.

In one example, XPS elemental scan reveals an increase in oxygen content of about 33%. This increase may result from the introduction of oxygen-containing functional groups including but not limited to hydroxyl, epoxy, carbonyl, carboxyl groups, or triethylene glycol during the oxidation process. This functionalization process may disrupt the $sp^2$ carbon network and may introduce $sp^3$ hybridized carbon atoms, leading to changes in the structural and electronic properties of the material.

From a Raman spectroscopy perspective, an increase in oxygen content may lead to the following changes: 1) shift in G band; 2) increase in D band intensity; 3) appearance of D' band; and 4) broadening and decrease in 2D band intensity. The G band corresponds to the in-plane vibration of $sp^2$ carbon atoms and shifts towards higher wavenumbers. The D band is associated with defects and disorder in the carbon lattice and increases in intensity. The D' band is a defect-induced band like the D band and increases in intensity. This band is often associated with the presence of oxygen-containing functional groups. The 2D band broadens and decreases in intensity. This change is due to the increase in disorder and disruption of the layer structure of graphene. These changes in the Raman spectra may provide insights into the changes in the structural and electronic properties of graphene-based materials due to the increase in oxygen content. They are currently being used to monitor the oxidation process and to optimize the synthesis of graphene-based materials with desired properties.

Methods of Making Cathode

The present disclosure also includes methods of making cathodes from the cathode materials. The cathode material may be a doped polyol reduced graphene. In other embodiments, the doped polyol reduced graphene may be a nitrogen and sulfur co-doped triethylene glycol reduced graphene described above.

Figure 9:
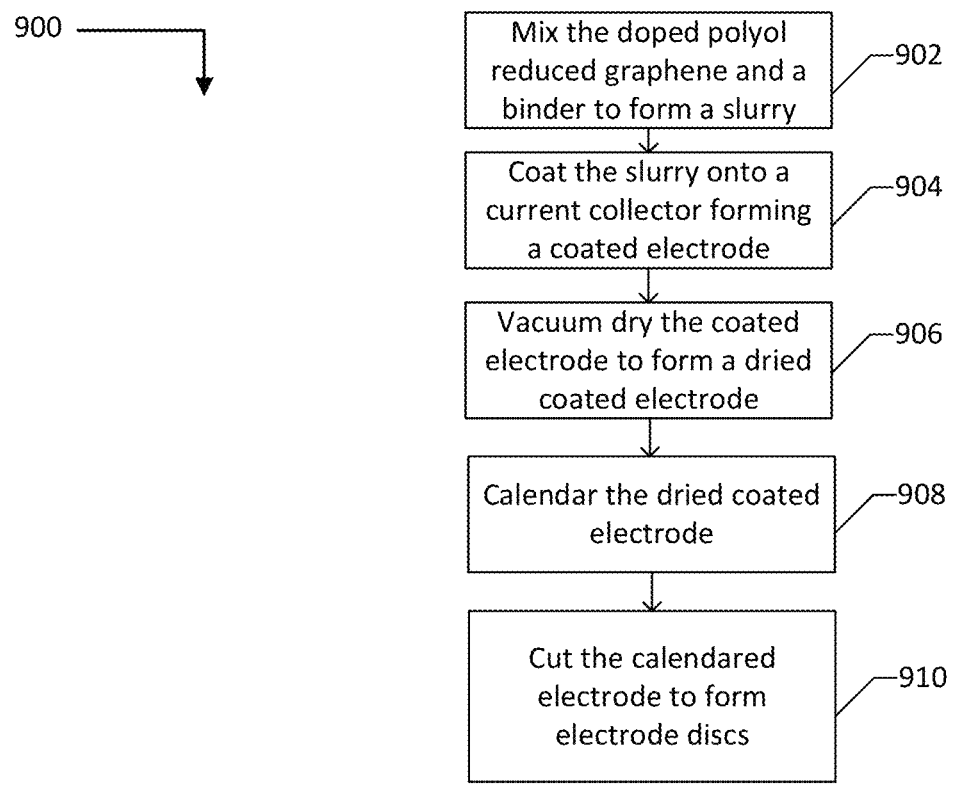
FIG. 9 is a flowchart representation of an example method.

As shown in FIG. 9, the method includes forming a doped polyol reduced graphene material from graphene oxide as described above and in FIG. 8; mixing the doped polyol reduced graphene material and a binder material to form a homogeneous slurry; coating the homogeneous slurry onto a current collector material to form a coated electrode; drying the coated electrode in an oven to form a dried coated electrode; compressing the dried coated electrode to form an electrode with a specified density and a specified thickness; and cutting the electrode with the specified density and the specified thickness using a cutting tool to form the cathode for the energy storage device.

Referring to FIG. 9, the first step includes mixing the doped polyol reduced graphene and a binder to form a homogenous slurry 902. Suitable binders include but are not limited to polyvinyl alcohol (PVA), carboxymethyl cellulose (CMC), polyacrylic acid (PAA), or chitosan. In one embodiment, chitosan is used as the binder.

In some embodiments, the doped polyol reduced graphene may be between about 80 wt % to about 95 wt % of the total electrode mass. For example, the doped polyol reduced graphene may be about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, or about 95 wt % of the total electrode mass. In some embodiments, the doped polyol reduced graphene is 90 wt % of the electrode mass.

The electrode may also include about 0.5-2 wt % chitosan. For example, the chitosan wt % may be about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or about 2.0 wt %.

The electrode may also include about 10 wt % of other components or additives necessary for the electrode fabrication process. The additional components could include conductive additives, binders, or other materials to optimize the electrode's performance and structural integrity. The exact composition and percentage depend on the specific formulation and optimization for the intended application.

The next step of the process includes coating the slurry onto a current collector 204. The current collector includes but is not limited to aluminum, copper, stainless steel, or nickel. The choice of current collector material may depend on factors such as electrical conductivity, compatibility with the electrode materials, cost, and specific application requirements. The desired properties and performance goals may be considered when selecting the appropriate current collector material. In one embodiment, aluminum is used as the current collector. Any suitable coating technique may be used to coat the current collector. For example, the current collector may be coated using a doctor blade.

Referring to FIG. 2, the next step of the process includes drying the coated electrode in a vacuum oven at a specified temperature for a specified time 206. The coated electrode may be dried at a temperature ranging from about 60° C. to about 90° C. For example, the temperature may be from about 65° C. to about 85° C., about 70° C. to about 80° C., or about 75° C. to about 78° C. In one embodiment, the temperature may be 80° C. The specified about of time for vacuum drying ranges from about 6 hours to about 18 hours. For example, the time may be from about 6.5 hours to about 17.5 hours, about 8.0 hours to about 17 hours, about 8.5 hours to about 16.5 hours, about 9.0 hours to about 16 hours, about 9.5 hours to about 15.5 hours, about 10 hours to about 15 hours, about 10.5 hours to about 14.5 hours, about 11 hours to about 14 hours, about 11.5 hours to about 13.5 hours, or about 12 hours to about 13 hours. In one embodiment, the time may be 12 hours.

Referring to FIG. 2, the next step includes calendaring the dried coated electrodes to achieve the desired thickness and density 208.

The last step of the process involves cutting the calendared electrodes to form electrode discs using a suitable cutting tool 210. For example, suitable cutting tools include disc cutters, punching tools, laser cutting, water jet cutting, and mechanical cutting tools like rotary cutters or precision blades. The choice depends on precision, throughput, cost, and electrode material characteristics. In one embodiment, a disc cutter may be used as the cutting tool.

Definitions

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL" The endpoint may also be based on the variability allowed by an appropriate regulatory body, such as the UL, CTIA Authorized Testing Laboratory, etc.

As used herein, "comprises," "comprising," "containing," and "having" and the like may have the meaning ascribed to them in U.S. Patent Law and may mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open-ended term, like "comprising" or "including," it is understood that direct support should be afforded also to "consisting essentially of" language as well as "consisting of" language as if stated explicitly and vice versa.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context.

Such numerical references may be used interchangeably without departing from the teaching of the embodiments and variations herein.

As used herein, the terms "compound" and "component" are used to refer to any type of material, without any loss of generality of the material in question. That is, compound may refer to any element, ion, molecule, complex s tructure(s), or combinations thereof (e.g. metal oxides, metal sulfides).

As used herein, capacity (mAh) is the total amount of electric charge a battery can store and deliver under specified conditions. It is measured in milliampere-hours (mAh) and represents the product of current (in mA) and time (in hrs) during which the battery can supply that current.

As used herein, Coulombic efficiency (%) is the ratio of the total charge extracted from a battery during discharge to the total charge put into the battery during charge, expressed as a percentage. It indicates the efficiency of the battery in storing and delivering charge.

As used herein, capacity retention (%) is the measure of a battery's ability to retain its original capacity over time and repeated charge/discharge cycles. It is expressed as a percentage of the initial capacity that remains after a certain number of cycles.

As used herein, RCap_Chg (mAh/g) represents the specific charge capacity of the battery during the charging process. It is a measure of the amount of charge a battery can store per unit mass of the active material.

As used herein, RCap_DChg (mAh/g) represents the specific discharge capacity of the battery during the charging process. It indicates the amount of charge the battery can deliver per unit mass of the active material during the discharge process.

As used herein, CC_Chg_Rat (%) is the charge rate under constant current conditions. It indicates the percentage of the nominal capacity that is being charged per hour.

As used herein, REngy_Chg (mWh/g) is the specific energy charged into the battery. It measures the energy stored in the battery per unit mass of the active material during the charging process.

As used herein, State of Health (SoH) (%) is a measure of the overall condition and performance capability of a battery compared to its initial state when it was new. It is expressed as a percentage and indicates how much of the battery's original capacity and performance remain after a period of use or a certain number of cycles. SoH takes into account factors such as capacity fade, internal resistance increase, and other aging effects.

As used herein, cycle ID is the number of complete charge-discharge cycles that have been performed on the battery. A single cycle typically includes on charge phase followed by one discharge phase.

As used herein, step ID refers to the specific phase within a cycle that is being executed. Each step within a cycle is associated with a particular action or condition, such as charging at a constant current, resting, discharging at constant current, etc.

As used herein, ionic resistance refers to the opposition that ions encounter when they move through a medium, which is influenced by the medium's conductivity, ion concentration, and temperature.

As used herein, parasitic reaction refers to an unwanted, side, or secondary reaction that occurs alongside a desired chemical, physical, or electrochemical process. These reactions often reduce the efficiency or performance of the system and can lead to energy losses, degradation of materials, or unintended byproducts.

As a person skilled in the art will recognize from the previous detailed description and from the figures and claims, modifications and changes may be made to the embodiments of the invention without departing from the scope of this invention as defined in the following claims.

EXAMPLES

The following examples illustrate various non-limiting embodiments of the present disclosure.

Example 1: Fabrication of Nitrogen and Sulfur Porous Graphene (NSPG) Electrode Material 1 g of graphene oxide was dissolved in 500 mL of deionized water. The graphene oxide and water solution ultrasonicated for 2 hours. 0.4 g of chitosan was dissolved in 40 mL of 2 vol % acetic acid solution. The chitosan-acetic acid solution was heated to 45° C. in a water bath and stirred. 0.03 g of thiourea was added to the chitosan-acetic acid solution and the solution was mixed thoroughly. The graphene oxide solution was added to the chitosan-thiourea-acetic acid solution.

Figure 2A:
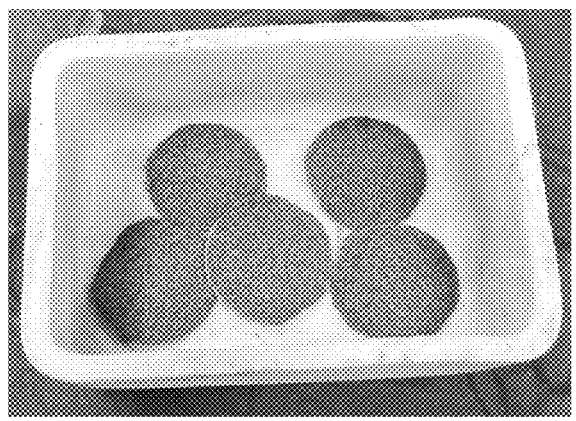
FIG. 2A is a representative pictorial image of electrode materials pre-carbonization in some embodiment.
Figure 2B:
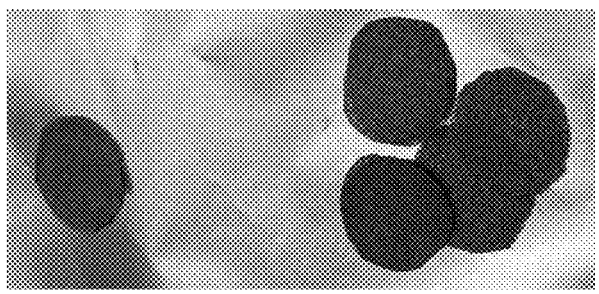
FIG. 2B is a representative pictorial image of electrode materials post-carbonization in some embodiment.

Nickel foam was cut into desired shapes and sizes. The nickel form pieces were immersed into the chitosan-thiourea-graphene oxide mixture to form a coated nickel and excess mixture was removed. 400 µL of glutaraldehyde was added to the coated nickel foam to cross-link the chitosan and form a hydrogel-coated nickel. The pH was adjusted to 8.5-9.5. This pH adjustment is helps to enable the interaction between nitrogen and sulfur sources with the precursor material, which promotes the formation of active functional groups. These functional groups directly contribute to uniform ion diffusion and the stable cycling performance. The hydrogen-coated nickel was treated with liquid nitrogen and freeze dried at −50° C. under 10 Pa. The freeze-dried hydrogel-coated nickel foam was carbonized in a tube furnace under a nitrogen atmosphere at 800° C. for 2 hours with a ramp rate of 5° C./min. FIG. 2A shows the electrodes before carbonization. FIG. 2B shows the electrodes after carbonization. The nickel foam template was dissolved using aqua regia. The NSPG electrode material was washed with ultrapure water and dried at 80° C. in an oven to obtain pure NSPG electrode material.

Example 2: Characterization of Nitrogen and Sulfur Porous Graphene (NSPG) Electrode Material by Raman Spectroscopy The NSPG electrode was characterized using the LabRAM HR Evolution Raman Spectroscopy system.

The Raman spectra obtained from the NSPG electrode were analyzed at two different resolutions: 2 µm and 40 µm. At 2 µm resolution, the Raman map provided detailed information about the spatial distribution of the Raman-active modes in the sample. This high-resolution analysis allowed for the identification of regions of the Ni foam coated with graphene, determination of the uniformity of the graphene coating, and potential identification of areas with different numbers of graphene layers or with defects in the graphene. At 40 µm resolution, the Raman map provided a more macroscopic view of the sample. While it did not provide the same level of detail about the local properties of the graphene or the Ni foam as the higher resolution image, it was useful for identifying larger-scale trends or variations in the graphene coating on the Ni foam.

The Raman spectroscopy analysis provided information about the NSPG electrode. The detailed spectral and spatial data obtained help understand the performance of the NSPG electrode in electrochemical applications. The choice of instrument setup, acquisition options, and acquisition parameters played a significant role in the quality and type of data obtained.

Example 2: Characterization of Nitrogen and Sulfur Porous Graphene (NSPG) Electrode Material by X-Ray Photoelectron Spectroscopy (XPS)

The NSPG electrode was characterized by XPS. Table 1 below shows the atomic percent of elements in the synthesized NSPG electrode.

TABLE 1

Atomic percent of elements in the synthesized NSPG electrode

| Name | Peak BE eV | Height CPS | Area (P) CPS · eV | Atomic % |
|---|---|---|---|---|
| S2p | 170.2 | 589.98 | 1106.43 | 0.24 |
| C1s | 292.3 | 31593.25 | 83009.32 | 36.78 |
| N1s | 406 | 353.2 | 1371.75 | 0.39 |
| O1s | 536.8 | 153906 | 342156.91 | 62.59 |

The XPS data shows a significant amount of oxygen (O1s—62.59 atomic %) in the NSPG electrode material. This suggests that oxygen is present in the material, likely in the form of oxygen-containing functional groups on the graphene sheets. The high oxygen content in the nitrogen and sulfur co-doped porous graphene (NSPG) arose from the graphene oxide precursor used in the synthesis. Graphene oxide (GO) is heavily oxygenated, with oxygen-containing functional groups such as hydroxyl (—OH), epoxy (—O—), carbonyl (=O), and carboxyl (—COOH) groups attached to the graphene sheets. During the reduction process to form NSPG, not all of these oxygen-containing groups were removed, leading to residual oxygen in the final. The exact amount of residual oxygen can depend on the specific reduction conditions used, including the temperature, duration, and type of reducing agent. Furthermore, X-ray photoelectron spectroscopy (XPS) is a surface-sensitive technique, meaning it primarily detects elements present at the surface of the material. As such, the high oxygen content detected by XPS could be due in part to surface oxidation of the NSPG electrode material, which occurred when the material was exposed to air or moisture.

Example 3-2032 Coin Cells

Coin Cell Manufacturing

A coin cell was assembled using a NSPG electrode, a market-acquired LiFePO$_4$ electrode, and a LiPF$_6$ electrolyte in a 2032 form factor coin cell.

The cells were assembled in a nitrogen-filled glove box. This inert environment atmosphere may potentially degrade lithium-based components, typically resulting in reduced performance.

A hydraulic crimper was used to seal the coin cells. Hydraulic crimping may introduce additional stress on the cell components compared to more specialized sealing methods.

Performance of Coin Cells

The performance of the coin cell was tested using the parameters listed in Table 2.

TABLE 2

Test information to measure performance of the assembled coin cell.

| | | Test Information | | |
|---|---|---|---|---|
| Start Step | 1 | Cycle counts | 32 cycle | Record Qualification | 5 sec/ 10.0 mA/ 1000.0 mV |
| Voltage Measuring-range | 5 V | Current Constant | +3000/ −3000 mA | | |

The step setting scheme used to measure the performance of the assembled coin cell is shown in Table 3.

TABLE 3

Step setting scheme.

| StepNum | StepType | Time(mm:ss) | Vol(V) | Cur(mA) |
|---|---|---|---|---|
| 1 | Rest | 10:00 | | |
| 2 | CC_DChg | | 2.8 | 8.9 |
| 3 | Rest | 10:00 | | |
| 4 | CC_Chg | | 4.3 | 8.9 |
| 5 | CV_Chg | | 4.3 | 0.4 |
| 6 | Rest | 10:00 | | |
| 7 | Cycle | Start Step: 2 | Cycle Total: 30 | |
| 8 | Stop | | | |

The measured raw cycle data is shown in Table 4.

TABLE 4

Cycle data from the coin cell.

| Cycle ID | RCap_Chg (mAh/g) | RCap_DChg (mAh/g) | Efficiency (%) | CC_Chg_Rat (%) | REngy_Chg (mWh/g) |
|---|---|---|---|---|---|
| 1 | 295.2 | 256.49928 | 86.89 | 84.27 | 537.9 |
| 2 | 294.5 | 251.0907 | 85.26 | 83.49 | 531.77 |
| 3 | 290.8 | 245.92956 | 84.57 | 83.56 | 530.13 |
| 4 | 282.3 | 237.01908 | 83.96 | 83.68 | 520.81 |
| 5 | 274.3 | 229.64396 | 83.72 | 82.94 | 517.07 |
| 6 | 267.4 | 221.51416 | 82.84 | 82.55 | 516.56 |
| 7 | 258.6 | 213.0864 | 82.4 | 82.48 | 507.9 |
| 8 | 249.4 | 205.82982 | 82.53 | 81.96 | 504.3 |
| 9 | 232.3 | 191.81011 | 82.57 | 81.42 | 497.8 |
| 10 | 227.1 | 187.63002 | 82.62 | 81.5 | 487.76 |
| 11 | 214.2 | 176.80068 | 82.54 | 81.22 | 481 |
| 12 | 203.1 | 167.84184 | 82.64 | 80.52 | 474.11 |
| 13 | 196.5 | 160.83525 | 81.85 | 80.89 | 469.6 |
| 14 | 188.8 | 153.07904 | 81.08 | 80.79 | 465 |
| 15 | 172.1 | 139.50426 | 81.06 | 80.27 | 464.93 |
| 16 | 164.1 | 133.34766 | 81.26 | 79.34 | 457.1 |
| 17 | 158.8 | 127.78636 | 80.47 | 79.69 | 440.85 |
| 18 | 147.2 | 118.14272 | 80.26 | 79.73 | 432.79 |
| 19 | 133.4 | 106.97346 | 80.19 | 78.97 | 420.33 |
| 20 | 129.5 | 103.8072 | 80.16 | 78.89 | 413.15 |
| 21 | 125 | 99.8875 | 79.91 | 78.68 | 411.9 |
| 22 | 124.8 | 99.36576 | 79.62 | 77.86 | 411.8 |
| 23 | 124.7 | 98.74993 | 79.19 | 77.09 | 411.3 |
| 24 | 122 | 96.6362 | 79.21 | 76.23 | 409.88 |
| 25 | 121.5 | 95.4261 | 78.54 | 76.56 | 409.71 |
| 26 | 122.5 | 95.893 | 78.28 | 76.01 | 409.13 |
| 27 | 122.4 | 95.93712 | 78.38 | 76.06 | 409.12 |
| 28 | 121.6 | 94.9696 | 78.1 | 75.4 | 409.08 |
| 29 | 120.8 | 93.9824 | 77.8 | 74.87 | 408.94 |
| 30 | 117.6 | 91.35168 | 77.68 | 73.71 | 408.8 |
| 31 | 117.8 | 90.44684 | 76.78 | 72.31 | 408.81 |
| 32 | 117.7 | 90.24059 | 76.67 | 71.68 | 408.72 |

The measured step data is shown in Table 5.

TABLE 5

Cycle data from the coin cell.

| Cycle ID | Step ID | Step Type | Start Vol(mV) | End Vol(mV) |
|---|---|---|---|---|
| 1 | 1 | Rest | 3830.6 | 3816.7 |
| 1 | 2 | CC_DChg | 3816.4 | 2799.7 |
| 1 | 3 | Rest | 2800.9 | 2818.9 |
| 2 | 4 | CC_Chg | 2820.7 | 4299.3 |
| 2 | 5 | CV_Chg | 4299.6 | 4299.6 |
| 2 | 6 | Rest | 4297.1 | 4272.8 |
| 2 | 7 | CC_DChg | 4270.9 | 2796.3 |
| 2 | 8 | Rest | 2796.2 | 2885.7 |
| 3 | 9 | CC_Chg | 2889.7 | 4299.6 |
| 3 | 10 | CV_Chg | 4299.6 | 4299.6 |
| 3 | 11 | Rest | 4298.5 | 4278.9 |
| 3 | 12 | CC_DChg | 4278.8 | 2788 |
| 3 | 13 | Rest | 2788.3 | 2889.7 |
| 4 | 14 | CC_Chg | 2900.4 | 4299.6 |
| 4 | 15 | CV_Chg | 4299.6 | 4299.6 |
| 4 | 16 | Rest | 4295.3 | 4269.4 |
| 4 | 17 | CC_DChg | 4267.1 | 2797.7 |
| 4 | 18 | Rest | 2800.3 | 2874.3 |
| 5 | 19 | CC_Chg | 2879.3 | 4299.6 |
| 5 | 20 | CV_Chg | 4299.6 | 4299.6 |
| 5 | 21 | Rest | 4298.2 | 4268.1 |
| 5 | 22 | CC_DChg | 4266.9 | 2796.8 |
| 5 | 23 | Rest | 2797.2 | 2863.7 |
| 6 | 24 | CC_Chg | 2869.6 | 4299.6 |
| 6 | 25 | CV_Chg | 4299.6 | 4299.6 |
| 6 | 26 | Rest | 4296.4 | 4265.9 |
| 6 | 27 | CC_DChg | 4262.3 | 2798.6 |
| 6 | 28 | Rest | 2799.4 | 2854.1 |
| 7 | 29 | CC_Chg | 2859.6 | 4299.6 |
| 7 | 30 | CV_Chg | 4299.6 | 4299.6 |
| 7 | 31 | Rest | 4296.6 | 4274.5 |
| 7 | 32 | CC_DChg | 4273.8 | 2800.8 |
| 7 | 33 | Rest | 2800.9 | 2854.9 |
| 8 | 34 | CC_Chg | 2856.9 | 4299.6 |
| 8 | 35 | CV_Chg | 4299.6 | 4299.6 |
| 8 | 36 | Rest | 4293.2 | 4270.5 |
| 8 | 37 | CC_DChg | 4268.7 | 2801.7 |
| 8 | 38 | Rest | 2800.9 | 2895.6 |
| 9 | 39 | CC_Chg | 2901.4 | 4299.6 |
| 9 | 40 | CV_Chg | 4299.6 | 4299.6 |
| 9 | 41 | Rest | 4291.7 | 4269.9 |
| 9 | 42 | CC_DChg | 4265.3 | 2800.5 |
| 9 | 43 | Rest | 2802.6 | 2886.9 |
| 10 | 44 | CC_Chg | 2906.4 | 4299.6 |
| 10 | 45 | CV_Chg | 4299.6 | 4299.6 |
| 10 | 46 | Rest | 4299.1 | 4279.5 |
| 10 | 47 | CC_DChg | 4278.1 | 2799.6 |
| 10 | 48 | Rest | 2804.1 | 2871.4 |
| 11 | 49 | CC_Chg | 2879.6 | 4299.6 |
| 11 | 50 | CV_Chg | 4299.6 | 4299.6 |
| 11 | 51 | Rest | 4297.1 | 4278.5 |
| 11 | 52 | CC_DChg | 4277.8 | 2797.8 |
| 11 | 53 | Rest | 2799.5 | 2885.7 |
| 12 | 54 | CC_Chg | 2899.1 | 4299.6 |
| 12 | 55 | CV_Chg | 4299.6 | 4299.6 |
| 12 | 56 | Rest | 4292.4 | 4269.1 |
| 12 | 57 | CC_DChg | 4264.6 | 2804.6 |
| 12 | 58 | Rest | 2809.1 | 2887.5 |
| 13 | 59 | CC_Chg | 2889.6 | 4299.6 |
| 13 | 60 | CV_Chg | 4299.6 | 4299.6 |
| 13 | 61 | Rest | 4298.7 | 4266.7 |
| 13 | 62 | CC_DChg | 4264.1 | 2801.1 |
| 13 | 63 | Rest | 2805.4 | 2874.5 |
| 14 | 64 | CC_Chg | 2877.6 | 4299.6 |
| 14 | 65 | CV_Chg | 4299.6 | 4299.6 |
| 14 | 66 | Rest | 4297.2 | 4269.3 |
| 14 | 67 | CC_DChg | 4268.3 | 2803.4 |
| 14 | 68 | Rest | 2808.9 | 2873 |
| 15 | 69 | CC_Chg | 2874.9 | 4299.1 |
| 15 | 70 | CV_Chg | 4299.3 | 4299.6 |
| 15 | 71 | Rest | 4292.5 | 4268.4 |
| 15 | 72 | CC_DChg | 4263.2 | 2798.3 |
| 15 | 73 | Rest | 2798.7 | 2868 |
| 16 | 74 | CC_Chg | 2869.6 | 4299.7 |
| 16 | 75 | CV_Chg | 4299.6 | 4299.3 |
| 16 | 76 | Rest | 4297.1 | 4265.3 |
| 16 | 77 | CC_DChg | 4260.2 | 2802.6 |
| 16 | 78 | Rest | 2809.8 | 2873.2 |
| 17 | 79 | CC_Chg | 2875.9 | 4299.7 |
| 17 | 80 | CV_Chg | 4300.9 | 4300.9 |
| 17 | 81 | Rest | 4298.6 | 4269.1 |
| 17 | 82 | CC_DChg | 4268.8 | 2808.4 |
| 17 | 83 | Rest | 2808.6 | 2871.1 |
| 18 | 84 | CC_Chg | 2874.6 | 4299.7 |
| 18 | 85 | CV_Chg | 4300.9 | 4300.9 |
| 18 | 86 | Rest | 4298.7 | 4268.3 |
| 18 | 87 | CC_DChg | 4267.8 | 2801.7 |
| 18 | 88 | Rest | 2813.9 | 2869.2 |
| 19 | 89 | CC_Chg | 2869.6 | 4299.7 |
| 19 | 90 | CV_Chg | 4300.9 | 4300.9 |
| 19 | 91 | Rest | 4290.7 | 4261.9 |
| 19 | 92 | CC_DChg | 4259.1 | 2799.1 |
| 19 | 93 | Rest | 2801 | 2878.2 |
| 20 | 94 | CC_Chg | 2878.9 | 4299.7 |
| 20 | 95 | CV_Chg | 4299.6 | 4299.6 |
| 20 | 96 | Rest | 4292.1 | 4263.8 |
| 20 | 97 | CC_DChg | 4263.4 | 2799.3 |
| 20 | 98 | Rest | 2803.7 | 2886 |
| 21 | 99 | CC_Chg | 2889.6 | 4299.1 |
| 21 | 100 | CV_Chg | 4299.6 | 4299.6 |
| 21 | 101 | Rest | 4299.3 | 4274.4 |
| 21 | 102 | CC_DChg | 4271.4 | 2804.4 |
| 21 | 103 | Rest | 2808.7 | 2878.9 |
| 22 | 104 | CC_Chg | 2880 | 4299.3 |
| 22 | 105 | CV_Chg | 4299.6 | 4299.6 |
| 22 | 106 | Rest | 4299.5 | 4274.1 |
| 22 | 107 | CC_DChg | 4271 | 2801.1 |
| 22 | 108 | Rest | 2808.9 | 2880.7 |
| 23 | 109 | CC_Chg | 2880.9 | 4298.9 |
| 23 | 110 | CV_Chg | 4299.6 | 4299.6 |
| 23 | 111 | Rest | 4297.1 | 4270.8 |
| 23 | 112 | CC_DChg | 4269.9 | 2802.4 |
| 23 | 113 | Rest | 2807.2 | 2883.5 |
| 24 | 114 | CC_Chg | 2885 | 4299 |
| 24 | 115 | CV_Chg | 4299.6 | 4299.6 |
| 24 | 116 | Rest | 4295.1 | 4269.5 |
| 24 | 117 | CC_DChg | 4261.1 | 2811.1 |
| 24 | 118 | Rest | 2816.2 | 2885.9 |
| 25 | 119 | CC_Chg | 2887.1 | 4299.3 |
| 25 | 120 | CV_Chg | 4299.6 | 4299.6 |
| 25 | 121 | Rest | 4296.7 | 4268.1 |
| 25 | 122 | CC_DChg | 4265.2 | 2805.2 |
| 25 | 123 | Rest | 2807.3 | 2884.3 |
| 26 | 124 | CC_Chg | 2885.1 | 4299.3 |
| 26 | 125 | CV_Chg | 4299.6 | 4299.9 |
| 26 | 126 | Rest | 4299.9 | 4278.9 |
| 26 | 127 | CC_DChg | 4273.1 | 2803.1 |
| 26 | 128 | Rest | 2803.1 | 2875.1 |
| 27 | 129 | CC_Chg | 2875.5 | 4299.3 |
| 27 | 130 | CV_Chg | 4299.6 | 4299.6 |
| 27 | 131 | Rest | 4297.8 | 4278.5 |
| 27 | 132 | CC_DChg | 4272.4 | 2802.4 |
| 27 | 133 | Rest | 2802.3 | 2875.2 |
| 28 | 134 | CC_Chg | 2875.9 | 4299.3 |
| 28 | 135 | CV_Chg | 4299.9 | 4299.6 |
| 28 | 136 | Rest | 4296.6 | 4278.2 |
| 28 | 137 | CC_DChg | 4271.5 | 2801.5 |
| 28 | 138 | Rest | 2802.9 | 2875.6 |
| 29 | 139 | CC_Chg | 2877.2 | 4299.3 |
| 29 | 140 | CV_Chg | 4299.9 | 4299.6 |
| 29 | 141 | Rest | 4295.7 | 4277 |
| 29 | 142 | CC_DChg | 4275.2 | 2799.9 |
| 29 | 143 | Rest | 2803.2 | 2876.1 |
| 30 | 144 | CC_Chg | 2876.5 | 4299.3 |
| 30 | 145 | CV_Chg | 4299.6 | 4299.6 |
| 30 | 146 | Rest | 4296.3 | 4272.1 |
| 30 | 147 | CC_DChg | 4272.1 | 2801.2 |
| 30 | 148 | Rest | 2809.9 | 2873.8 |
| 31 | 149 | CC_Chg | 2875.5 | 4299.3 |

TABLE 5-continued

Cycle data from the coin cell.

| Cycle ID | Step ID | Step Type | Start Vol(mV) | End Vol(mV) |
|---|---|---|---|---|
| 31 | 150 | CV_Chg | 4299.6 | 4299.6 |
| 31 | 151 | Rest | 4296.6 | 4266.1 |
| 31 | 152 | CC_DChg | 4261.2 | 2800.3 |
| 31 | 153 | Rest | 2807.1 | 2878.5 |
| 32 | 154 | CC_Chg | 2881.1 | 4299.3 |
| 32 | 155 | CV_Chg | 4299.9 | 4299.9 |
| 32 | 156 | Rest | 4298.1 | 4265.5 |

The start voltage, mid-voltage, and end voltage of the CC_DChg step is shown in Table 6.

TABLE 6

Start voltage and end voltage of the CC_DChg step

| Step Type | Start Vol(mV) | End Vol(mV) | Mid Vol(mV) |
|---|---|---|---|
| CC_DChg | 3816.4 | 2799.7 | 3308.05 |
| CC_DChg | 4270.9 | 2796.3 | 3533.6 |
| CC_DChg | 4278.8 | 2788 | 3533.4 |
| CC_DChg | 4267.1 | 2797.7 | 3532.4 |
| CC_DChg | 4266.9 | 2796.8 | 3531.85 |
| CC_DChg | 4262.3 | 2798.6 | 3530.45 |
| CC_DChg | 4273.8 | 2800.8 | 3537.3 |
| CC_DChg | 4268.7 | 2801.7 | 3535.2 |
| CC_DChg | 4265.3 | 2800.5 | 3532.9 |
| CC_DChg | 4278.1 | 2799.6 | 3538.85 |
| CC_DChg | 4277.8 | 2797.8 | 3537.8 |
| CC_DChg | 4264.6 | 2804.6 | 3534.6 |
| CC_DChg | 4264.1 | 2801.1 | 3532.6 |
| CC_DChg | 4268.3 | 2803.4 | 3535.85 |
| CC_DChg | 4263.2 | 2798.3 | 3530.75 |
| CC_DChg | 4260.2 | 2802.6 | 3531.4 |
| CC_DChg | 4268.8 | 2808.4 | 3538.6 |
| CC_DChg | 4267.8 | 2801.7 | 3534.75 |
| CC_DChg | 4259.1 | 2799.1 | 3529.1 |
| CC_DChg | 4263.4 | 2799.3 | 3531.35 |
| CC_DChg | 4271.4 | 2804.4 | 3537.9 |
| CC_DChg | 4271 | 2801.1 | 3536.05 |
| CC_DChg | 4269.9 | 2802.4 | 3536.15 |
| CC_DChg | 4261.1 | 2811.1 | 3536.1 |

TABLE 6-continued

Start voltage and end voltage of the CC_DChg step

| Step Type | Start Vol(mV) | End Vol(mV) | Mid Vol(mV) |
|---|---|---|---|
| CC_DChg | 4265.2 | 2805.2 | 3535.2 |
| CC_DChg | 4273.1 | 2803.1 | 3538.1 |
| CC_DChg | 4272.4 | 2802.4 | 3537.4 |
| CC_DChg | 4271.5 | 2801.5 | 3536.5 |
| CC_DChg | 4275.2 | 2799.9 | 3537.55 |
| CC_DChg | 4272.1 | 2801.2 | 3536.65 |
| CC_DChg | 4261.2 | 2800.3 | 3530.75 |

The nominal voltage was determined to be 3527.39 mV by calculating the average of the mid voltage in the CC_DChg step shown in Table 6.

The raw data shown in Tables 4-5 was analyzed using the equations listed in Table 7 to determine the capacity (mAh), charge time (hrs), capacity retention (%), capacity fade (mAh/g), coulombic efficiency (%), and state of health (SoH). As shown in Table 7, capacity was determined by multiplying the specific capacity with the mass of the active material. The charging current used for the analysis was 8.9 mA. The amount of active material in electrode was 0.3 g.

TABLE 7

Equations used to determine the coin cell properties.

| | |
|---|---|
| Capacity (mAh) | RCap (mAh/g) × mass (g) of Active Material in the electrode |
| Charge/Discharge Time (hrs) | Capacity (mAh)/Charge or Discharge Current (mA) |
| Capacity Retention (%) | RCap_DChg (Cycle N)/Rcap_DChg (Cycle 1) × 100% |
| Capacity Fade (mAh/g) | RCap_DChg (Cycle 1) − RCap_DChg (Cycle N) |
| Coulombic Efficiency (%) | RCap_DChg/RCap_Chg × 100% |
| State of Health (SoH) (%) | Capacity (Cycle N)/Capacity (Cycle 1) × 100% |

Table 8 shows the results of the analysis of the raw data in Tables 4 and 5 using the formulae in Table 6.

TABLE 8

Properties of the coin cell with the NSPG electrode.

| Cycle ID | Capacity (mAh) | Charge Time (hrs) | Capacity Retention (%) | Capacity Fade (mAh/g) | Coulombic Efficiency (%) | State of Health (SoH) (%) |
|---|---|---|---|---|---|---|
| 1 | 88.56 | 9.950561798 | 100 | 0 | 86.89 | 100 |
| 2 | 88.35 | 9.926966292 | 97.89138589 | 5.40858 | 85.26 | 99.76287263 |
| 3 | 87.24 | 9.802247191 | 95.87923989 | 10.56972 | 84.57 | 98.50948509 |
| 4 | 84.69 | 9.515730337 | 92.405388 | 19.4802 | 83.96 | 95.630013 |
| 5 | 82.29 | 9.246067416 | 89.53006028 | 26.85532 | 83.72 | 92.9200542 |
| 6 | 80.22 | 9.013483146 | 86.36053871 | 34.98512 | 82.84 | 90.58265583 |
| 7 | 77.58 | 8.716853933 | 83.07485308 | 43.41288 | 82.4 | 87.60162602 |
| 8 | 74.82 | 8.406741573 | 80.24576911 | 50.66946 | 82.53 | 84.48509485 |
| 9 | 69.69 | 7.830337079 | 74.77997989 | 64.68917 | 82.57 | 78.69241192 |
| 10 | 68.13 | 7.65505618 | 73.1503106 | 68.86926 | 82.62 | 76.93089431 |
| 11 | 64.26 | 7.220224719 | 68.92833383 | 79.6986 | 82.54 | 72.56097561 |
| 12 | 60.93 | 6.846067416 | 65.43559888 | 88.65744 | 82.64 | 68.80081301 |
| 13 | 58.95 | 6.623595506 | 62.70397718 | 95.66403 | 81.85 | 66.56504065 |
| 14 | 56.64 | 6.364044944 | 59.68010514 | 103.42024 | 81.08 | 63.95663957 |
| 15 | 51.63 | 5.801123569 | 54.3877784 | 116.99502 | 81.06 | 58.29945799 |
| 16 | 49.23 | 5.531460674 | 51.98753774 | 123.15162 | 81.26 | 55.58943089 |
| 17 | 47.64 | 5.352808989 | 49.81938351 | 128.71292 | 80.47 | 53.79403794 |
| 18 | 44.16 | 4.961797753 | 46.05966925 | 138.35656 | 80.26 | 49.86449864 |
| 19 | 40.02 | 4.496629213 | 41.7051697 | 149.52582 | 80.19 | 45.1897019 |
| 20 | 38.85 | 4.365168539 | 40.47075688 | 152.69208 | 80.16 | 43.86856369 |
| 21 | 37.5 | 4.213483146 | 38.94260444 | 156.61178 | 79.91 | 42.34417344 |
| 22 | 37.44 | 4.206741573 | 38.73919646 | 157.13352 | 79.62 | 42.27642276 |

TABLE 8-continued

Properties of the coin cell with the NSPG electrode.

| Cycle ID | Capacity (mAh) | Charge Time (hrs) | Capacity Retention (%) | Capacity Fade (mAh/g) | Coulombic Efficiency (%) | State of Health (SoH) (%) |
|---|---|---|---|---|---|---|
| 23 | 37.41 | 4.20337078 | 38.49910612 | 157.74935 | 79.19 | 42.24254743 |
| 24 | 36.6 | 4.112359551 | 37.67503753 | 159.86308 | 79.21 | 41.32791328 |
| 25 | 36.45 | 4.095505618 | 37.20326232 | 161.07318 | 78.54 | 41.15853659 |
| 26 | 36.75 | 4.129213483 | 37.38529013 | 160.60628 | 78.28 | 41.49728997 |
| 27 | 36.72 | 4.125842697 | 37.40249095 | 160.56216 | 78.38 | 41.46341463 |
| 28 | 36.48 | 4.098876404 | 37.02528912 | 161.52968 | 78.1 | 41.19241192 |
| 29 | 36.24 | 4.071910112 | 36.64041474 | 162.51688 | 77.8 | 40.92140921 |
| 30 | 35.28 | 3.964044944 | 35.61479003 | 165.1476 | 77.68 | 38.83739837 |
| 31 | 35.34 | 3.970786517 | 35.26202491 | 166.05244 | 76.78 | 39.90514905 |
| 32 | 35.31 | 3.96741573 | 35.18161532 | 166.25869 | 76.67 | 39.87127371 |

The average capacity of the coin cell was calculated by taking the average of all the cell capacities in Table 8. The average coin cell capacity was 54.73 mAh.

The average charge time of the coin cell was calculated by taking the average of all the charge times in Table 8. The average charge time was 6.15 hrs.

Figure 6:
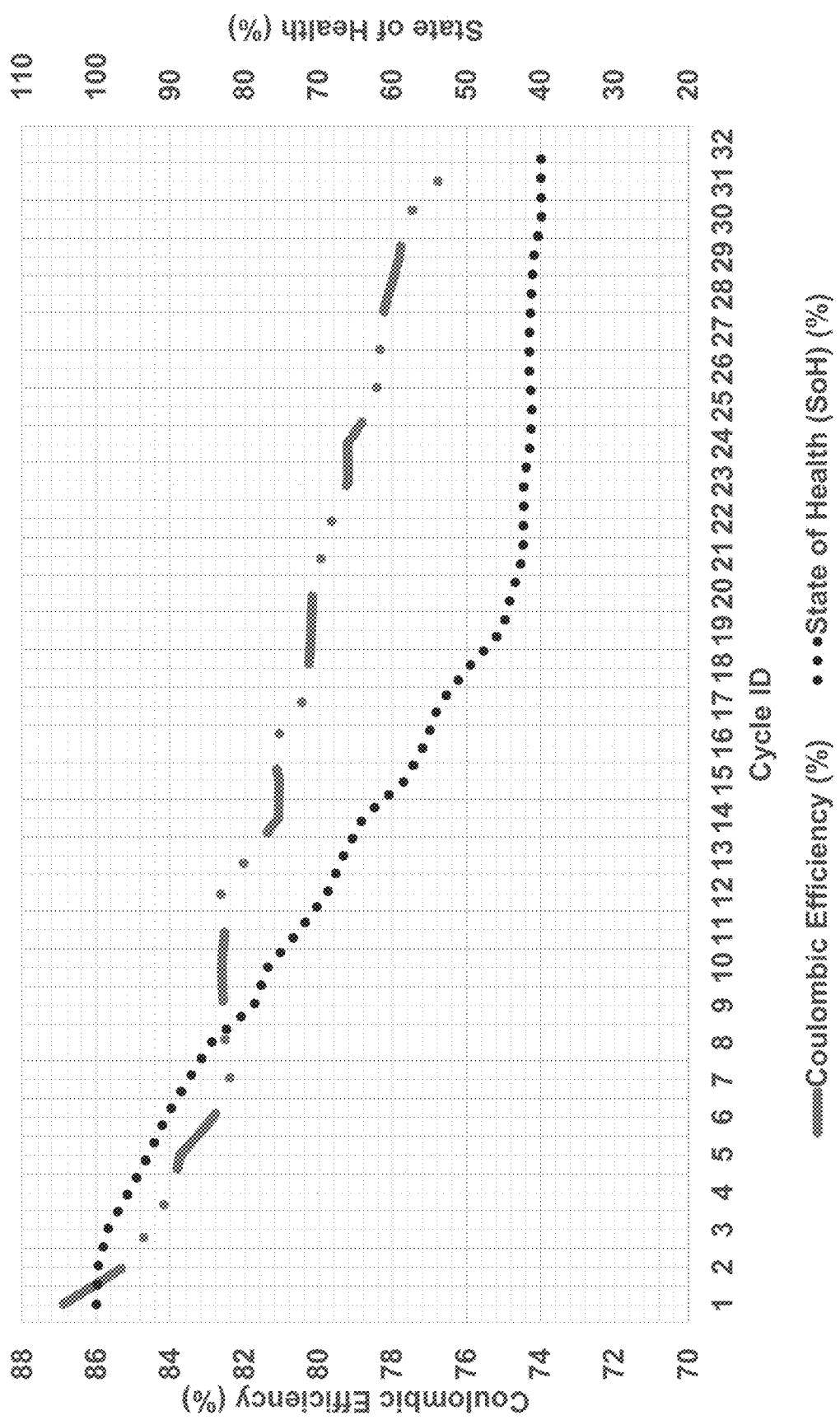
FIG. 6 shows representative line charts showing coulombic efficiency and state of health over cycles according to some embodiments of the present disclosure.
Figure 7:
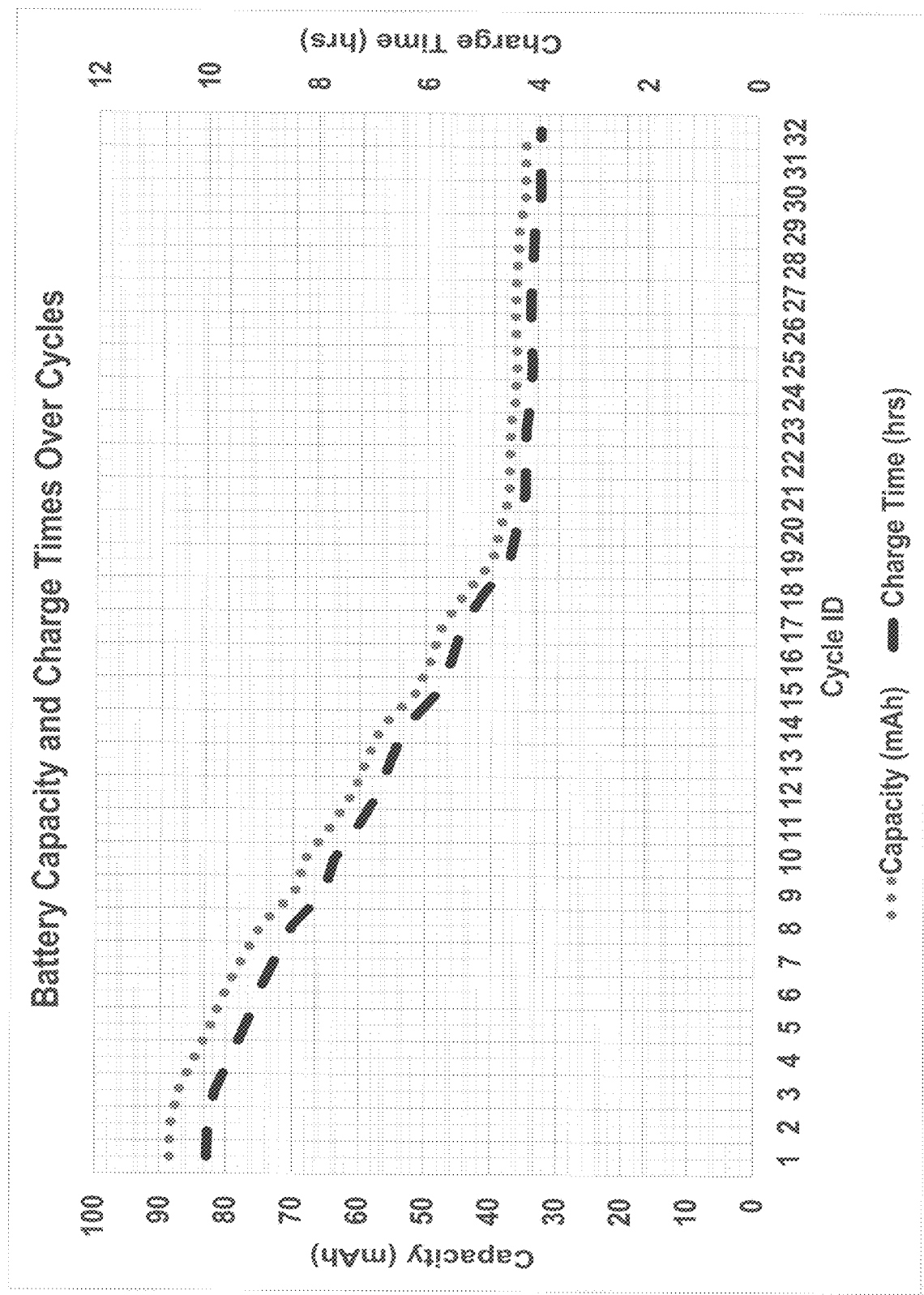
FIG. 7 shows representative line charts showing battery capacity and charge time over cycles according to some embodiments of the present disclosure.

The analyzed data in Table 8 is represented graphically in FIGS. 5-7. FIG. 5 represents line plots showing capacity retention (%) vs. cycle and capacity fade (mAh/g) vs. cycle of the coin cell. FIG. 6 represents line plots showing coulombic efficiency (%) vs. cycle and state of health (SoH) (%) vs. cycle of the coin cell. FIG. 7 represents line plots showing capacity (mAh) vs. cycle and charge time (hours) vs. cycle of the coin cell.

The coin cell achieved a voltage 4.3 V, which is significantly higher than the typical 3.6 V of conventional lithium-ion cells. This higher voltage potentially allows for more efficient energy storage and use.

The coin cell achieved an energy density of 537.9 Wh/kg, a substantial improvement over conventional lithium-based cells, which typically offer 200-300 Wh/kg. The coin cells demonstrated an increase in energy density of 68-169% compared to conventional technology.

The coin cell demonstrated a capacity of 54.73 mAh. The achieved capacity significantly outperformed the state-of-the-art based coin cells, which typically offer only around 30 mAh.

Despite the manufacturing conditions stated above, the inventive NSPG electrodes demonstrated superior performance, underscoring the robustness and potential of our technology. The versatility shown by both electrode configurations suggests broad potential applications.

Example 4—Assemble a Battery Using the Disclosed Electrodes

To assemble a battery using NSPG and TRG graphene-based electrodes, the dual-ion concept will be leveraged, which involves the simultaneous intercalation of both cations and anions into the electrodes during charge and discharge cycles. This approach is important for enhancing the energy density and cycling stability of the battery. The electrochemical aspect of this assembly is central to its performance, and the choice of electrolyte and additives will play a significant role.

For optimal performance, it is intended to utilize ionic liquid electrolytes due to their high electrochemical stability and non-flammability. Specifically, 1-butyl-1-methylpyrrolidinium bis(trifluoromethylsulfonyl)imide (Pyr14TFSI) will be selected, an ionic liquid electrolyte, known for its extended anodic stability and reduced risk of solvent co-intercalation at high potentials. However, Pyr14TFSI alone can cause issues such as graphene exfoliation when used with graphene anodes, leading to poor overall performance. To mitigate this issue, certain additives that form a stable solid electrolyte interphase (SEI) on the graphene surface will be incorporated.

Fluoroethylene carbonate (FEC), a carbonate additive, and ethylene sulfite (ES), a sulfite additive, will be key additives to enhance the performance of the Pyr14TFSI electrolyte in DCBs. FEC is highly effective in improving the electrochemical stability of the electrolyte. During the initial charging cycles, FEC will decompose to form a stable and robust SEI layer on the anode's surface. This SEI layer will prevent further electrolyte decomposition, reduce side reactions, and enhance overall cycling stability. FEC is particularly beneficial for high-voltage applications as it maintains the integrity of the electrode materials and minimizes capacity fade over extended cycling.

Similarly, ES will decompose to form a protective SEI on the electrode surfaces, stabilizing the electrolyte and preventing detrimental side reactions. ES is especially effective in improving the low-temperature performance of batteries and increasing their overall efficiency. By incorporating ES into the electrolyte, the reversible capacity and cycling stability of the battery will be significantly improved.

In addition to these non-salt additives, certain salt additives will also be used to further enhance the electrolyte's performance. Salts such as lithium bis(trifluoromethanesulfonyl)imide (LiTFSI), a lithium salt, and lithium hexafluorophosphate (LiPF6), another lithium salt, will help maintain high ionic conductivity and stability of the electrolyte, crucial for the efficient operation of the battery. These salts will support the dual-ion intercalation process by providing a stable ionic environment for both cations and anions.

In the electrochemical operation of our dual carbon battery, the NSPG and TRG graphene-based electrodes will work synergistically to facilitate the dual-ion concept. During the charging process, cations (such as Li+) will intercalate into the NSPG electrode, while anions (such as TFSI– or PF6–) will intercalate into the TRG electrode. This simultaneous intercalation increases the energy storage capacity of the battery by utilizing both electrodes for ion storage. The use of Pyr14TFSI, enhanced with FEC and ES, will ensure that these intercalation processes occur efficiently and stably, even at high voltages.

The enhanced SEI layers formed by FEC and ES additives will protect the electrode materials from degradation, thereby improving the cycle life of the battery. These SEI layers will also reduce the overall impedance of the battery, leading to higher Coulombic efficiency and better power performance. The inclusion of LiTFSI or LiPF6 salts will further improve the ionic conductivity of the electrolyte, ensuring rapid ion transport and reducing polarization during high-rate cycling.

Overall, by carefully selecting and optimizing the electrolyte and additives, the assembled DCB should achieve superior electrochemical performance. This will include high energy density, excellent cycling stability, and robust safety characteristics, making it a viable and efficient energy storage solution leveraging the dual-ion intercalation concept.

Example 5: Synthesis of Co-Doped Triethylene Glycol Reduced Graphene 100 mg of dried graphene oxide (8.33 µmoles) was dispersed in 112 ml of triethylene glycol by ultrasonication for 2-3 hours. 5 mg of chitosan (0.031 moles) and 5 mg (0.066 moles) of thiourea were added to achieve a 1:1 N/S atomic ratio to form a mixture. The pH of the mixture was adjusted to 9-10 using 1.6 ml of 25% ammonia solution. The pH adjustment enable the interaction between nitrogen and sulfur sources with the precursor material, which promotes the formation of active functional groups. These functional groups directly contribute to uniform ion diffusion and the stable cycling performance observed in the provided data, such as consistent capacity. The mixture was heated at approximately 278° C. under reflux conditions in an inert atmosphere (e.g., argon or nitrogen) for 90 minutes, then held at that temperature for an additional 30 minutes. After cooling, the mixture was diluted, centrifuged, and washed multiple times to obtain the sulfur and nitrogen co-doped triethylene glycol reduced graphene pellet, which was then vacuum dried at 65° C. for 6 hours. The yield of the co-doped triethylene glycol reduced pellet was between 70-80%. The purity of the co-doped triethylene glycol reduced pellet was between greater than 95% (e.g., greater than 96%, greater than 97%, greater than 98%, or greater than 99%).

Example 6—Cathode Fabrication

The desired amount of co-doped TRG to resulting in 90 wt % of the total electrode mass was mixed with a 1 wt % chitosan solution to form a homogeneous slurry. The slurry was coated onto an aluminum current collector using a doctor blade or other coating technique. The coated electrode was dried in a vacuum oven at 80° C. for 12 hours. The dried coated electrode is calendared using a roll press to achieve the desired thickness and density of 200 µm and approximately 1.6 g/cm$^3$ respectively. Electrode discs were cut using a disc cutter.

Example 7—Characterization of Cathode by Raman Spectroscopy

The co-doped TRG cathode was characterized using the LabRAM HR Evolution Raman Spectroscopy system.

The instrument setup parameters were as follows: Detector: SIN-EM FIUC, StageXY: 75×50 mm Scan+; Objective: ×10_VIS; Grating: 600 (500 nm); ND Filter: 25%; Laser: 532_Edge; Hole: 100; Range: Visible; and AFM: Off.

The acquisition options parameters were follows: Delay Time (s): 0; Binning: 1; Readout mode: Signal; Shutter Mode: Always open; Spike Filter: Off; Denoiser: Off; Laser mode: Auto; ICS correction: Off; and Dark Correction: off The acquisition parameters were as follows: Title: TRG; Spectro (cm$^{-1}$): 1999.85; RTD time (s): 1; Range: 1300-3000; AE level (cnts): 50000; Autofocus type: Spectral; DuoScan Spot: off; Acq. time (s): 2; Accumulation: 2; Autofocus mode: At Start; and Estimated time: 24 sec.

The Raman spectra obtained from the TRG cathode were analyzed at two different resolutions: 2 µm and 40 µm. At 2 µm resolution, the Raman map provided detailed information about the spatial distribution of the Raman-active modes in the sample. This high-resolution analysis allowed for the identification of regions of the cathode coated with TRG, determination of the uniformity of the TRG coating, and potential identification of areas with different numbers of graphene layers or with defects in the graphene.

At 40 µm resolution, the Raman map provided a more macroscopic view of the sample. While it did not provide the same level of detail about the local properties of the graphene or the cathode as the higher resolution image, it was useful for identifying larger-scale trends or variations in the TRG coating on the cathode.

The Raman spectra obtained from the co-doped TGR cathodes was analyzed at two different resolutions: 2 µm and 40 µm. At 2 µm resolution, the Raman map provided detailed information about the spatial distribution of the Raman-active modes in the sample. This high-resolution analysis allowed for the identification of regions of the cathode coated with TRG, determination of the uniformity of the TRG coating, and potential identification of areas with different numbers of graphene layers or with defects in the graphene. At 40 µm resolution, the Raman map provided a more macroscopic view of the sample. While it did not provide the same level of detail about the local properties of the graphene or the cathode as the higher resolution image, it was useful for identifying larger-scale trends or variations in the TRG coating on the cathode.

Example 8—Characterization of Cathode by XPS

The co-doped TRG cathode was characterized by XPS. Table 9 below shows the atomic percent of elements in the synthesized co-doped TRG cathode.

TABLE 9

Atomic percent of elements in the synthesized co-doped TRG cathode.

| Name | Peak BE eV | Height CPS | Area (P) CPS · eV | Atomic % |
|---|---|---|---|---|
| S2p | 162.88 ± 0.1 | 268.21 | 1107.21 ± 0.1 | 0.04 |
| C1s | 285.49 ± 0.1 | 271774.48 | 820282.37 ± 0.1 | 61.85 |
| N1s | 398.66 ± 0.1 | 49070.29 | 103088.31 ± 0.1 | 5.00 |
| O1s | 531.83 ± 0.1 | 478807.24 | 1061980.04 ± 0.1 | 33.11 |

Peak Binding Energy (BE): The uncertainty in the peak binding energy is primarily determined by the precision of the XPS instrument. The ESCALAB™ QXi X-ray Photoelectron Spectrometer (XPS) Microprobe XPS instrument can measure binding energy with an accuracy of ±0.1 eV or better. This precision is achieved through careful calibration of the instrument using reference materials with known binding energies.

Height CPS (Counts Per Second): The height of the peak in an XPS spectrum represents the number of photoelectrons detected at a particular binding energy. The uncertainty in the peak height can be influenced by several factors, including statistical fluctuations in the number of photoelectrons detected, noise in the detector, and variations in the X-ray source intensity. The uncertainty in the peak height could be on the order of a 2-3% percent of the peak height.

FWHM (Full Width at Half Maximum): The FWHM is a measure of the width of the peak in the XPS spectrum, and it provides information about the energy distribution of the photoelectrons. The uncertainty in the FWHM is determined by the quality of the peak fitting, which can be affected by noise in the data and the appropriateness of the peak shape model. Other factors, such as the resolution of the energy analyzer and the natural linewidth of the photoelectron peak, can also contribute to the uncertainty. Therefore, the uncertainty in the FWHM could be on the order of ±0.1 eV.

Area (P) CPS.eV: The area under the peak in the XPS spectrum represents the total number of photoelectrons detected for a particular element, and it is used to determine the elemental composition of the sample. The uncertainty in the peak area can be high, an uncertainty of greater than 20%. This uncertainty is influenced by the same factors as the peak height, as well as uncertainties in the baseline subtraction and the fitting of the peak shape. The peak area may be affected by the sample's surface roughness.

Example 9-2032 Coin Cells

Coin Cell Manufacturing

A coin cell was assembled using a TRG electrode, a market-acquired $LiFePO_4$ electrode, and a $LiPF_6$ electrolyte in a 2032 form factor coin cell.

The cells were assembled in a nitrogen-filled glove box. This inert environment atmosphere may potentially degrade lithium-based components, typically resulting in reduced performance.

A hydraulic crimper was used to seal the coin cells. Hydraulic crimping may introduce additional stress on the cell components compared to more specialized sealing methods.

Performance of Coin Cells

The performance of the coin cell was tested using the parameters listed in Table 10.

TABLE 10

Test information to measure performance of the assembled coin cell.
Test Information

| Start Step | 1 | Cycle counts | 32 cycle | Record Qualification | 5 sec/ 10.0 mA/ 1000.0 mV |
|---|---|---|---|---|---|
| Voltage Measuring-range | 5V | Current Constant | +3000/ −3000 mA | | |

The step setting scheme used to measure the performance of the assembled coin cell is shown in Table 11.

TABLE 11

Step setting scheme.

| StepNum | StepType | Time(mm:ss) | Vol(V) | Cur(mA) |
|---|---|---|---|---|
| 1 | Rest | 10:00 | | |
| 2 | CC_DChg | | 2.8 | 8.9 |
| 3 | Rest | 10:00 | | |
| 4 | CC_Chg | | 4.3 | 8.9 |
| 5 | CV_Chg | | 4.3 | 0.4 |
| 6 | Rest | 10:00 | | |
| 7 | Cycle | Start Step: 2 | Cycle Total: 30 | |
| 8 | Stop | | | |

The measured raw cycle data is shown in Table 12.

TABLE 12

Cycle data from the coin cell.

| Cycle ID | RCap_Chg (mAh/g) | RCap_DChg (mAh/g) | Efficiency (%) | CC_Chg_Rat (%) | REngy_Chg (mWh/g) |
|---|---|---|---|---|---|
| 1 | 158 | 139.04 | 88 | 87.56 | 504.4 |
| 2 | 151.9 | 126.73017 | 83.43 | 84.29 | 490.6 |
| 3 | 151.3 | 124.32321 | 82.17 | 77.08 | 486.4 |
| 4 | 151.3 | 123.92983 | 81.91 | 77.08 | 486.6 |
| 5 | 151.3 | 123.24898 | 81.46 | 77.08 | 486.6 |
| 6 | 151.3 | 121.91754 | 80.58 | 77.08 | 483.7 |
| 7 | 151.3 | 121.72085 | 80.45 | 77.08 | 483.3 |
| 8 | 151.1 | 117.1025 | 77.5 | 72.5 | 483.3 |
| 9 | 151.1 | 117.1025 | 77.5 | 72.5 | 483.4 |
| 10 | 151.1 | 117.1025 | 77.5 | 72.5 | 483.4 |
| 11 | 151.1 | 117.1025 | 77.5 | 72.5 | 483.4 |
| 12 | 151.1 | 117.1025 | 77.5 | 72.5 | 480.6 |
| 13 | 151.1 | 117.02695 | 77.45 | 72.5 | 476.9 |
| 14 | 151.1 | 116.73986 | 77.26 | 72.5 | 476.4 |
| 15 | 151.1 | 116.46788 | 77.08 | 72.5 | 475.2 |
| 16 | 151.1 | 116.0448 | 76.8 | 72.5 | 471.1 |
| 17 | 151.1 | 115.5915 | 76.5 | 72.5 | 469.5 |
| 18 | 151.1 | 115.51595 | 76.45 | 72.5 | 465.3 |
| 19 | 151.1 | 115.4404 | 76.4 | 72.5 | 465.3 |
| 20 | 150.9 | 113.49189 | 75.21 | 66.67 | 465.1 |
| 21 | 149.1 | 112.19775 | 75.25 | 72.5 | 457.8 |
| 22 | 147.9 | 111.25038 | 75.22 | 66.67 | 457.4 |
| 23 | 145.1 | 109.18775 | 75.25 | 72.5 | 455.1 |
| 24 | 142.2 | 107.03394 | 75.27 | 66.67 | 451.8 |
| 25 | 140.9 | 105.9568 | 75.2 | 66.67 | 450.4 |
| 26 | 138.5 | 104.0135 | 75.1 | 66.67 | 444.6 |
| 27 | 132.8 | 99.7328 | 75.1 | 66.67 | 437.8 |
| 28 | 130.6 | 98.0806 | 75.1 | 66.67 | 434.9 |
| 29 | 129.9 | 97.5549 | 75.1 | 66.67 | 434.9 |
| 30 | 125.7 | 94.4007 | 75.1 | 66.67 | 428.1 |
| 31 | 122.4 | 91.8 | 75 | 66.67 | 423.7 |
| 32 | 120.9 | 90.54201 | 74.89 | 66.67 | 418.9 |

The measured step data is shown in Table 13.

TABLE 13

Cycle data from the coin cell.

| Cycle ID | Step ID | Step Type | Start Vol(mV) | End Vol(mV) |
|---|---|---|---|---|
| 1 | 1 | Rest | 3590.2 | 3540.8 |
| 1 | 2 | CC_DChg | 3537.8 | 2822.6 |
| 1 | 3 | Rest | 2822.6 | 2848.6 |
| 2 | 4 | CC_Chg | 2897.8 | 4297.5 |
| 2 | 5 | CV_Chg | 4299.3 | 4299.3 |
| 2 | 6 | Rest | 4298.9 | 4256.7 |
| 2 | 7 | CC_DChg | 4250.3 | 2799.5 |
| 2 | 8 | Rest | 2800.2 | 2892.1 |
| 3 | 9 | CC_Chg | 2897.8 | 4297.8 |
| 3 | 10 | CV_Chg | 4299.3 | 4299.3 |
| 3 | 11 | Rest | 4296.3 | 4284.5 |
| 3 | 12 | CC_DChg | 4280.5 | 2819.6 |
| 3 | 13 | Rest | 2807.3 | 2850.8 |
| 4 | 14 | CC_Chg | 2857.8 | 4297.8 |
| 4 | 15 | CV_Chg | 4300.2 | 4300.2 |
| 4 | 16 | Rest | 4289.9 | 4276.6 |
| 4 | 17 | CC_DChg | 4280.5 | 2807.3 |
| 4 | 18 | Rest | 2807.3 | 2819.2 |
| 5 | 19 | CC_Chg | 2819.2 | 4297.5 |
| 5 | 20 | CV_Chg | 4300.2 | 4300.2 |
| 5 | 21 | Rest | 4300.2 | 4256.3 |
| 5 | 22 | CC_DChg | 4256.3 | 2809.6 |
| 5 | 23 | Rest | 2809.6 | 2865.2 |
| 6 | 24 | CC_Chg | 2865.2 | 4297.8 |
| 6 | 25 | CV_Chg | 4299.3 | 4299.3 |
| 6 | 26 | Rest | 4299.3 | 4243.3 |
| 6 | 27 | CC_DChg | 4243.3 | 2810.2 |
| 6 | 28 | Rest | 2810.2 | 2849.5 |
| 7 | 29 | CC_Chg | 2849.5 | 4297.8 |

TABLE 13-continued

Cycle data from the coin cell.

| Cycle ID | Step ID | Step Type | Start Vol(mV) | End Vol(mV) |
|---|---|---|---|---|
| 7 | 30 | CV_Chg | 4299.3 | 4299.3 |
| 7 | 31 | Rest | 4299.3 | 4240.6 |
| 7 | 32 | CC_DChg | 4240.6 | 2805.7 |
| 7 | 33 | Rest | 2805.7 | 2858.9 |
| 8 | 34 | CC_Chg | 2858.9 | 4297.8 |
| 8 | 35 | CV_Chg | 4299.3 | 4299.3 |
| 8 | 36 | Rest | 4299.3 | 4254.9 |
| 8 | 37 | CC_DChg | 4254.9 | 2801.9 |
| 8 | 38 | Rest | 2801.9 | 2852.7 |
| 9 | 39 | CC_Chg | 2852.7 | 4297.8 |
| 9 | 40 | CV_Chg | 4299.3 | 4299.3 |
| 9 | 41 | Rest | 4299.3 | 4262.9 |
| 9 | 42 | CC_DChg | 4262.9 | 2800.1 |
| 9 | 43 | Rest | 2800.1 | 2873.8 |
| 10 | 44 | CC_Chg | 2873.8 | 4297.8 |
| 10 | 45 | CV_Chg | 4299.3 | 4299.3 |
| 10 | 46 | Rest | 4299.3 | 4268.5 |
| 10 | 47 | CC_DChg | 4268.5 | 2800.8 |
| 10 | 48 | Rest | 2800.8 | 2869.3 |
| 11 | 49 | CC_Chg | 2869.3 | 4297.8 |
| 11 | 50 | CV_Chg | 4299.3 | 4299.3 |
| 11 | 51 | Rest | 4299.3 | 4272.2 |
| 11 | 52 | CC_DChg | 4272.2 | 2800.6 |
| 11 | 53 | Rest | 2800.6 | 2832 |
| 12 | 54 | CC_Chg | 2832 | 4297.8 |
| 12 | 55 | CV_Chg | 4299.3 | 4299.3 |
| 12 | 56 | Rest | 4299.3 | 4276 |
| 12 | 57 | CC_DChg | 4276 | 2800.2 |
| 12 | 58 | Rest | 2800.2 | 2831.9 |
| 13 | 59 | CC_Chg | 2831.9 | 4297.8 |
| 13 | 60 | CV_Chg | 4299.3 | 4299.3 |
| 13 | 61 | Rest | 4299.3 | 4277.2 |
| 13 | 62 | CC_DChg | 4277.2 | 2800.2 |
| 13 | 63 | Rest | 2800.2 | 2846.3 |
| 14 | 64 | CC_Chg | 2846.3 | 4297.8 |
| 14 | 65 | CV_Chg | 4299.3 | 4299.3 |
| 14 | 66 | Rest | 4299.3 | 4267.2 |
| 14 | 67 | CC_DChg | 4267.2 | 2799.6 |
| 14 | 68 | Rest | 2799.6 | 2852.9 |
| 15 | 69 | CC_Chg | 2852.9 | 4297.8 |
| 15 | 70 | CV_Chg | 4299.3 | 4299.3 |
| 15 | 71 | Rest | 4299.3 | 4278.1 |
| 15 | 72 | CC_DChg | 4278.1 | 2799.2 |
| 15 | 73 | Rest | 2799.2 | 2854.7 |
| 16 | 74 | CC_Chg | 2854.7 | 4298.1 |
| 16 | 75 | CV_Chg | 4299.3 | 4299.3 |
| 16 | 76 | Rest | 4299.3 | 4278.1 |
| 16 | 77 | CC_DChg | 4278.1 | 2800.1 |
| 16 | 78 | Rest | 2800.1 | 2857.3 |
| 17 | 79 | CC_Chg | 2857.3 | 4298.9 |
| 17 | 80 | CV_Chg | 4299.3 | 4299.3 |
| 17 | 81 | Rest | 4299.3 | 4277.8 |
| 17 | 82 | CC_DChg | 4277.8 | 2800.6 |
| 17 | 83 | Rest | 2800.6 | 2830.6 |
| 18 | 84 | CC_Chg | 2830.6 | 4299.3 |
| 18 | 85 | CV_Chg | 4299.3 | 4299.3 |
| 18 | 86 | Rest | 4299.3 | 4277.5 |
| 18 | 87 | CC_DChg | 4277.5 | 2797.6 |
| 18 | 88 | Rest | 2797.6 | 2831.8 |
| 19 | 89 | CC_Chg | 2831.8 | 4299.3 |
| 19 | 90 | CV_Chg | 4299.3 | 4299.3 |
| 19 | 91 | Rest | 4299.3 | 4275.3 |
| 19 | 92 | CC_DChg | 4275.3 | 2800.8 |
| 19 | 93 | Rest | 2800.8 | 2834.3 |
| 20 | 94 | CC_Chg | 2834.3 | 4299.3 |
| 20 | 95 | CV_Chg | 4299.3 | 4299.3 |
| 20 | 96 | Rest | 4299.3 | 4275 |
| 20 | 97 | CC_DChg | 4275 | 2798.6 |
| 20 | 98 | Rest | 2798.6 | 2856.1 |
| 21 | 99 | CC_Chg | 2856.1 | 4299.1 |
| 21 | 100 | CV_Chg | 4299.3 | 4299.3 |
| 21 | 101 | Rest | 4299.3 | 4272.9 |
| 21 | 102 | CC_DChg | 4272.9 | 2800.7 |
| 21 | 103 | Rest | 2800.7 | 2833.3 |
| 22 | 104 | CC_Chg | 2833.3 | 4299.1 |
| 22 | 105 | CV_Chg | 4299.3 | 4299.3 |
| 22 | 106 | Rest | 4299.3 | 4270.1 |
| 22 | 107 | CC_DChg | 4270.1 | 2800.1 |
| 22 | 108 | Rest | 2800.1 | 2857.3 |
| 23 | 109 | CC_Chg | 2857.3 | 4297.8 |
| 23 | 110 | CV_Chg | 4299.3 | 4299.3 |
| 23 | 111 | Rest | 4299.3 | 4268.5 |
| 23 | 112 | CC_DChg | 4268.5 | 2795.3 |
| 23 | 113 | Rest | 2795.3 | 2842.7 |
| 24 | 114 | CC_Chg | 2842.7 | 4297.6 |
| 24 | 115 | CV_Chg | 4299.3 | 4299.3 |
| 24 | 116 | Rest | 4299.3 | 4265.7 |
| 24 | 117 | CC_DChg | 4265.7 | 2801.6 |
| 24 | 118 | Rest | 2801.6 | 2862.1 |
| 25 | 119 | CC_Chg | 2862.1 | 4299.3 |
| 25 | 120 | CV_Chg | 4299.3 | 4299.3 |
| 25 | 121 | Rest | 4299.3 | 4263.6 |
| 25 | 122 | CC_DChg | 4263.6 | 2797.3 |
| 25 | 123 | Rest | 2797.3 | 2830.6 |
| 26 | 124 | CC_Chg | 2830.6 | 4299.3 |
| 26 | 125 | CV_Chg | 4299.3 | 4299.3 |
| 26 | 126 | Rest | 4299.3 | 4259.8 |
| 26 | 127 | CC_DChg | 4259.8 | 2798.4 |
| 26 | 128 | Rest | 2798.4 | 2828.4 |
| 27 | 129 | CC_Chg | 2828.4 | 4298.1 |
| 27 | 130 | CV_Chg | 4299.3 | 4299.3 |
| 27 | 131 | Rest | 4299.3 | 4255.2 |
| 27 | 132 | CC_DChg | 4255.2 | 2800.8 |
| 27 | 133 | Rest | 2800.8 | 2834.7 |
| 28 | 134 | CC_Chg | 2834.7 | 4298.9 |
| 28 | 135 | CV_Chg | 4299.3 | 4299.3 |
| 28 | 136 | Rest | 4299.3 | 4249 |
| 28 | 137 | CC_DChg | 4249 | 2800.5 |
| 28 | 138 | Rest | 2800.5 | 2839.1 |
| 29 | 139 | CC_Chg | 2839.1 | 4299.2 |
| 29 | 140 | CV_Chg | 4299.3 | 4299.3 |
| 29 | 141 | Rest | 4299.3 | 4241.2 |
| 29 | 142 | CC_DChg | 4241.2 | 2800.9 |
| 29 | 143 | Rest | 2800.9 | 2832.3 |
| 30 | 144 | CC_Chg | 2832.3 | 4297.6 |
| 30 | 145 | CV_Chg | 4299.3 | 4299.3 |
| 30 | 146 | Rest | 4299.3 | 4235.3 |
| 30 | 147 | CC_DChg | 4235.3 | 2800.1 |
| 30 | 148 | Rest | 2800.1 | 2845.1 |
| 31 | 149 | CC_Chg | 2845.1 | 4297.1 |
| 31 | 150 | CV_Chg | 4299.3 | 4299.3 |
| 31 | 151 | Rest | 4299.3 | 4226 |
| 31 | 152 | CC_DChg | 4226 | 2789.6 |
| 31 | 153 | Rest | 2789.6 | 2844.9 |
| 32 | 154 | CC_Chg | 2844.9 | 4299.5 |
| 32 | 155 | CV_Chg | 4299.6 | 4299.6 |
| 32 | 156 | Rest | 4299.6 | 4213.3 |

The start voltage, mid-voltage, and end voltage of the CC_DChg step is shown in Table 14.

TABLE 14

Start voltage, mid-voltage, and end voltage of the CC_DChg step

| Step ID | Step Type | Start Vol(mV) | End Vol(mV) | Mid Vol (mV) |
|---|---|---|---|---|
| 2 | CC_DChg | 3537.8 | 2822.6 | 3180.2 |
| 7 | CC_DChg | 4250.3 | 2799.5 | 3524.9 |
| 12 | CC_DChg | 4280.5 | 2819.6 | 3550.05 |
| 17 | CC_DChg | 4280.5 | 2807.3 | 3543.9 |
| 22 | CC_DChg | 4256.3 | 2809.6 | 3532.95 |
| 27 | CC_DChg | 4243.3 | 2810.2 | 3526.75 |
| 32 | CC_DChg | 4240.6 | 2805.7 | 3523.15 |
| 37 | CC_DChg | 4254.9 | 2801.9 | 3528.4 |
| 42 | CC_DChg | 4262.9 | 2800.1 | 3531.5 |
| 47 | CC_DChg | 4268.5 | 2800.8 | 3534.65 |
| 52 | CC_DChg | 4272.2 | 2800.6 | 3536.4 |
| 57 | CC_DChg | 4276 | 2800.2 | 3538.1 |
| 62 | CC_DChg | 4277.2 | 2800.2 | 3538.7 |

TABLE 14-continued

Start voltage, mid-voltage, and end voltage of the CC_DChg step

| Step ID | Step Type | Start Vol(mV) | End Vol(mV) | Mid Vol (mV) |
|---|---|---|---|---|
| 67 | CC_DChg | 4267.2 | 2799.6 | 3533.4 |
| 72 | CC_DChg | 4278.1 | 2799.2 | 3538.65 |
| 77 | CC_DChg | 4278.1 | 2800.1 | 3539.1 |
| 82 | CC_DChg | 4277.8 | 2800.6 | 3539.2 |
| 87 | CC_DChg | 4277.5 | 2797.6 | 3537.55 |
| 92 | CC_DChg | 4275.3 | 2800.8 | 3538.05 |
| 97 | CC_DChg | 4275 | 2798.6 | 3536.8 |
| 102 | CC_DChg | 4272.9 | 2800.7 | 3536.8 |
| 107 | CC_DChg | 4270.1 | 2800.1 | 3535.1 |
| 112 | CC_DChg | 4268.5 | 2795.3 | 3531.9 |
| 117 | CC_DChg | 4265.7 | 2801.6 | 3533.65 |
| 122 | CC_DChg | 4263.6 | 2797.3 | 3530.45 |
| 127 | CC_DChg | 4259.8 | 2798.4 | 3529.1 |
| 132 | CC_DChg | 4255.2 | 2800.8 | 3528 |
| 137 | CC_DChg | 4249 | 2800.5 | 3524.75 |
| 142 | CC_DChg | 4241.2 | 2800.9 | 3521.05 |
| 147 | CC_DChg | 4235.3 | 2800.1 | 3517.7 |
| 152 | CC_DChg | 4226 | 2789.6 | 3507.8 |

The nominal voltage was determined to be 3520.93 mV by calculating the average of the mid voltage in the CC_DChg step shown in Table 14.

The raw data shown in Tables 12-13 was analyzed using the equations listed in Table 15 to determine the capacity (mAh), charge time (hrs), capacity retention (%), capacity fade (mAh/g), coulomb efficiency (%), and state of health (SoH). As shown in Table 15, capacity was determined by multiplying the specific capacity with the mass of the active material. The charging current used for the analysis was 8.9 mA. The amount of active material in electrode was 0.3 g.

TABLE 15

Equations used to determine the coin cell properties.

| | |
|---|---|
| Capacity (mAh) | RCap (mAh/g) × mass (g) of Active Material in the electrode |
| Charge/Discharge Time (hrs) | Capacity (mAh)/Charge or Discharge Current (mA) |
| Capacity Retention (%) | RCap_DChg (Cycle N)/Rcap_DChg (Cycle 1) × 100% |
| Capacity Fade (mAh/g) | RCap_DChg (Cycle 1) − RCap_DChg (Cycle N) |
| Coulombic Efficiency (%) | RCap_DChg/RCap_Chg × 100% |
| State of Health (SoH) (%) | Capacity (Cycle N)/Capacity (Cycle 1) × 100% |

Table 16 shows the results of the analysis of the raw data in Tables 4 and 5 using the formulae in Table 14.

TABLE 16

Properties of the coin cell with the TRG electrode.

| Cycle ID | Capacity (mAh) | Charge Time (hrs) | Capacity Retention (%) | Capacity Fade (mAh/g) | Coulombic Efficiency (%) | State of Health (SoH) (%) |
|---|---|---|---|---|---|---|
| 1 | 47.4 | 5.325842697 | 100 | 0 | 88 | 100 |
| 2 | 45.57 | 5.120224719 | 91.14655495 | 12.30983 | 83.43 | 96.13924051 |
| 3 | 45.39 | 5.1 | 89.41542722 | 14.71679 | 82.17 | 95.75949367 |
| 4 | 45.39 | 5.1 | 89.13250144 | 15.11017 | 81.91 | 95.75949367 |
| 5 | 45.39 | 5.1 | 88.64282221 | 15.79102 | 81.46 | 95.75949367 |
| 6 | 45.39 | 5.1 | 87.68522727 | 17.12246 | 80.58 | 95.75949367 |
| 7 | 45.39 | 5.1 | 87.54376438 | 17.31915 | 80.45 | 95.75949367 |
| 8 | 45.33 | 5.093258427 | 84.22216628 | 21.9375 | 77.5 | 95.63291139 |
| 9 | 45.33 | 5.093258427 | 84.22216628 | 21.9375 | 77.5 | 95.63291139 |
| 10 | 45.33 | 5.093258427 | 84.22216628 | 21.9375 | 77.5 | 95.63291139 |
| 11 | 45.33 | 5.093258427 | 84.22216628 | 21.9375 | 77.5 | 95.63291139 |
| 12 | 45.33 | 5.093258427 | 84.22216628 | 21.9375 | 77.5 | 95.63291139 |
| 13 | 45.33 | 5.093258427 | 84.1678294 | 22.01305 | 77.45 | 95.63291139 |
| 14 | 45.33 | 5.093258427 | 83.96134925 | 22.30014 | 77.26 | 95.63291139 |
| 15 | 45.33 | 5.093258427 | 83.76573648 | 22.57212 | 77.08 | 95.63291139 |
| 16 | 45.33 | 5.093258427 | 83.46144994 | 22.9952 | 76.8 | 95.63291139 |
| 17 | 45.33 | 5.093258427 | 83.13542865 | 23.4485 | 76.5 | 95.63291139 |
| 18 | 45.33 | 5.093258427 | 83.08109177 | 23.52405 | 76.45 | 95.63291139 |
| 19 | 45.33 | 5.093258427 | 83.02675489 | 23.5996 | 76.4 | 95.63291139 |
| 20 | 45.27 | 5.086516854 | 81.62535242 | 25.54811 | 75.21 | 95.50632911 |
| 21 | 44.73 | 5.025842697 | 80.69458429 | 26.84225 | 75.25 | 94.36708861 |
| 22 | 44.37 | 4.985393258 | 80.01321922 | 27.78962 | 75.22 | 93.60759494 |
| 23 | 43.53 | 4.891011236 | 78.52973964 | 29.85225 | 75.25 | 91.83544304 |
| 24 | 42.66 | 4.793258427 | 76.98068182 | 32.00606 | 75.27 | 90 |
| 25 | 42.27 | 4.749438202 | 76.20598389 | 33.0832 | 75.2 | 89.17721519 |
| 26 | 41.55 | 4.668539326 | 74.80832854 | 35.0265 | 75.1 | 87.65822785 |
| 27 | 39.84 | 4.476404494 | 71.72957422 | 39.3072 | 75.1 | 84.05063291 |
| 28 | 39.18 | 4.402247191 | 70.54128308 | 40.9594 | 75.1 | 82.65822785 |
| 29 | 38.97 | 4.378651685 | 70.16319045 | 41.4851 | 75.1 | 82.21518987 |
| 30 | 37.71 | 4.237078652 | 67.89463464 | 44.6393 | 75.1 | 79.55696203 |
| 31 | 36.72 | 4.125842697 | 66.02416571 | 47.24 | 75 | 77.46835443 |
| 32 | 36.27 | 4.075280899 | 65.1193973 | 48.49799 | 74.89 | 76.51898734 |

The average capacity of the coin cell was calculated by taking the average of all the cell capacities in Table 16. The average coin cell capacity was 43.65 mAh.

The average charge time of the coin cell was calculated by taking the average of all the charge times in Table 16. The average charge time was 4.91 hrs.

Figure 13:
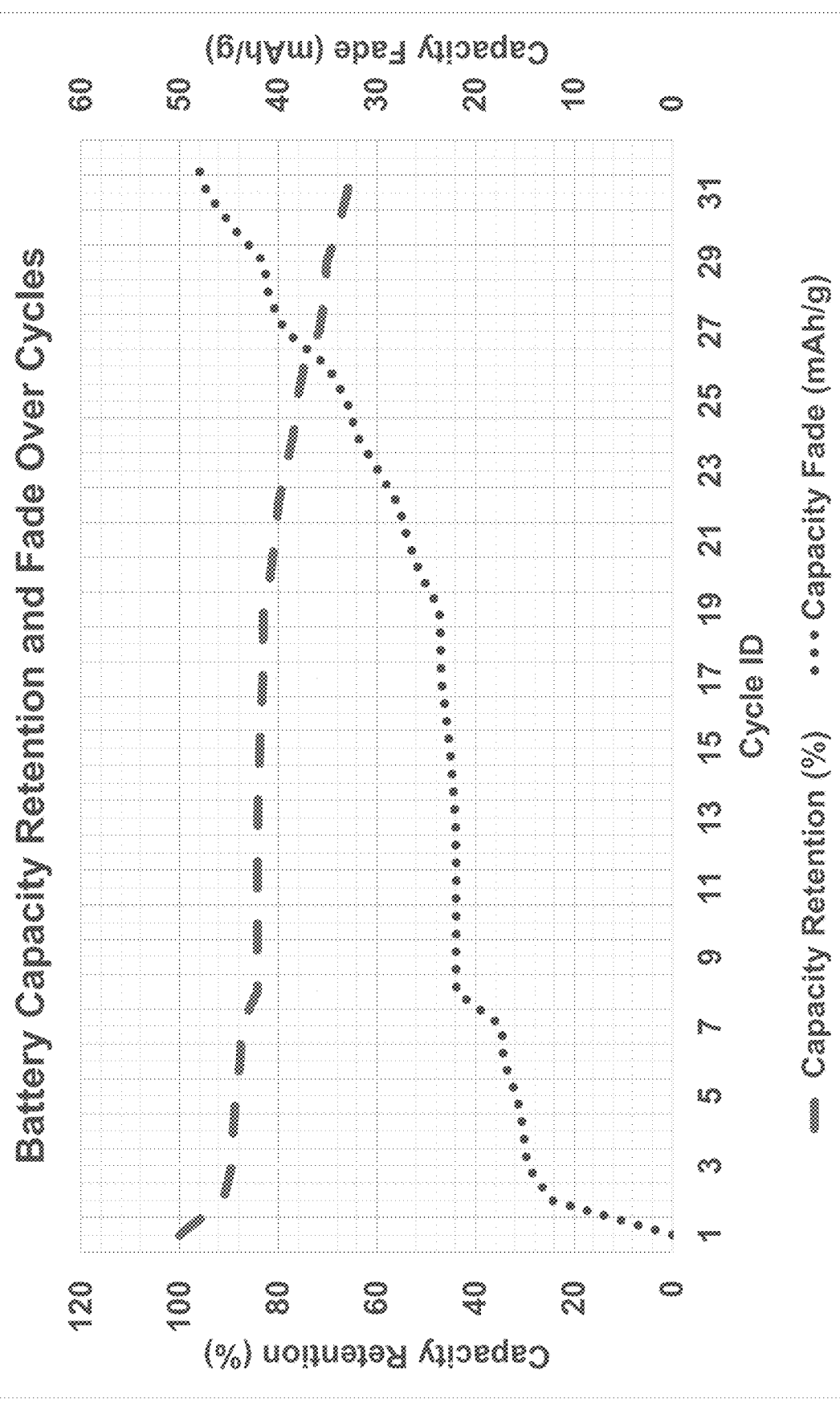
FIG. 13 shows representative line charts showing capacity retention and capacity fade over cycles according to some embodiments of the present disclosure.
Figure 14:
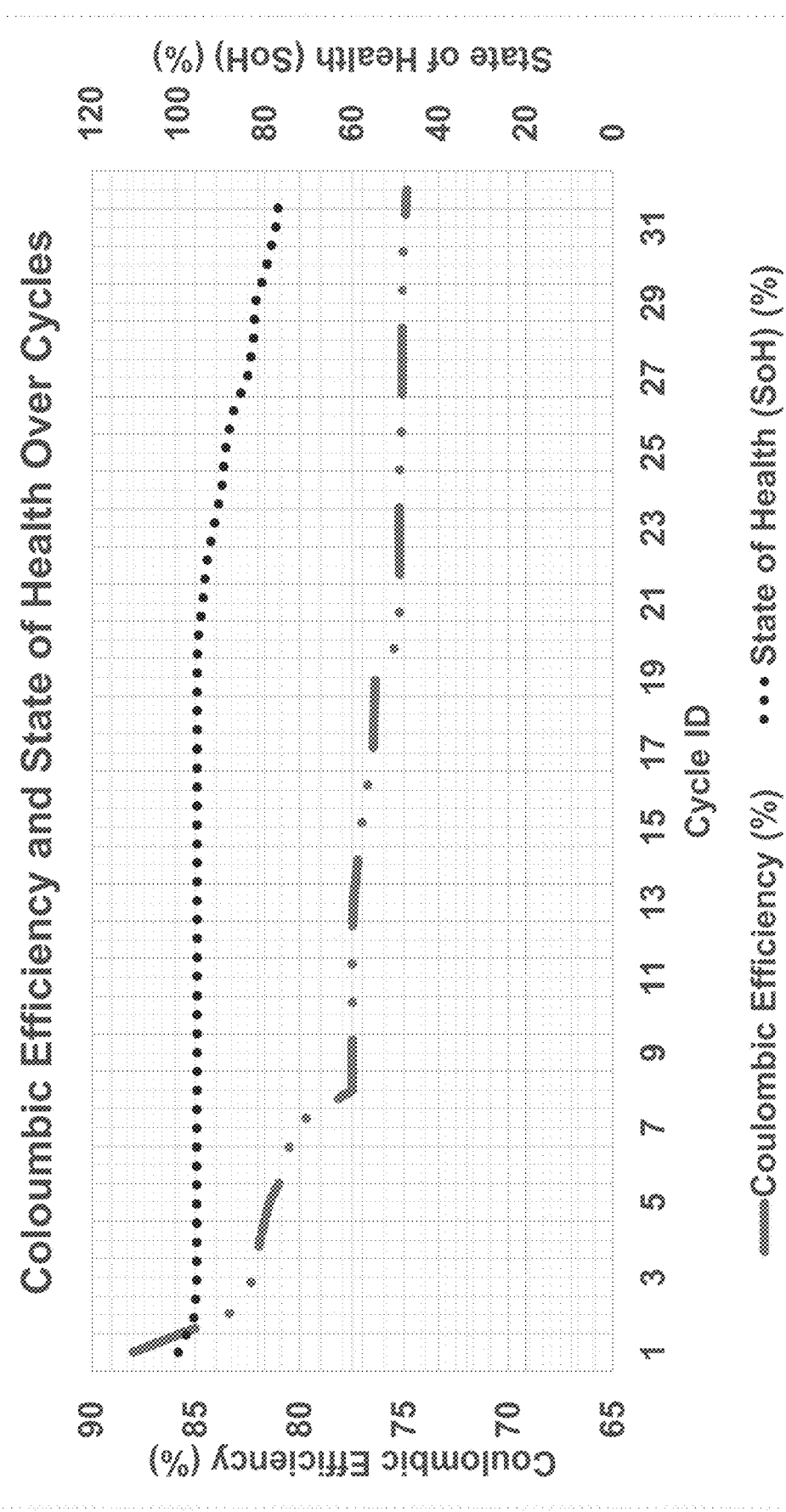
FIG. 14 shows representative line charts showing coulombic efficiency and state of health over cycles according to some embodiments of the present disclosure.
Figure 15:
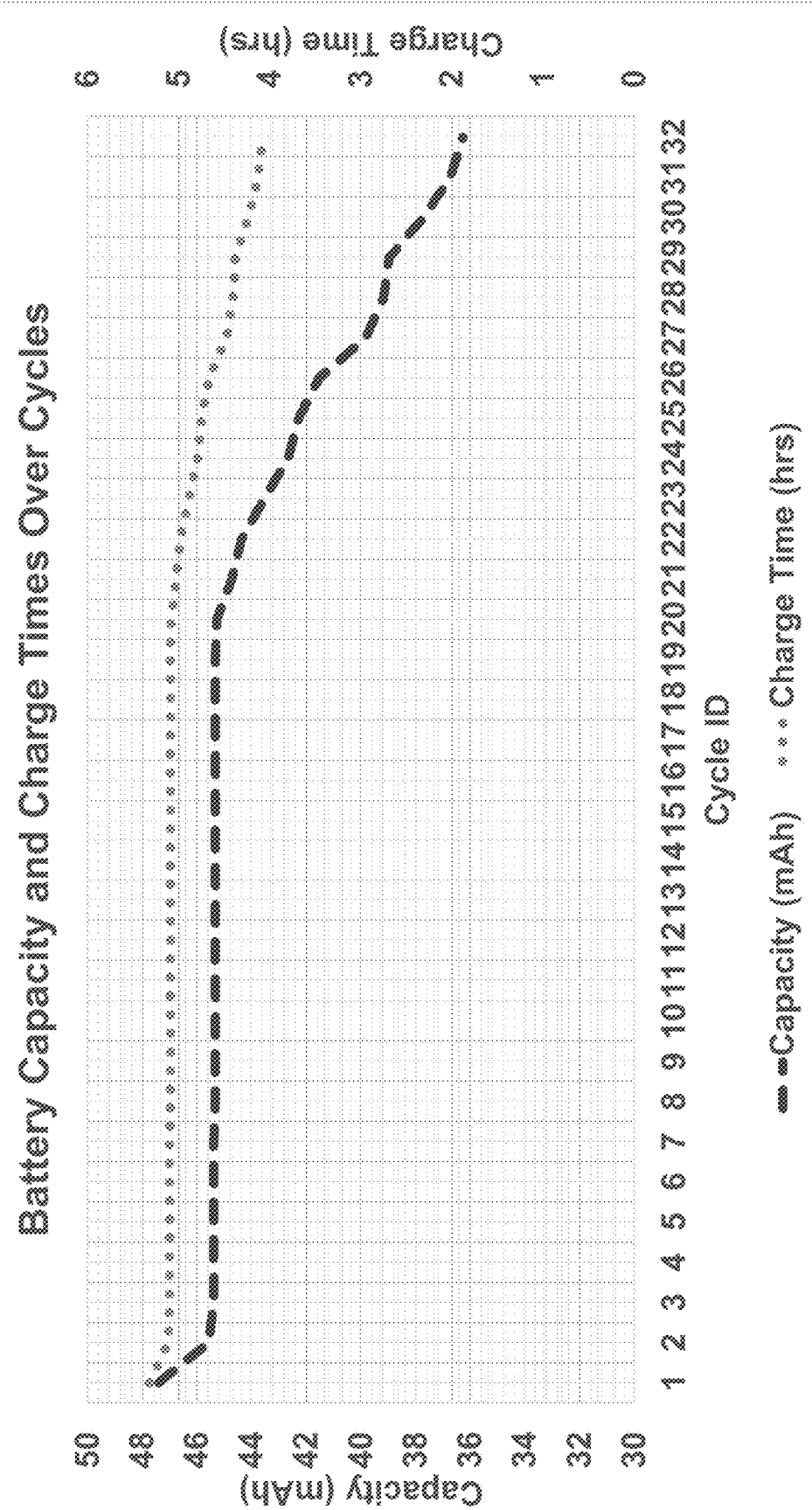
FIG. 15 shows representative line charts showing battery capacity and charge time over cycles according to some embodiments of the present disclosure.

The analyzed data in Table 16 is represented graphically in FIGS. 13-15. FIG. 13 represents line plots showing capacity retention (%) vs. cycle and capacity fade (mAh/g) vs. cycle of the coin cell. FIG. 14 represents line plots showing coulombic efficiency (%) vs. cycle and state of health (SoH) (%) vs. cycle of the coin cell. FIG. 15 represents line plots showing capacity (mAh) vs. cycle and charge time (hours) vs. cycle of the coin cell.

The coin cell achieved a voltage 4.3 V, which is significantly higher than the typical 3.6 V of conventional lithium-ion cells. This higher voltage potentially allows for more efficient energy storage and use.

The coin cell achieved an energy density of 504.4 Wh/kg, a substantial improvement over conventional lithium-based cells, which typically offer 200-300 Wh/kg. The coin cells demonstrated an increase in energy density of 68-169% compared to conventional technology.

The coin cell demonstrated a capacity of 43.65 mAh. The achieved capacity significantly outperformed the state-of-the-art based coin cells, which typically offer only around 30 mAh.

Despite the manufacturing conditions stated above, the inventive TRG electrodes demonstrated superior performance, underscoring the robustness and potential of our technology. The versatility shown by both electrode configurations suggests broad potential applications.

Example 10—Assemble a Battery Using the Disclosed Electrodes

To assemble a battery using NSPG and TRG graphene-based electrodes, the dual-ion concept will be leveraged, which involves the simultaneous intercalation of both cations and anions into the electrodes during charge and discharge cycles. This approach is important for enhancing the energy density and cycling stability of the battery. The electrochemical aspect of this assembly is central to its performance, and the choice of electrolyte and additives will play a significant role.

For optimal performance, it is intended to utilize ionic liquid electrolytes due to their high electrochemical stability and non-flammability. Specifically, 1-butyl-1-methylpyrrolidinium bis(trifluoromethylsulfonyl)imide (Pyr14TFSI) will be selected, an ionic liquid electrolyte, known for its extended anodic stability and reduced risk of solvent co-intercalation at high potentials. However, Pyr14TFSI alone can cause issues such as graphene exfoliation when used with graphene anodes, leading to poor overall performance. To mitigate this issue, certain additives that form a stable solid electrolyte interphase (SEI) on the graphene surface will be incorporated.

Fluoroethylene carbonate (FEC), a carbonate additive, and ethylene sulfite (ES), a sulfite additive, will be key additives to enhance the performance of the Pyr14TFSI electrolyte in DCBs. FEC is highly effective in improving the electrochemical stability of the electrolyte. During the initial charging cycles, FEC will decompose to form a stable and robust SEI layer on the anode's surface. This SEI layer will prevent further electrolyte decomposition, reduce side reactions, and enhance overall cycling stability. FEC is particularly beneficial for high-voltage applications as it maintains the integrity of the electrode materials and minimizes capacity fade over extended cycling.

Similarly, ES will decompose to form a protective SEI on the electrode surfaces, stabilizing the electrolyte and preventing detrimental side reactions. ES is especially effective in improving the low-temperature performance of batteries and increasing their overall efficiency. By incorporating ES into the electrolyte, the reversible capacity and cycling stability of the battery will be significantly improved.

In addition to these non-salt additives, certain salt additives will also be used to further enhance the electrolyte's performance. Salts such as lithium bis(trifluoromethanesulfonyl)imide (LiTFSI), a lithium salt, and lithium hexafluorophosphate (LiPF6), another lithium salt, will help maintain high ionic conductivity and stability of the electrolyte, crucial for the efficient operation of the battery. These salts will support the dual-ion intercalation process by providing a stable ionic environment for both cations and anions.

In the electrochemical operation of our dual carbon battery, the NSPG and TRG graphene-based electrodes will work synergistically to facilitate the dual-ion concept. During the charging process, cations (such as Li+) will intercalate into the NSPG electrode, while anions (such as TFSI− or PF6−) will intercalate into the TRG electrode. This simultaneous intercalation increases the energy storage capacity of the battery by utilizing both electrodes for ion storage. The use of Pyr14TFSI, enhanced with FEC and ES, will ensure that these intercalation processes occur efficiently and stably, even at high voltages.

The enhanced SEI layers formed by FEC and ES additives will protect the electrode materials from degradation, thereby improving the cycle life of the battery. These SEI layers will also reduce the overall impedance of the battery, leading to higher Coulombic efficiency and better power performance. The inclusion of LiTFSI or LiPF6 salts will further improve the ionic conductivity of the electrolyte, ensuring rapid ion transport and reducing polarization during high-rate cycling.

Overall, by carefully selecting and optimizing the electrolyte and additives, the assembled DCB should achieve superior electrochemical performance. This will include high energy density, excellent cycling stability, and robust safety characteristics, making it a viable and efficient energy storage solution leveraging the dual-ion intercalation concept.

Numerous examples are provided herein to enhance the understanding of the present disclosure. A specific set of statements are provided as follows.

Statement 1: A cathode material comprising a polyol reduced graphene and a plurality of dopants.

Statement 2: The cathode material of statement 1, wherein the plurality of dopants is incorporated into the graphene.

Statement 3: The cathode material of statement 1, wherein the polyol comprises ethylene glycol, glycerol, triethylene glycol (TEG), or combinations thereof.

Statement 4: The cathode material of statement 3, wherein the polyol is triethylene glycol.

Statement 5: The cathode material of statement 1, wherein the plurality of dopants comprise nitrogen, sulfur, boron, phosphorous, iron, or a combination thereof.

Statement 6: The cathode material of statement 5, wherein the plurality of dopants is a co-dopant comprising nitrogen and sulfur.

Statement 7: The cathode material of statement 6, wherein the nitrogen is derived from a nitrogen containing polyvinyl alcohol, polyacrylic acid, or combinations thereof.

Statement 8: The cathode material of statement 7, wherein the nitrogen is derived from chitosan.

Statement 9: The cathode material of statement 6, wherein the sulfur is derived from thioacetamide, sodium sulfide, elemental sulfur, thiourea, or combinations thereof.

Statement 10: The cathode material of statement 1, wherein the cathode material formula is $C_xH_yO_zN_mS_n$, wherein x, y, z, m, and n are integers or decimal numbers; where x is about 1 to about 10, y is about 1 to about 20, z is about 0 to about 5, m is greater than 0 to about 5, and n is greater than 0 to about 5.

Statement 11: The cathode material of statement 1, wherein the cathode material formula is $C_xH_yO_zN_mS_n$, wherein x, y, z, m, and n are integers or decimal numbers; where x is about 2 to about 8, y is about 5 to about 15, z is about 2 to about 4, m is greater than 2 to about 4, and n is greater than 2 to about 4.

Statement 12: The cathode material of statement 1, wherein the cathode material formula is $C_xH_yO_zN_mS_n$, wherein x, y, z, m, and n are integers or decimal numbers; where x is about 4 to about 6, y is about 5 to about 15, z is about 2 to about 4, m is greater than 2 to about 4, and n is greater than 2 to about 4.

Statement 13: The cathode material of statement 1, wherein the cathode material formula is $C_xH_yO_zN_mS_n$, wherein x, y, z, m, and n are integers or decimal numbers; where x is about 2 to about 8, y is about 10 to about 12, z is about 2 to about 4, m is greater than 2 to about 4, and n is greater than 2 to about 4.

Statement 14: The cathode material of statement 10, wherein the formula is $C_6H_4N_2S$ or $C_5H_{10}O_3N_3S_3$.

Statement 15: The cathode material of statement 10, wherein nitrogen to sulfur atomic ratio (N/S) is varied to optimize electrochemical performance of the cathode material in energy storage applications.

Statement 16: The cathode material of statement 15, wherein the N/S ratio ranges from about 1:1 to about 3:1.

Statement 17: The cathode material of statement 1, wherein cathode material of has a specific capacity ranging from between 200 mAh/g to 750 mAh/g.

Statement 18: The cathode material of statement 17, wherein cathode material of has a specific capacity ranging from between 280 mAH/g to 450 mAh/g.

Statement 19: The cathode material of statement 17, wherein cathode material of has a specific capacity ranging from between 350 mAH/g to 600 mAh/g.

Statement 20: The cathode material of statement 17, wherein cathode material of has a specific capacity ranging from between 420 mAH/g to 750 mAh/g.

Statement 21: The cathode material of statement 17, wherein the cathode material has a specific capacity ranging from between 200 to 300 mAh/g.

Statement 22: The cathode material of statement 1, wherein the cathode material has an energy density ranging from greater than 500 to 2500 Wh/kg.

Statement 23: The cathode material of statement 1, wherein the cathode material has an energy density ranging from 800 to 1500 Wh/kg.

Statement 24: The cathode material of statement 1, wherein the cathode material has an energy density ranging from 1000 to 2000 Wh/kg.

Statement 25: The cathode material of statement 1, wherein the cathode material has an energy density ranging from 1200 to 2500 Wh/kg.

Statement 26: The cathode material of statement 1, wherein the cathode material has an energy density ranging from 600 to 800 Wh/kg.

Statement 27: The cathode material of statement 1, wherein the cathode material has an energy density ranging from 510 to 700 Wh/kg.

Statement 28: A composition comprising a graphene doped with nitrogen and sulfur.

Statement 29: The composition of statement 28, wherein the composition further comprises a polyol.

Statement 30: The composition of statement 28, wherein the graphene doped with nitrogen and sulfur is suitable for use as a cathode material.

Statement 31: The composition of statement 28, wherein the composition further comprises chitosan.

Statement 32: A battery comprising an anode, a cathode, an electrolyte, and a separator, wherein the cathode comprises the cathode material of statements 1-27.

Statement 33: The battery of statement 32, wherein the battery has a capacity retention of over 80%.

Statement 34: The battery of statement 32, wherein the battery of has a specific capacity ranging from between 200 mAh/g to 750 mAh/g.

Statement 35: The battery of statement 34, wherein the battery of has a specific capacity ranging from between 280 mAh/g to 450 mAh/g.

Statement 36: The battery of statement 34, wherein the battery of has a specific capacity ranging from between 350 mAh/g to 600 mAh/g.

Statement 37: The battery of statement 34, wherein the battery of has a specific capacity ranging from between 420 mAh/g to 750 mAh/g.

Statement 38: The battery of statement 34, wherein the battery has a specific capacity ranging from between 200 to 300 mAh/g.

Statement 39: The battery of statement 32, wherein the battery has an energy density ranging from greater than 500 to 2500 Wh/kg.

Statement 40: The battery of statement 39, wherein the battery has an energy density ranging from 800 to 1500 Wh/kg.

Statement 41: The battery of statement 39, wherein the battery has an energy density ranging from 1000 to 2000 Wh/kg.

Statement 42: The battery of statement 39, wherein the battery has an energy density ranging from 1200 to 2500 Wh/kg.

Statement 43: The battery of statement 39, wherein the battery has an energy density ranging from 600 to 800 Wh/kg.

Statement 44: The battery of statement 39, wherein the battery has an energy density ranging from 510 to 700 Wh/kg.

Statement 45: A method of producing a cathode for energy storage applications, the method comprising: forming a co-doped polyol reduced graphene material from graphene oxide, a polyol, and a plurality of dopants; mixing the co-doped polyol reduced graphene material and a binder material to form a homogeneous slurry; coating the homogeneous slurry onto a current collector material to form a coated electrode; drying the coated electrode in an oven to form a dried coated electrode; compressing the dried coated electrode to form an electrode with a specified density and a specified thickness; and cutting the electrode with the specified density and the specified thickness using a cutting tool to form the cathode for the energy storage applications.

Statement 46: The method of statement 45, wherein the polyol comprises ethylene glycol, glycerol, triethylene glycol, or combinations thereof.

Statement 47: The method of statement 45, wherein the plurality of dopants comprise nitrogen, sulfur, boron, phosphorous, iron, or a combination thereof.

Statement 48: The method of statement 45, wherein the co-dopant is nitrogen and sulfur.

Statement 49: The method of statement 48, wherein the nitrogen is derived from a nitrogen containing polyvinyl alcohol, polyacrylic acid, thiourea, melamine, or combinations thereof.

Statement 50: The method of statement 49, wherein the nitrogen is derived from chitosan.

Statement 51: The method of statement 48, wherein the sulfur is derived from thioacetamide, sodium sulfide, elemental sulfur, thiourea, or combinations thereof.

Statement 52: The method of statement 45, wherein the forming a co-doped polyol reduced graphene step comprises forming a co-doped triethylene glycol reduced graphene material.

Statement 53: The method of statement 52, further comprising: drying graphene oxide to form a dried graphene oxide with a moisture content of under 1 wt %; dispersing the dried graphene oxide in triethylene glycol by sonication to form a solution of graphene oxide in triethylene glycol; adding chitosan and thiourea to the solution of graphene oxide in triethylene glycol to form a mixture of chitosan, thiourea, and graphene oxide in triethylene glycol; adjusting pH of the mixture to between 9 and 10; heating the mixture to a temperature in an inert atmosphere for a specified time to form a co-doped triethylene glycol reduced graphene solution; cooling the co-doped triethylene glycol reduced graphene solution; removing the co-doped triethylene glycol reduced graphene from the solution by diluting, centrifuging, and washing to form a co-doped triethylene glycol reduced graphene pellet; and drying the co-doped triethylene glycol reduced graphene pellet to obtain the co-doped triethylene glycol reduced graphene material.

Statement 54: The method of statement 53, wherein the temperature ranges from about 270° C. to about 285° C.

Statement 55: The method of statement 45, wherein the binder material comprises chitosan, alginate, cellulose derivatives, polyvinyl alcohol (PVA), carboxymethyl cellulose (CMC), or polyacrylic acid (PAA).

Statement 56: The method of statement 45, wherein the current collector material comprises aluminum, copper, stainless steel, or nickel.

Statement 57: The method of statement 45, the specified thickness ranges from between about 150 μm to about 250 μm.

Statement 58: The method of statement 45, the specified density ranges from between about 1.4 g/cm$^3$ to about 1.8 g/cm$^3$.

Statement 59: The method of statement 45, wherein the cutting tool comprises a disc cutter, punching tools, laser cutting, water jet cutting, or mechanical cutting tools including but not limited to rotary cutters or precision blades.

Statement 60: The method of statement 45, wherein reducing the graphene oxide to graphene and incorporation of dopants into the graphene occurs simultaneously.

Statement 61: The battery of any one of statements 32-44, wherein the battery is a coin cell battery.

Statement 62: The battery of statement 61, wherein the voltage may be ≥4.3 V, ≥4.2 V, ≥4.1 V, ≥4.0 V, ≥3.9 V, ≥3.8 V, or ≥3.7 V.

Statement 63: The battery of statement 61, wherein the voltage is higher than 3.6 V lithium-ion coin cell batteries.

Statement 64: The battery of statement 61, wherein the battery comprises a 68-169% increase in energy density compared to 3.6 V lithium-ion coin cell batteries.

Statement 65: The battery of statement 61, wherein the battery comprises a capacity of ≥35 mAh, ≥36 mAh, ≥37 mAh, ≥38 mAh, ≥39 mAh, ≥40 mAh, ≥41 mAh, ≥42 mAh, ≥43 mAh, ≥44 mAh, ≥45 mAh, ≥46 mAh, ≥47 mAh, ≥49 mAh, ≥50 mAh.

Statement 66: The battery of statement 61, wherein the battery comprises a capacity from about 35 mAh to about 50 mAh.

Statement 67: An electrode material comprising graphene, a plurality of dopants, and interconnected porous structures comprising a plurality of pores.

Statement 68: The electrode material of statement 67, wherein the plurality of dopants comprises nitrogen, sulfur, phosphorous, boron, transition metals, and a combination thereof.

Statement 3: The electrode material of statement 2, wherein the plurality of dopants is nitrogen and sulfur.

Statement 4: The electrode material of statement 1, wherein the plurality of pores comprises an average pore size ranging from 0.5 nm to 55 nm.

Statement 5: The electrode material of statement 4, wherein the plurality of pores comprises an average pore size ranging from 5 nm to 50 nm.

Statement 6: The electrode material of statement 1, wherein the plurality of pores comprises a surface area ranging from 400 m$^2$/g to 1000 m$^2$/g.

Statement 7: The electrode material of statement 6, wherein the plurality of pores comprises a surface area ranging from 500 m$^2$/g to 800 m$^2$/g.

Statement 8: The electrode material of statement 1, wherein the plurality of pores comprises an average pore volume ranging from 0.2 cm$^3$/g to 2.0 cm$^3$/g.

Statement 9: The electrode material of statement 9, wherein the plurality of pores comprises an average pore volume ranging from 0.5 cm$^3$/g to 1.0 cm$^3$/g.

Statement 10: The electrode material of statement 1, wherein the plurality of pores comprises an average depth ranging from 5 nm to 150 nm.

Statement 11: The electrode material of statement 10, wherein the plurality of pores comprises an average depth ranging from 10 nm to 100 nm.

Statement 12: The electrode material of statement 3, wherein the nitrogen and sulfur are derived from natural polymers, thioacetamide, sodium sulfide, elemental sulfur, thiourea, or combinations thereof.

Statement 13: The electrode material of statement 12, wherein the natural polymers comprise cellulose, alginate, lignin, or combinations thereof.

Statement 14: The electrode material of statement 3, wherein the electrode material formula is CxNySzOw.

Statement 15: The electrode material of statement 14, wherein the formula is $C_6N_2S$.

Statement 16: The electrode material of statement 1, wherein the electrode has an electrical conductivity ranging from 1000 S/m to 5000 S/m.

Statement 17: The electrode material of statement 1, wherein the electrode has a specific surface area ranging from 500 m$^2$/g to 1500 m$^2$/g.

Statement 18: The electrode material of statement 1, wherein the electrode has a capacity retention of over 90% after one thousand cycles of charge/discharge cycles.

Statement 19: A composition comprising a porous graphene doped with nitrogen and sulfur.

Statement 20: The composition of statement 19, further comprising deionized water, residual acid, and/or a cross-linking agent.

Statement 21: The composition of statement 18, wherein the porous graphene doped with nitrogen and sulfur is suitable for use as an electrode material.

Statement 22: An electrode comprising the electrode material of statements 1-18.

Statement 23: The electrode of statement 22, wherein the electrode is an anode.

Statement 24: The electrode of statement 22, wherein the electrode is a cathode.

Statement 25: A device comprising the electrode material of statements 1-18, wherein the device comprises an energy storage device, a supercapacitor, an electrochemical sensor, or combinations thereof.

Statement 26: The device of statement 25, wherein the energy storage device comprises lithium-ion batteries, sodium-ion batteries, rechargeable batteries, or combinations thereof.

Statement 27: A method of producing an electrode material for energy storage applications, the method comprising: dispersing graphene oxide in a solvent and ultrasonicating the graphene oxide and the solvent for a first specified time forming a first solution; dissolving a binder in an acid solution forming a second solution; mixing and heating the second solution to a first temperature for a second specified time; adding a dopant source into the second solution forming a third solution; mixing the third solution; adding the first solution into the third solution forming a fourth solution; mixing the fourth solution for a third specified time; cutting metal foam into specified shapes and sizes forming a cut metal foam; dipping the cut metal template into the fourth solution forming a uniformly coated metal foam; adding a cross-linking agent to the uniformly coated metal template to cross-link the nitrogen dopant forming a hydrogel-coated metal foam; treating the hydrogel-coated metal foam with liquid nitrogen and freeze-drying at a second temperature and a first pressure forming a freeze-dried hydrogel-coated metal foam; carbonizing the freeze-dried hydrogel-coated metal foam; dissolving the metal foam template in an etchant forming the electrode material; washing the electrode material with ultrapure water; and drying the electrode material to obtain dried electrode material, wherein the electrode material is a nitrogen and sulfur doped porous graphene (NSPG).

Statement 28: The method of statement 27, wherein the solvent is a polar solvent.

Statement 29: The method of statement 28, wherein the polar solvent comprises deionized water, ethanol, isopropanol, or combinations thereof.

Statement 30: The method of statement 27, wherein the first specified time first specified time ranges from about 1 hour to about 4 hours.

Statement 31: The method of statement 27, wherein the binder comprises chitosan.

Statement 32: The method of statement 27, wherein the acid comprises acetic acid, formic acid, hydrochloric acid, citric acid, or a combination thereof.

Statement 33: The method of statement 27, wherein the pH of the acid solution ranges from about 4 to about 6.

Statement 34: The method of statement 27, wherein the first temperature ranges from about 40° C. to about 60° C.

Statement 35: The method of statement 27, wherein the dopant comprises thiourea.

Statement 36: The method of statement 27, wherein the second specified time ranges from about 0.5 hour to about 2 hours.

Statement 37: The method of statement 27, wherein the metal comprises nickel, copper, or combinations thereof.

Statement 38: The method of statement 27, wherein the third specified time ranges from about 0.5 hour to about 24 hours.

Statement 39: The method of statement 27, wherein the specified shapes comprise sheets, discs, cylinders, or custom geometries.

Statement 40: The method of statement 27, wherein the size ranges from about 2 cm to about 100 cm.

Statement 41: The method of statement 27, wherein the second solution is a uniform homogenous solution.

Statement 42: The method of statement 27, wherein the cross-linking agent comprises glutaraldehyde, formaldehyde, glyoxal, or combinations thereof.

Statement 43: The method of statement 42, wherein the cross-linking agent is glutaraldehyde.

Statement 44: The method of statement 27, wherein the second temperature ranges from about −60° C. to about −30° C.

Statement 45: The method of statement 27, wherein the first pressure ranges from about 1 Pa to about 15 Pa.

Statement 46: The method of statement 27, wherein the carbonizing step further comprises heating the hydrogel-coated metal foam to a third temperature for a fourth specified time at a ramp rate in an inert atmosphere.

Statement 47: The method of statement 46, wherein the third temperature ranges from about 750° C. to about 850° C.

Statement 48: The method of statement 47, wherein the third temperature ranges about 795° C. to about 805° C.

Statement 49: The method of statement 46, wherein the fourth specified time ranges from about 1.5 hours to about 4 hours.

Statement 50: The method of statement 49, wherein the fourth specified time ranges from about 1.9 hours to about 2.1 hours.

Statement 51: The method of statement 46, wherein the ramp rate ranges from about 2° C./min to about 7° C./min.

Statement 52: The method of statement 51, wherein the ramp rate ranges from about 4° C./min to about 6° C./min.

Statement 53: The method of statement 46, wherein the inert atmosphere comprises nitrogen, helium, argon, or combinations thereof.

Statement 54: The method of statement 27, wherein the etchant comprises aqua regia, nitric acid, hydrochloric acid, sulfuric acid, and combinations thereof.

Statement 55: The method of statement 27, wherein the drying the electrode step is performed in an oven at a fourth temperature.

Statement 56: The method of statement 55, wherein the fourth temperature ranges from about 70° C. to about 90° C.

Statement 57: A hydrogel composition comprising shaped nickel (Ni) foam, graphene oxide, chitosan, thiourea, and a crosslinking agent, wherein the hydrogel is formed after the graphene oxide is added to the shaped nickel foam.

Statement 58: The composition of statement 57, wherein the graphene oxide is porous and interconnected.

Statement 59: The composition of statement 57, wherein the graphene oxide is uniformly interconnected.

Statement 60: The composition of statement 57, wherein the graphene oxide is evenly dispersed across the hydrogel surface and the hydrogel core.

Statement 61: The composition of statement 57, wherein the graphene oxide concentration is evenly dispersed throughout the hydrogel.

Statement 62: An anode comprising the composition of statement 57.

Statement 63: A dipped hydrogel composition comprising shaped nickel (Ni) foam, graphene oxide, chitosan, thiourea, and a crosslinking agent; wherein the hydrogel is formed by (a) dipping the shaped nickel (Ni) foam into a solution comprising graphene oxide, chitosan, thiourea; and (b) adding a crosslinking agent.

Statement 64: A composition comprising shaped nickel (Ni) foam and a solution comprising graphene oxide, chitosan, and thiourea, wherein the solution does not comprise a hydrogel.

Statement 65: A composition comprising shaped nickel (Ni) foam and a solution comprising graphene oxide, chitosan, and thiourea, wherein the solution does not comprise an aldehyde or crosslinking agent.

Statement 66: A method of making a dipped hydrogel composition, the method comprising dipping a shaped nickel (Ni) foam into a solution comprising graphene oxide, chitosan, thiourea forming a coated shaped nickel (Ni) foam.

Statement 67: A battery comprising the electrode material of statements 1-18 or statements 89-110.

Statement 68: The battery of statement 67, wherein the battery has a capacity retention of over 90%.

Statement 69: The battery of statement 67, wherein the battery is a coin cell battery.

Statement 70: The battery of statement 69, wherein the voltage is ≥4.3 V, ≥4.2 V, ≥4.1 V, ≥4.0 V, ≥3.9 V, ≥3.8 V, or ≥3.7 V.

Statement 71: The battery of statement 69, wherein the voltage is higher than 3.6 V lithium-ion coin cell batteries.

Statement 72: The battery of statement 69, wherein the battery comprises a 68-169% increase in energy density compared to 3.6 V lithium-ion coin cell batteries.

Statement 73: The battery of statement 69, wherein the battery comprises a capacity of ≥35 mAh, ≥36 mAh, ≥37 mAh, ≥38 mAh, ≥39 mAh, ≥40 mAh, ≥41 mAh, ≥42 mAh, ≥43 mAh, ≥44 mAh, ≥45 mAh, ≥46 mAh, ≥47 mAh, ≥48 mAh, ≥49 mAh, ≥50 mAh, ≥51 mAh, ≥52 mAh, ≥53 mAh, ≥54 mAh, ≥55 mAh, ≥56 mAh, ≥57 mAh, ≥58 mAh, ≥59 mAh, ≥60 mAh, ≥61 mAh, ≥62 mAh, ≥63 mAh, ≥64 mAh, ≥65 mAh, ≥66 mAh, ≥67 mAh, ≥68 mAh, ≥69 mAh, ≥70 mAh, ≥71 mAh, ≥72 mAh, ≥73 mAh, ≥74 mAh, ≥75 mAh, ≥76 mAh, ≥77 mAh, ≥78 mAh, ≥79 mAh, ≥80 mAh, ≥81 mAh, ≥82 mAh, ≥83 mAh, ≥84 mAh, ≥85 mAh, ≥86 mAh, ≥87 mAh, ≥88 mAh, ≥89 mAh, or ≥90 mAh.

Statement 74: The battery of statement 69, wherein the battery comprises a capacity from about 35 mAh to about 90 mAh.

Statement 75: The battery of statement 69, wherein the battery comprises a specific capacity ranging from between 100 mAh/g to 500 mAh/g.

Statement 76: The battery of statement 75, wherein the battery comprises a specific capacity ranging from between 200 mAh/g to 400 mAh/g.

Statement 77: The battery of statement 75, wherein the battery comprises a specific capacity ranging from between 225 mAh/g to 275 mAh/g.

Statement 78: The battery of claim 67, wherein the cathode comprises a polyol reduced graphene and a plurality of dopants.

Statement 79: The battery of claim 78, further comprising an electrolyte comprising an ionic liquid.

Statement 80: The battery of claim 79, wherein the ionic liquid comprises 1-butyl-1-methylpyrrolidinium bis(trifluoromethylsulfonyl)imide.

Statement 81: The battery of claim 79, wherein the battery further comprises one or more additives.

Statement 82: The battery of claim 81, wherein the one or more additives comprises a salt additive, a non-salt additive, or a combination thereof.

Statement 83: The battery of claim 82, wherein the non-salt additive comprises a carbonate additive, a sulfite additive, or a combination thereof.

Statement 84: The battery of claim 83, wherein the carbonate additive comprises fluoroethylene carbonate.

Statement 85: The battery of claim 83, wherein the sulfite additive comprises ethylene sulfite.

Statement 86: The battery of claim 82, wherein the salt additive comprises a lithium salt.

Statement 87: The battery of claim 86, wherein the lithium salt comprises lithium bis(trifluoromethanesulfonyl) imide (LiTFSI), lithium hexafluorophosphate (LiPF6), or a combination thereof.

Statement 88: The battery of claim 81, wherein the one or more additives form a stable solid electrolyte interphase.

Statement 89: An electrode material comprising graphene, a plurality of dopants, and a plurality of pores.

Statement 90: The electrode material of statement 89, wherein the plurality of pores are interconnected.

Statement 91: The electrode material of statement 89, wherein the plurality of dopants comprises nitrogen, sulfur, phosphorous, boron, transition metals, or a combination thereof.

Statement 92: The electrode material of statement 89, wherein the plurality of dopants comprises nitrogen and sulfur.

Statement 93: The electrode material of statement 89, wherein the plurality of pores comprises an average pore size ranging from 0.5 nm to 55 nm.

Statement 94: The electrode material of statement 93, wherein the plurality of pores comprises an average pore size ranging from 5 nm to 50 nm.

Statement 95: The electrode material of statement 89, wherein the plurality of pores comprises a surface area ranging from 400 $m^2/g$ to 1000 $m^2/g$.

Statement 96: The electrode material of statement 95, wherein the plurality of pores comprises a surface area ranging from 500 $m^2/g$ to 800 $m^2/g$.

Statement 97: The electrode material of statement 89, wherein the plurality of pores comprises an average pore volume ranging from 0.2 $cm^3/g$ to 2.0 $cm^3/g$.

Statement 98: The electrode material of statement 97, wherein the plurality of pores comprises an average pore volume ranging from 0.5 $cm^3/g$ to 1.0 $cm^3/g$.

Statement 99: The electrode material of statement 89, wherein the plurality of pores comprises an average depth ranging from 5 nm to 150 nm.

Statement 100: The electrode material of statement 99, wherein the plurality of pores comprises an average depth ranging from 10 nm to 100 nm.

Statement 101: The electrode material of statement 92, wherein the nitrogen and sulfur are derived from natural polymers, thioacetamide, sodium sulfide, elemental sulfur, thiourea, or combinations thereof.

Statement 102: The electrode material of statement 101, wherein the natural polymers comprise cellulose, alginate, lignin, or combinations thereof.

Statement 103: The electrode material of statement 91, wherein the electrode material formula is $C_xN_yS_zO_w$.

Statement 104: The electrode material of statement 103, wherein the formula is $C_6N_2S$.

Statement 105: The electrode material of statement 89, wherein the electrode has an electrical conductivity ranging from 1000 S/m to 5000 S/m.

Statement 106: The electrode material of statement 89, wherein the electrode has a specific surface area ranging from 500 $m^2$/g to 1500 $m^2$/g.

Statement 107: The electrode material of statement 89, wherein the electrode has a capacity retention of over 90% after one thousand cycles of charge/discharge cycles.

Statement 108: A composition comprising a porous graphene doped with nitrogen and sulfur.

Statement 109: The composition of statement 108, further comprising deionized water, residual acid, and/or a cross-linking agent.

Statement 110: The composition of statement 108, wherein the porous graphene doped with nitrogen and sulfur is suitable for use as an electrode material.

Statement 67: An electrode material comprising graphene, a plurality of dopants, and interconnected porous structures comprising a plurality of pores.

Statement 68: The electrode material of statement 67, wherein the plurality of dopants comprises nitrogen, sulfur, phosphorous, boron, transition metals, and a combination thereof.

Statement 69: The electrode material of statement 68, wherein the plurality of dopants is nitrogen and sulfur.

Statement 70: The electrode material of statement 67, wherein the plurality of pores comprises an average pore size ranging from 0.5 nm to 55 nm.

Statement 71: The electrode material of statement 70, wherein the plurality of pores comprises an average pore size ranging from 5 nm to 50 nm.

Statement 72: The electrode material of statement 67, wherein the plurality of pores comprises a surface area ranging from 400 $m^2$/g to 1000 $m^2$/g.

Statement 73: The electrode material of statement 72, wherein the plurality of pores comprises a surface area ranging from 500 $m^2$/g to 800 $m^2$/g.

Statement 74: The electrode material of statement 67, wherein the plurality of pores comprises an average pore volume ranging from 0.2 $cm^3$/g to 2.0 $cm^3$/g.

Statement 75: The electrode material of statement 75, wherein the plurality of pores comprises an average pore volume ranging from 0.5 $cm^3$/g to 1.0 $cm^3$/g.

Statement 76: The electrode material of statement 67, wherein the plurality of pores comprises an average depth ranging from 5 nm to 150 nm.

Statement 77: The electrode material of statement 76, wherein the plurality of pores comprises an average depth ranging from 10 nm to 100 nm.

Statement 78: The electrode material of statement 69, wherein the nitrogen and sulfur are derived from natural polymers, thioacetamide, sodium sulfide, elemental sulfur, thiourea, or combinations thereof.

Statement 79: The electrode material of statement 78, wherein the natural polymers comprise cellulose, alginate, lignin, or combinations thereof.

Statement 80: The electrode material of statement 69, wherein the electrode material formula is CxNySzOw.

Statement 81: The electrode material of statement 80, wherein the formula is $C_6N_2S$.

Statement 82: The electrode material of statement 67, wherein the electrode has an electrical conductivity ranging from 1000 S/m to 5000 S/m.

Statement 83: The electrode material of statement 67, wherein the electrode has a specific surface area ranging from 500 $m^2$/g to 1500 $m^2$/g.

Statement 84: The electrode material of statement 67, wherein the electrode has a capacity retention of over 90% after one thousand cycles of charge/discharge cycles.

Statement 85: A composition comprising a porous graphene doped with nitrogen and sulfur.

Statement 86: The composition of statement 85, further comprising deionized water, residual acid, and/or a cross-linking agent.

Statement 87: The composition of statement 84, wherein the porous graphene doped with nitrogen and sulfur is suitable for use as an electrode material.

Statement 88: An electrode comprising the electrode material of statements 67-84.

Statement 89: The electrode of statement 88, wherein the electrode is an anode.

Statement 90: The electrode of statement 88, wherein the electrode is a cathode.

Statement 91: A device comprising the electrode material of statements 67-84, wherein the device comprises an energy storage device, a supercapacitor, an electrochemical sensor, or combinations thereof.

Statement 92: The device of statement 91, wherein the energy storage device comprises lithium-ion batteries, sodium-ion batteries, rechargeable batteries, or combinations thereof.

Statement 93: A method of producing an electrode material for energy storage applications, the method comprising: dispersing graphene oxide in a solvent and ultrasonicating the graphene oxide and the solvent for a first specified time forming a first solution; dissolving a binder in an acid solution forming a second solution; mixing and heating the second solution to a first temperature for a second specified time; adding a dopant source into the second solution forming a third solution; mixing the third solution; adding the first solution into the third solution forming a fourth solution; mixing the fourth solution for a third specified time; cutting metal foam into specified shapes and sizes forming a cut metal foam; dipping the cut metal template into the fourth solution forming a uniformly coated metal foam; adding a cross-linking agent to the uniformly coated metal template to cross-link the nitrogen dopant forming a hydrogel-coated metal foam; treating the hydrogel-coated metal foam with liquid nitrogen and freeze-drying at a second temperature and a first pressure forming a freeze-dried hydrogel-coated metal foam; carbonizing the freeze-dried hydrogel-coated metal foam; dissolving the metal foam template in an etchant forming the electrode material; washing the electrode material with ultrapure water; and drying the electrode material to obtain dried electrode material, wherein the electrode material is a nitrogen and sulfur doped porous graphene (NSPG).

Statement 94: The method of statement 93, wherein the solvent is a polar solvent.

Statement 95: The method of statement 94, wherein the polar solvent comprises deionized water, ethanol, isopropanol, or combinations thereof.

Statement 96: The method of statement 93, wherein the first specified time first specified time ranges from about 1 hour to about 4 hours.

Statement 97: The method of statement 93, wherein the binder comprises chitosan.

Statement 98: The method of statement 93, wherein the acid comprises acetic acid, formic acid, hydrochloric acid, citric acid, or a combination thereof.

Statement 99: The method of statement 93, wherein the pH of the acid solution ranges from about 4 to about 6.

Statement 100: The method of statement 93, wherein the first temperature ranges from about 40° C. to about 60° C.

Statement 101: The method of statement 93, wherein the dopant comprises thiourea.

Statement 102: The method of statement 93, wherein the second specified time ranges from about 0.5 hour to about 2 hours.

Statement 103: The method of statement 93, wherein the metal comprises nickel, copper, or combinations thereof.

Statement 104: The method of statement 93, wherein the third specified time ranges from about 0.5 hour to about 24 hours.

Statement 105: The method of statement 93, wherein the specified shapes comprise sheets, discs, cylinders, or custom geometries.

Statement 106: The method of statement 93, wherein the size ranges from about 2 cm to about 100 cm.

Statement 107: The method of statement 93, wherein the second solution is a uniform homogenous solution.

Statement 108: The method of statement 93, wherein the cross-linking agent comprises glutaraldehyde, formaldehyde, glyoxal, or combinations thereof.

Statement 109: The method of statement 108, wherein the cross-linking agent is glutaraldehyde.

Statement 110: The method of statement 93, wherein the second temperature ranges from about −60° C. to about −30° C.

Statement 111: The method of statement 93, wherein the first pressure ranges from about 1 Pa to about 15 Pa.

Statement 112: The method of statement 93, wherein the carbonizing step further comprises heating the hydrogel-coated metal foam to a third temperature for a fourth specified time at a ramp rate in an inert atmosphere.

Statement 113: The method of statement 112, wherein the third temperature ranges from about 750° C. to about 850° C.

Statement 114: The method of statement 113, wherein the third temperature ranges about 795° C. to about 805° C.

Statement 115: The method of statement 112, wherein the fourth specified time ranges from about 1.5 hours to about 4 hours.

Statement 116: The method of statement 115, wherein the fourth specified time ranges from about 1.9 hours to about 2.1 hours.

Statement 117: The method of statement 112, wherein the ramp rate ranges from about 2° C./min to about 7° C./min.

Statement 118: The method of statement 117, wherein the ramp rate ranges from about 4° C./min to about 6° C./min.

Statement 119: The method of statement 112, wherein the inert atmosphere comprises nitrogen, helium, argon, or combinations thereof.

Statement 120: The method of statement 93, wherein the etchant comprises aqua regia, nitric acid, hydrochloric acid, sulfuric acid, and combinations thereof.

Statement 121: The method of statement 93, wherein the drying the electrode step is performed in an oven at a fourth temperature.

Statement 122: The method of statement 121, wherein the fourth temperature ranges from about 70° C. to about 90° C.

Statement 123: A hydrogel composition comprising shaped nickel (Ni) foam, graphene oxide, chitosan, thiourea, and a crosslinking agent, wherein the hydrogel is formed after the graphene oxide is added to the shaped nickel foam.

Statement 124: The composition of statement 123, wherein the graphene oxide is porous and interconnected.

Statement 125: The composition of statement 123, wherein the graphene oxide is uniformly interconnected.

Statement 126: The composition of statement 123, wherein the graphene oxide is evenly dispersed across the hydrogel surface and the hydrogel core.

Statement 127: The composition of statement 123, wherein the graphene oxide concentration is evenly dispersed throughout the hydrogel.

Statement 128: An anode comprising the composition of statement 123.

Statement 129: A dipped hydrogel composition comprising shaped nickel (Ni) foam, graphene oxide, chitosan, thiourea, and a crosslinking agent; wherein the hydrogel is formed by (a) dipping the shaped nickel (Ni) foam into a solution comprising graphene oxide, chitosan, thiourea; and (b) adding a crosslinking agent.

Statement 130: A composition comprising shaped nickel (Ni) foam and a solution comprising graphene oxide, chitosan, and thiourea, wherein the solution does not comprise a hydrogel.

Statement 131: A composition comprising shaped nickel (Ni) foam and a solution comprising graphene oxide, chitosan, and thiourea, wherein the solution does not comprise an aldehyde or crosslinking agent.

Statement 132: A method of making a dipped hydrogel composition, the method comprising dipping a shaped nickel (Ni) foam into a solution comprising graphene oxide, chitosan, thiourea forming a coated shaped nickel (Ni) foam.

Statement 133: A battery comprising the electrode material of statements 67-84 or statements 155-176.

Statement 134: The battery of statement 133, wherein the battery has a capacity retention of over 90%.

Statement 135: The battery of statement 133, wherein the battery is a coin cell battery.

Statement 136: The battery of statement 135, wherein the voltage is ≥4.3 V, ≥4.2 V, ≥4.1 V, ≥4.0 V, ≥3.9 V, ≥3.8 V, or ≥3.7 V.

Statement 137: The battery of statement 135, wherein the voltage is higher than 3.6 V lithium-ion coin cell batteries.

Statement 138: The battery of statement 135, wherein the battery comprises a 68-169% increase in energy density compared to 3.6 V lithium-ion coin cell batteries.

Statement 139: The battery of statement 135, wherein the battery comprises a capacity of ≥35 mAh, ≥36 mAh, ≥37 mAh, ≥38 mAh, ≥39 mAh, ≥40 mAh, ≥41 mAh, ≥42 mAh, ≥43 mAh, ≥44 mAh, ≥45 mAh, ≥46 mAh, ≥47 mAh, ≥48 mAh, ≥49 mAh, ≥50 mAh, ≥51 mAh, ≥52 mAh, ≥53 mAh, ≥54 mAh, ≥55 mAh, ≥56 mAh, ≥57 mAh, ≥58 mAh, ≥59 mAh, ≥60 mAh, ≥61 mAh, ≥62 mAh, ≥63 mAh, ≥64 mAh, ≥65 mAh, ≥66 mAh, ≥67 mAh, ≥68 mAh, ≥69 mAh, ≥70 mAh, ≥71 mAh, ≥72 mAh, ≥73 mAh, ≥74 mAh, ≥75 mAh, ≥76 mAh, ≥77 mAh, ≥78 mAh, ≥79 mAh, ≥80 mAh, ≥81 mAh, ≥82 mAh, ≥83 mAh, ≥84 mAh, ≥85 mAh, ≥86 mAh, ≥87 mAh, ≥88 mAh, ≥89 mAh, or ≥90 mAh.

Statement 140: The battery of statement 135, wherein the battery comprises a capacity from about 35 mAh to about 90 mAh.

Statement 141: The battery of statement 135, wherein the battery comprises a specific capacity ranging from between 100 mAh/g to 500 mAh/g.

Statement 142: The battery of statement 140, wherein the battery comprises a specific capacity ranging from between 200 mAh/g to 400 mAh/g.

Statement 143: The battery of statement 140, wherein the battery comprises a specific capacity ranging from between 225 mAh/g to 275 mAh/g.

Statement 144: The battery of statement 133, wherein the cathode comprises a polyol reduced graphene and a plurality of dopants.

Statement 145: The battery of statement 144, further comprising an electrolyte comprising an ionic liquid.

Statement 146: The battery of statement 145, wherein the ionic liquid comprises 1-butyl-1-methylpyrrolidinium bis(trifluoromethylsulfonyl)imide.

Statement 147: The battery of statement 145, wherein the battery further comprises one or more additives.

Statement 148: The battery of statement 147, wherein the one or more additives comprises a salt additive, a non-salt additive, or a combination thereof.

Statement 149: The battery of statement 148, wherein the non-salt additive comprises a carbonate additive, a sulfite additive, or a combination thereof.

Statement 150: The battery of statement 149, wherein the carbonate additive comprises fluoroethylene carbonate.

Statement 151: The battery of statement 149, wherein the sulfite additive comprises ethylene sulfite.

Statement 152: The battery of statement 148, wherein the salt additive comprises a lithium salt.

Statement 153: The battery of statement 152, wherein the lithium salt comprises lithium bis(trifluoromethanesulfonyl)imide (LiTFSI), lithium hexafluorophosphate (LiPF$_6$), or a combination thereof.

Statement 154: The battery of statement 147, wherein the one or more additives form a stable solid electrolyte interphase.

Statement 155: An electrode material comprising graphene, a plurality of dopants, and a plurality of pores.

Statement 156: The electrode material of statement 155, wherein the plurality of pores are interconnected.

Statement 157: The electrode material of statement 155, wherein the plurality of dopants comprises nitrogen, sulfur, phosphorous, boron, transition metals, or a combination thereof.

Statement 158: The electrode material of statement 155, wherein the plurality of dopants comprises nitrogen and sulfur.

Statement 159: The electrode material of statement 155, wherein the plurality of pores comprises an average pore size ranging from 0.5 nm to 55 nm.

Statement 160: The electrode material of statement 159, wherein the plurality of pores comprises an average pore size ranging from 5 nm to 50 nm.

Statement 161: The electrode material of statement 155, wherein the plurality of pores comprises a surface area ranging from 400 m$^2$/g to 1000 m$^2$/g.

Statement 162: The electrode material of statement 161, wherein the plurality of pores comprises a surface area ranging from 500 m$^2$/g to 800 m$^2$/g.

Statement 163: The electrode material of statement 155, wherein the plurality of pores comprises an average pore volume ranging from 0.2 cm$^3$/g to 2.0 cm$^3$/g.

Statement 164: The electrode material of statement 163, wherein the plurality of pores comprises an average pore volume ranging from 0.5 cm$^3$/g to 1.0 cm$^3$/g.

Statement 165: The electrode material of statement 155, wherein the plurality of pores comprises an average depth ranging from 5 nm to 150 nm.

Statement 166: The electrode material of statement 165, wherein the plurality of pores comprises an average depth ranging from 10 nm to 100 nm.

Statement 167: The electrode material of statement 158, wherein the nitrogen and sulfur are derived from natural polymers, thioacetamide, sodium sulfide, elemental sulfur, thiourea, or combinations thereof.

Statement 168: The electrode material of statement 167, wherein the natural polymers comprise cellulose, alginate, lignin, or combinations thereof.

Statement 169: The electrode material of statement 91, wherein the electrode material formula is $C_xN_yS_zO_w$.

Statement 170: The electrode material of statement 157, wherein the formula is $C_6N_2S$.

Statement 171: The electrode material of statement 155, wherein the electrode has an electrical conductivity ranging from 1000 S/m to 5000 S/m.

Statement 172: The electrode material of statement 155, wherein the electrode has a specific surface area ranging from 500 m$^2$/g to 1500 m$^2$/g.

Statement 173: The electrode material of statement 155, wherein the electrode has a capacity retention of over 90% after one thousand cycles of charge/discharge cycles.

Statement 174: A composition comprising a porous graphene doped with nitrogen and sulfur.

Statement 175: The composition of statement 174, further comprising deionized water, residual acid, and/or a crosslinking agent.

Statement 176: The composition of statement 174, wherein the porous graphene doped with nitrogen and sulfur is suitable for use as an electrode material.

What is claimed is:

1. A cathode material comprising a polyol reduced graphene and a plurality of dopants,
    wherein the plurality of dopants is incorporated into the graphene;
    wherein the plurality of dopants comprises nitrogen and sulfur; wherein the nitrogen doping ranges from about 4.5% to about 6.5%, about 4.6% to about 6.4%, about 4.7% to about 6.3%, about 4.8% to about 6.2%, about 4.9% to about 6.1%, about 5.0% to about 6.0%, about 5.1% to about 5.9%, about 5.2% to about 5.8%, about 5.3% to about 5.7%, or about 5.4% to about 5.6%;
    wherein molecular formula of the cathode material is $C_xN_yS_zO_w$;
    where x, y, z, and w are integers or decimal numbers; and
    wherein x ranges from about 1 to about 80, y is about 1 to about 20, w ranges from about 1 to about 40, and z is about 0.01 to about 5.

2. The cathode material of claim 1, wherein sulfur doping percent ranges from about 1.0% to about 2.5%, about 1.1% to about 2.4%, about 1.2% to about 2.3%, about 1.3% to about 2.2%, about 1.4% to about 2.1%, about 1.5% to about 2.0%, about 1.6% to about 1.9%, or about 1.7% to about 1.8%.

3. The cathode material of claim 1, wherein x ranges from about 2 to about 78, y ranges from about 1 to about 20, z ranges from about 0.02 to about 4.5, and w ranges from about 2 to about 38.

4. The cathode material of claim 3, wherein x is 60.

5. The cathode material of claim 3, wherein y is 5.

6. The cathode material of claim 3, wherein z is 0.04.

7. The cathode material of claim 3, wherein w is 33.

8. The cathode material of claim 1, wherein the cathode material formula is $C_{60}N_5S_{0.04}O_{33}$.

9. The cathode material of claim 1, wherein the polyol is triethylene glycol.

10. The cathode material of claim 1, wherein the nitrogen doping ranges from 4.5% to 6.5%.

11. The cathode material of claim 1, wherein the nitrogen doping ranges from 4.6% to 6.4%.

12. The cathode material of claim 1, wherein the nitrogen doping ranges from 4.7% to 6.3%.

13. The cathode material of claim 1, wherein the nitrogen doping ranges from 4.8% to 6.2%.

14. The cathode material of claim 1, wherein the nitrogen doping ranges from 4.9% to 6.1%.

15. The cathode material of claim 1, wherein the nitrogen doping ranges from 5.0% to 6.0%.

16. The cathode material of claim 1, wherein the nitrogen doping ranges from 5.1% to 5.9%.

17. The cathode material of claim 1, wherein the nitrogen doping ranges from 5.2% to 5.8%.

18. The cathode material of claim 1, wherein the nitrogen doping ranges from 5.3% to 5.7%.

19. The cathode material of claim 1, wherein the nitrogen doping ranges from 5.4% to 5.6%.

20. A cathode material comprising a polyol reduced graphene and a plurality of dopants,
    wherein the plurality of dopants is incorporated into the graphene;
    wherein the plurality of dopants comprises nitrogen and sulfur;
    wherein molecular formula of the cathode material is $C_xN_yS_zO_w$;
    where x, y, z, and w are integers or decimal numbers; and
    wherein x is 60, y is about 1 to about 20, w ranges from about 1 to about 40, and z is about 0.01 to about 5.

21. A cathode material comprising a polyol reduced graphene and a plurality of dopants,
    wherein the plurality of dopants is incorporated into the graphene;
    wherein the plurality of dopants comprises nitrogen and sulfur;
    wherein molecular formula of the cathode material is $C_xN_yS_zO_w$;
    where x, y, z, and w are integers or decimal numbers; and
    wherein x ranges from about 1 to about 80, y is 5, w ranges from about 1 to about 40, and z is about 0.01 to about 5.

22. A cathode material comprising a polyol reduced graphene and a plurality of dopants,
    wherein the plurality of dopants is incorporated into the graphene;
    wherein the plurality of dopants comprises nitrogen and sulfur;
    wherein molecular formula of the cathode material is $C_xN_yS_zO_w$;
    where x, y, z, and w are integers or decimal numbers; and
    wherein x ranges from about 1 to about 80, y is about 1 to about 20, w is 33, and z is about 0.01 to about 5.

* * * * *